United States Patent
Chastain et al.

(10) Patent No.: US 11,416,906 B2
(45) Date of Patent: Aug. 16, 2022

(54) HOSE ASSEMBLY BUILDER TOOL

(71) Applicant: Caterpillar Inc., Peoria, IL (US)

(72) Inventors: Amy C. Chastain, Edwards, IL (US); James J. Billimack, Metamora, IL (US); Jody A. Ingram, Washington, IL (US); Robert P. Shilts, Wausaukee, WI (US); William T. Reimers, Germantown Hills, IL (US); Kristina M. Hicks, Lincoln, IL (US); Deidre Smallwood, Tremont, IL (US); Santosh Paudel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 309 days.

(21) Appl. No.: 16/564,711

(22) Filed: Sep. 9, 2019

(65) Prior Publication Data
US 2021/0073888 A1   Mar. 11, 2021

(51) Int. Cl.
*G06Q 30/00* (2012.01)
*G06Q 30/06* (2012.01)
(Continued)

(52) U.S. Cl.
CPC ....... *G06Q 30/0627* (2013.01); *E02F 9/2275* (2013.01); *G06F 3/04895* (2013.01); *G06Q 10/0875* (2013.01); *G06Q 30/0633* (2013.01)

(58) Field of Classification Search
CPC .......... G06Q 30/0627; G06Q 10/0875; G06Q 30/0633; E02F 29/2275; G06F 3/04895
See application file for complete search history.

(56) References Cited

U.S. PATENT DOCUMENTS

| 6,820,076 B2 | 11/2004 | Bailey et al. |
| 7,356,393 B1 * | 4/2008 | Schlatre ................. G06Q 10/06 701/29.3 |

(Continued)

FOREIGN PATENT DOCUMENTS

| CN | 107209788 A | 9/2017 |
| JP | 04697115 B2 | 6/2011 |

OTHER PUBLICATIONS

Stahl, Armin, Ralph Bergmann, and Sascha Schmitt. "A customization approach for structured products in electronic shops." Proceedings of the 13th Bled Electronic Commerce Conference. 2000.*

*Primary Examiner* — Kathleen Palavecino
(74) *Attorney, Agent, or Firm* — von Briesen & Roper, s.c.

(57) ABSTRACT

A system for replacing an original hose assembly of a work machine with a replacement hose assembly includes at least a computing device, a database, and a server. The server is associated with the database and includes a processor configured via computer-executable instructions to perform a method of identifying the replacement hose assembly. The method includes prompting a user to select hose attributes associated with a hose of the original hose assembly. Based on the selected hose attributes, a replacement hose may be identified. The method further includes prompting the user to select coupling attributes associated with a coupling of the original hose assembly. Based on compatibility with the identified replacement hose and the selected coupling attributes, a replacement coupling may be identified. The method further includes generating a bill of materials for the replacement hose assembly and displaying the bill of materials.

8 Claims, 57 Drawing Sheets

(51) Int. Cl.
*E02F 9/22* (2006.01)
*G06F 3/04895* (2022.01)
*G06Q 10/08* (2012.01)

(56) References Cited

U.S. PATENT DOCUMENTS

| | | |
|---|---|---|
| 8,423,419 B2 | 4/2013 | Robinson et al. |
| 8,855,972 B2 | 10/2014 | Bourgeois et al. |
| 10,022,950 B2 | 7/2018 | Deane et al. |
| 2005/0144183 A1 | 6/2005 | McQuown |
| 2006/0106475 A1 | 5/2006 | Mancuso et al. |
| 2007/0029382 A1 | 2/2007 | Baker et al. |
| 2008/0082427 A1 | 4/2008 | Gandhi et al. |
| 2008/0103876 A1 | 5/2008 | Armstrong et al. |
| 2012/0253874 A1 | 10/2012 | Harsh et al. |
| 2016/0069778 A1 | 3/2016 | Sahu |
| 2017/0160715 A1 | 6/2017 | De Boer |

\* cited by examiner

100 → HOSE COUPLING DETAILS
- 102 — CAT_ID_NO_20
- 104 — CPLNG_PART_NO
- 106 — CPLNG_TYP
- 108 — CPLNG_LGTH
- 110 — CPLNG_BND
- 112 — CUT_OFF_FCTR
- 114 — DRP_LGTH
- 116 — HOSE_TYP
- 118 — HEAD_SIZE
- 120 — THRD_SIZE
- 122 — THRD_DSH_SIZE
- 124 — PERM_CPLNG_IND
- 126 — REUSE_CPLNG_IND
- 128 — HOSE_INSD_DIA
- 130 — SEAL_PART_NO
- 132 — BOLT_HOLE_SPC1
- 134 — BOLT_HOLE_SPC2
- 136 — SRS_DESIG
- 138 — FLANGE_DASH_SIZE
- 140 — HOSE_DASH_SIZE
- 142 — BOLT_HOLE_DIA
- 144 — BACKUP_RING
- 146 — CNT_TYP
- 148 — CPLNG_FAM
- 150 — O_RING
- 152 — SEAT_ANG
- 154 — THRD_TYP
- 156 — THRD_ANG
- 158 — BULK_HEAD
- 160 — SWIVEL
- 162 — THRD_MIN_ID
- 164 — THRD_MAJ_OD
- 166 — HEAD_THICK
- 168 — TUBE_OD
- 170 — HEX_SIZE
- 172 — NUT_THICK
- 174 — THRD_LGTH
- 176 — MATING_PART
- 178 — SEAL_NUT_LGTH
- ⋮

*FIG. 3*

200 → BULK HOSE
- 202 — CAT_ID_NO_20
- 204 — BULK_PART_NO
- 206 — HOSE_TYP
- 208 — HOSE_INSD_DIA
- 210 — HOSE_OD
- 212 — MIN_BRST_PRESS
- 214 — MAX_WRK_PRESS
- 216 — MIN_BND_RAD
- 218 — LWST_TEMP
- 220 — MAX_TEMP
- 222 — HOSE_DASH_SIZE
- 224 — COVER_TYPE
- 226 — CONSTR_TYPE
- ⋮

*FIG. 4*

300 → HOSE CROSS-REFERENCE
- 302 — CAT_ID_NO_20
- 304 — HOSE_TYP
- 306 — HOSE_DASH_SIZE
- 308 — SPEC_TYP
- 310 — SPEC_NO
- 312 — DIN_HOSE_TYP
- ⋮

*FIG. 5*

| | | | |
|---|---|---|---|
| 700 | HOSE ASSEMBLY BUILD | 802 | ETHD_1_CPLNG_FAM |
| 702 | HOSE_ASSM_ID | 804 | ETHD_2_CPLNG_FAM |
| 704 | HOSE_TYP | 806 | ETHD_1_CNT_TYP |
| 706 | HOSE_INSD_DIA | 808 | ETHD_2_CNT_TYP |
| 708 | BULK_PART_NO | 810 | ETHD_1_THRD_MAJ_OD |
| 710 | HOSE_CUT_LGTH_1 | 812 | ETHD_2_THRD_MAJ_OD |
| 712 | REUSE_CPLNG_1 | 814 | ETHD_1_BULK_HEAD |
| 714 | REUSE_CPLNG_2 | 816 | ETHD_2_BULK_HEAD |
| 716 | REUSE_CPLNG_IND | 818 | ETHD_1_CPLNG_BND |
| 718 | REUSE_CPLNG_QTY | 820 | ETHD_2_CPLNG_BND |
| 720 | SLVE_PART_NO | 822 | ETHD_1_SWIVEL |
| 722 | SLVE_QTY | 824 | ETHD_2_SWIVEL |
| 724 | PERM_CPLNG_1 | 826 | ETHD_1_SEAT_ANG |
| 726 | PERM_CPLNG_2 | 828 | ETHD_2_SEAT_ANG |
| 728 | PERM_CPLNG_IND | 830 | ETHD_1_THRD_SIZE |
| 730 | PERM_CPLNG_QTY | 832 | ETHD_2_THRD_SIZE |
| 732 | HOSE_SEAL_1 | 834 | ETHD_1_THRD_ANG |
| 734 | HOSE_SEAL_2 | 836 | ETHD_2_THRD_ANG |
| 736 | SEAL_QTY | 838 | ETHD_1_THRD_LGTH |
| 738 | ANG_ORIENT_1 | 840 | ETHD_2_THRD_LGTH |
| 740 | ARMR_GRD_PART_NO | 842 | ETHD_1_TUBE_OD |
| 742 | ARMR_LGTH_1 | 844 | ETHD_2_TUBE_OD |
| 744 | ARMR_LGTH_2 | 846 | ITHD_1_CPLNG_FAM |
| 746 | ARMR_LGTH_3 | 848 | ITHD_2_CPLNG_FAM |
| 748 | ARMR_LGTH_4 | 850 | ITHD_1_SEAT_ANG |
| 750 | RMR_GUARD_MATL | 852 | ITHD_2_SEAT_ANG |
| 752 | HOSE_ASSM_LGTH | 854 | ITHD_1_THRD_MIN_ID |
| 754 | UPDT_ID | 856 | ITHD_2_THRD_MIN_ID |
| 756 | FIRST_NAME | 858 | ITHD_1_CPLNG_BND |
| 758 | LAST_NAME | 860 | ITHD_2_CPLNG_BND |
| 760 | EMAIL_ADDR | 862 | ITHD_1_O_RING |
| 762 | LAST_UPDT_DT | 864 | ITHD_2_O_RING |
| 764 | DLR_CODE | 866 | ITHD_1_TUBE_OD |
| 766 | DLR_NAME | 868 | ITHD_2_TUBE_OD |
| 768 | MKT_ORG_ABR_NM | 870 | ITHD_1_HEX_SIZE |
| 770 | LAY_VIS | 872 | ITHD_2_HEX_SIZE |
| 772 | SPEC_TYP | 874 | ITHD_1_NUT_THICK |
| 774 | SPEC_NO | 876 | ITHD_2_NUT_THICK |
| 776 | DIN_HOSE_TYP | 878 | ITHD_1_SEAL_NUT_LGTH |
| 778 | HOSE_DASH_SIZE | 880 | ITHD_2_SEAL_NUT_LGTH |
| 780 | FUEL_HOSE_IND | 882 | ITHD_1_MATING_PART |
| 782 | COVER_TYPE | 884 | ITHD_2_MATING_PART |
| 784 | CONSTR_TYPE | 886 | UM_ABR |
| 786 | CPLNG_1_THRD_TYP | 888 | CMNT_TXT_1 |
| 788 | CPLNG_2_THRD_TYP | 890 | NCAT_MACH_OEM |
| 790 | FLG_1_HEAD_SIZE | 892 | NCAT_SLS_MDL |
| 792 | FLG_2_HEAD_SIZE | 894 | NCAT_HOSE_PART_NO |
| 794 | FLG_1_HEAD_THK | 896 | NCAT_MACH_SER_NO |
| 796 | FLG_2_HEAD_THK | | ● |
| 798 | FLG_1_CPLNG_BND | | ● |
| 800 | FLG_2_CPLNG_BND | | ● |

HOSE ASSEMBLY BUILDER TOOL

TECHNICAL FIELD

The present disclosure relates generally to hose assemblies, and, more specifically, to methods and an apparatus for building hose assemblies.

BACKGROUND

Operation of a conventional worksite, such as a construction site, agriculture site, or mine may involve maintaining a fleet of vehicles and/or work machines. Often, the fleet is mixed, or comprised of various makes and models of work machines having different manufacturers. Failure of a work machine at a worksite slows productivity while the work machine is repaired, or a replacement work machine is found. Even failure of a single vehicle at a worksite can disrupt a project timeline, resulting in additional labor and site costs.

A typical work machine has numerous hose assemblies, including fuel lines, hydraulic fluid lines, air lines, water lines, and more. Failure of even a single component of any hose assembly can cause failure of the entire work machine. Due to the conditions of the worksite, as well as general wear and tear, failure of hose assemblies is a common issue at worksites. As such, work machine dealers, service technicians, and others who service mixed fleets must be prepared to service or repair hose assemblies in a timely manner and for any vehicle manufacturer. Maintaining a full inventory of hose assembly parts for every manufacturer in the fleet, however, is neither practical nor cost efficient. Likewise, maintaining a small inventory and having to order replacement parts from specific manufacturers, as needed, is unsuited for urgent repairs, and may result in a loss of business to the dealer.

Instead, it is common practice for dealers, service technicians, and others who service mixed fleets to substitute a hose assembly manufactured by one vendor or manufacturer with a hose assembly manufactured by a different vendor or manufacturer, depending on available inventory. Inexperienced dealers and technicians may struggle to correctly interpret and cross-reference components of different manufacturers, resulting in installation of incompatible components. Mixing and matching components of hose assemblies can result in failure of the hose assembly and cause other systemic damage.

Various systems exist to assist service technicians in diagnosing, maintaining and repairing work machines. For example, U.S. Pat. Pub. No. 2005/0144183 describes a system that assists a locomotive technician in determining the nature and extent of service and repairs needed on a specified portion of locomotive equipment. The system maintains information specific to each particular locomotive, and guides the technician through a series of troubleshooting prompts to identify replacement parts or upgrades for that specific locomotive. The technician may then order the identified replacement part from a supplier using the system. However, because locomotives are typically customized for a particular application or customer, the technician must first be able to identify the specific equipment, model and manufacturer of the locomotive to be serviced, among other details.

There is consequently a need for a system that guides a service technician, regardless of his or her level of expertise, through a series of instructions and queries to correctly identify specific features of a first manufacturer hose assembly, which are used by the system to not only identify a functional replacement comprised of hose assembly components of a second manufacturer, but also provide savable consist and build instructions.

SUMMARY

In accordance with one aspect of the present disclosure, a system for replacing an original hose assembly of a work machine is disclosed. The original hose assembly may include an original hose and an original coupling. The system may comprise a computing device, a database, and a server associated with the database. A processor on the server may be configured to perform a method of identifying a replacement hose assembly. The method may comprise prompting a user, via the computing device, to select a plurality of hose attributes associated with the original hose of the work machine. Based on the selected plurality of hose attributes, a replacement hose may be identified that has each of the plurality of hose attributes. Next, the method may comprise prompting the user, via the computing device, to select a plurality of coupling attributes associated with the original coupling of the work machine. Based on the selected plurality of hose attributes and the selected plurality of coupling attributes, a replacement coupling having each of the plurality of coupling attributes and that is compatible with the identified replacement hose may be identified. Further, the method may include generating a bill of materials for the replacement hose assembly based on the identified replacement hose and the identified replacement coupling, and displaying the bill of materials.

In accordance with another aspect of the present disclosure, a method of replacing an original hose assembly of a work machine with a replacement hose assembly is disclosed. The original hose assembly may include an original hose and an original coupling, and the replacement hose assembly may include a replacement hose and a replacement coupling. The method may comprise obtaining a hose data set having at least one record corresponding to a hose and including a plurality of hose attributes, with one of the plurality of hose attributes corresponding to a hose type classification, and obtaining a coupling data set having at least one record corresponding to a coupling and including a plurality of coupling attributes, with one of the plurality of coupling attributes corresponding to the hose type classification of a hose compatible with the coupling. The method further includes guiding a user, via a computing device, through a series of prompts to identify a plurality of hose attributes associated with the original hose. The method further includes filtering the hose data set using the identified plurality of hose attributes associated with the original hose to obtain a set of replacement hose data. The method further includes displaying the set of replacement hose data to the user via the computing device. Additionally, the method includes selecting, by the user, the replacement hose from the replacement hose data set, and filtering the coupling data set using the hose type attribute associated with the selected replacement hose to obtain a replacement coupling data set. Continuing, the method includes guiding the user, via the computing device, through a second series of prompts to identify a plurality of coupling attributes associated with the original coupling. The method further includes filtering the replacement coupling data set using the identified plurality of coupling attributes associated with the original coupling to obtain an updated replacement coupling data set. The method further includes displaying the set of updated replacement coupling data to the user via the computing device, and selecting, by the user, the replacement coupling from the updated replacement coupling data set. Finally, the method includes generating a bill of materials for the replacement hose assembly based on the selected replacement hose and the selected replacement coupling, and displaying the bill of materials.

In accordance with yet another embodiment of the present invention, a method of building an original hose assembly of a work machine with a replacement hose assembly is disclosed. The original hose assembly includes an original hose and an original coupling, and the replacement hose assembly includes a replacement hose and a replacement coupling. The method may include prompting a user, via a computing device, to enter a hose assembly length of the original hose assembly. The method includes prompting the user, via the computing device, to select a plurality of hose attributes associated with the original hose of the original hose assembly. The method includes identifying, based on the selected hose attributes, a replacement hose having attributes equivalent to each of the selected hose attributes. The method further includes prompting the user, via the computing device, to select a plurality of coupling attributes associated with the original coupling of the original hose assembly. The method includes identifying, based on the selected hose attributes and the selected coupling attributes, a replacement coupling having attributes equivalent to each of the selected coupling attributes. The method further includes calculating a hose cut length based on the hose assembly length and a cut off factor associated with the replacement coupling. The method includes generating a bill of materials identifying assembly build components of the replacement hose assembly, the bill of materials further identifying the hose cut length. The method further includes obtaining, from a present inventory of the user, the assembly build components; cutting the replacement hose to a length equivalent to the hose cut length; and building the replacement hose assembly using the assembly build components.

These and other aspects and features of the present disclosure will be better understood upon reading the following detailed description, when taken in conjunction with the accompanying drawings.

BRIEF DESCRIPTION OF THE DRAWINGS

FIG. 3 is an exemplary database table representing hose coupling details in accordance with the present invention;

FIG. 4 is an exemplary database table representing bulk hose information in accordance with the present invention;

FIG. 5 is an exemplary database table representing hose cross-reference information in accordance with the present invention;

FIG. 9 is an exemplary database table representing hose assembly build information in accordance with the present invention;

FIG. 57 is a user interface for a hose assembly build information screen of the hose assembly builder tool in accordance with the present invention;

FIG. 58 is a user interface for a hose assembly report screen of the hose assembly builder tool in accordance with the present invention;

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
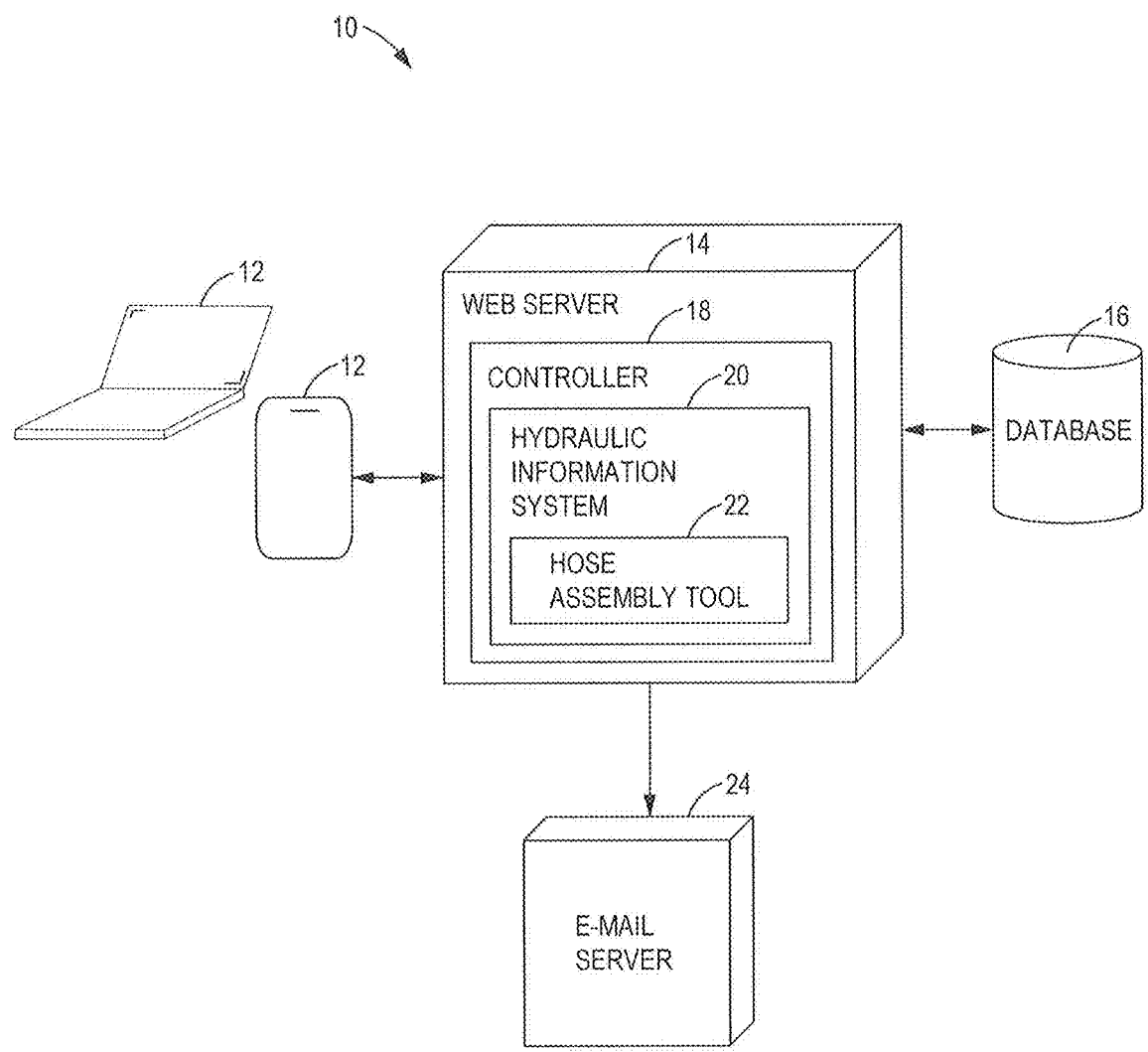
FIG. 1 is a diagrammatic view of a system having a hose assembly builder tool arranged in accordance with the present invention.

An embodiment of a system 10 that is suitable for practicing the preferred embodiment of the hose assembly builder tool of the present invention is shown in a simplified diagram in FIG. 1. In one embodiment, the system 10 includes one or more user devices 12 coupled to a web server 14 using a network. The present web server 14 is also associated with one or more relational, object-oriented, or other appropriate databases 16. In one embodiment, the data stored in the database 16 may be organized according to the table structure illustrated in FIGS. 3-9. Although described as a database, any appropriate data storage device, structure, or technique may be used, and reference to database 16 is meant to encompass all such alternatives. The system 10 also includes an e-mail server 24 in communication with user device 12 via the web server 14.

The present network may be implemented as a wired communication network, a wireless communication network or a combination thereof. Each user device 12 may be a desktop computer, laptop, mobile device, smartphone, tablet, or similar device. Each user device 12 preferably includes an electronic display, an input device (i.e., keyboard, mouse and/or touch screen display), and a web browser coupled to the network. The web server 14 may communicate data, via the network, to the web browser installed on each user device 12, for example, in the form of Hypertext Markup Language (HTML) pages using Hypertext Transfer Protocol (HTTP), Secure HTTP (HTTPS), or any other suitable protocol. The web server 14 may include a controller 18, such as a servlet, for receiving data communicated from the user device 12, dynamically generating a response (typically by querying the database 16 to fulfill the request), and then sending the response containing an HTML or XML document back to the user device 12. The controller 18 includes a Hose Assembly Builder Tool module 22, which is a part of a broader Hydraulic Information System module 20. It will be understood that the arrangement of grouped code or logic instructions shown in FIG. 1 merely demonstrates one way to implement the functions of the system 10, and that other arrangements will be apparent to those of ordinary skill in the art.

Figure 2:
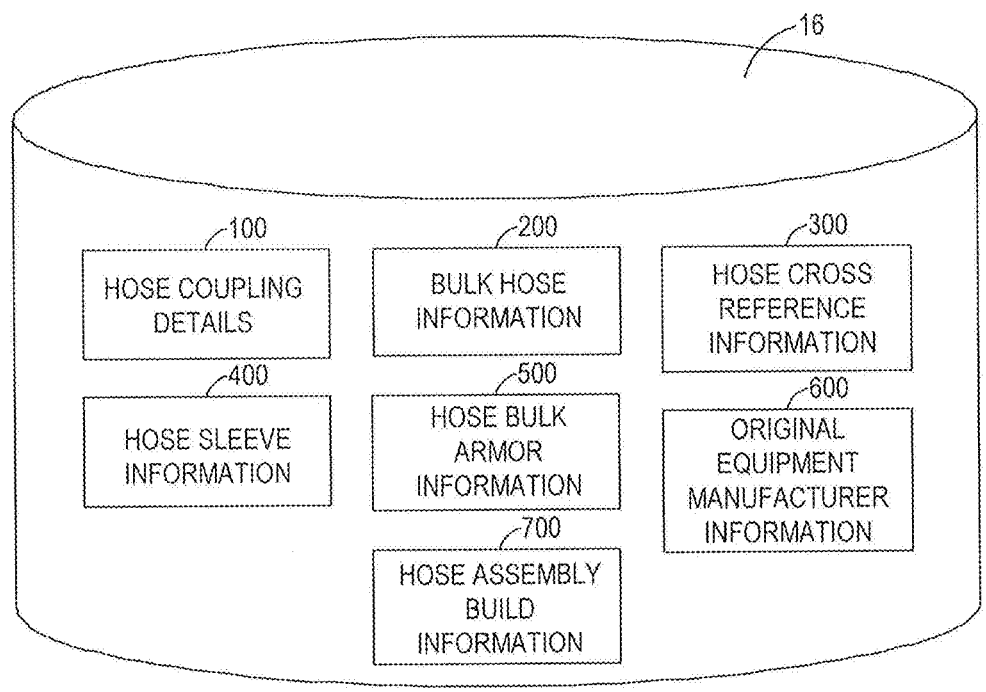
FIG. 2 is a representation of exemplary information stored in a database of the present system.

FIG. 2 shows a representation of information stored in the database 16. The database 16 may include, among other things, a number of tables containing data related to hose assemblies and components thereof manufactured by a first manufacturer, which, for example, may be Caterpillar Inc. As used herein, "component" may refer to any portion into which the hose assembly is divided, including, but not limited to, bulk hoses, couplings, sleeves, armor guards, nuts, adapters, flange protectors, and others. The data tables may include a hose coupling details table 100, a bulk hose information table 200, a hose cross-reference information table 300, a hose sleeve information table 400, a hose bulk armor information table 500, an original equipment manufacturer information table 600, and a hose assembly build table 700.

The hose coupling details table 100 may include, among other things, information related to one or more hose assembly components. Specifically, the hose coupling details table 100 may provide data related to one or more couplings manufactured by a first manufacturer for use in work machine hose assemblies. As shown in FIG. 3, for example, the hose coupling details table 100 may have attributes or fields corresponding to general identification information such as a unique alpha numeric identification number (CAT_ID_NO_20) 102, a unique coupling alpha numeric part number (CPLNG_PART_NO) 104, a connection type (CNT_TYP) 146, and a coupling type (CPLNG_TYP) 106 and a coupling family (CPLNG_FAM) 148 each correspond to strings of characters describing the particular type of coupling (e.g. male or female) and its family (e.g. female swivel or male cone). The hose coupling details table 100 may also include a field indicating a part service level (PART_SVC_LVL) 180, which may be comprised of a numerical value indicating the service level priority of the part. A value of 4, for example, may indicate the part is discontinued, while a value of 1 may indicate the part is currently manufactured and has the highest priority of service. The table 100 may also include fields indicating whether a coupling is a permanent coupling (PERM_CPLNG_IND) 124 or a reusable coupling (REUSE_CPLNG_IND) 126. In addition, a field indicating the coupling cut off factor (CUT_OFF_FCTR) 112 may be included in the hose coupling details table 100, as this numerical value is important to dealers and service technicians in calculating what length of hose should be cut. A hose assembly system has an overall assembly length, but to calculate the length of hose that should be cut, the cut off factor of any couplings must be subtracted. By maintaining this factor for each coupling, the system 10 can automatically calculate the hose cut length (HOSE_CUT_LGTH_1) 910 (shown in FIG. 9).

More specific information may also be provided in the hose coupling details table 100 that enables the system 10 to identify whether a specific coupling is suited for use in a particular environment. These fields may include a coupling bend angle (CPLNG_BND) 110, a head size of a flange-type coupling (HEAD_SIZE) 118, a head thickness of a flange-type coupling (HEAD_THICK) 166, a thread size (THRD_SIZE) 120, an O-ring indicator (O_RING) 150, a seat angle (SEAT_ANG) 152, a thread type (THRD_TYP) 154 (e.g. internal or external), a thread angle (THRD_ANG) 156, a bulk head indicator (BULK_HEAD) 158, a swivel indicator (SWIVEL) 160, a thread minimum inside diameter (THRD_MIN_ID) 162, a thread major outside diameter (THRD_MAJ_OD) 164, a thread length (THRD_LGTH) 174, and seal nut length (SEAL_NUT_LGTH) 178.

The hose coupling details table 100 may also contain information relevant to related components of couplings. For example, a field for size of a hexagonal nut (HEX_SIZE) 170 may be included, as well as a nut thickness (NUT_THICK) 172, a seal part number (SEAL_PART_NO) 130, and a related or mating part number (MATING_PART) 176 may be included as well. Other fields that may be included in the hose coupling details table 100 may include a coupling length (CPLNG_LGTH) 108 identifying the total length of the coupling, a thread dash size (THRD_DSH_SIZE) 122, a drop length (DRP_LGTH) 114, a first bolt hole specification value (BOLT_HOLE_SPC1) 132, a second bolt hole specification value (BOLT_HOLE_SPC2) 134, a series design (SRS_DESIG) 136, a flange dash size (FLANGE_DASH_SIZE) 138, a bolt hole diameter (BOLT_HOLE_DIA) 142, and a backup ring indicator (BACKUP_RING) 144.

Finally, the hose coupling details table 100 contains information related to compatible hose types. Specifically, each entry in the hose coupling details table 100 may include information relating to a compatible type of hose (HOSE_TYP) 116. If, for example, a particular coupling part number (CPLNG_PART_NO) 104 is compatible with two different hose types, then the hose coupling details table 100 may include two separate entries with the same coupling part number, with each entry specifying a different hose type in the HOSE_TYP field. Other information associated with compatible hoses may also be provided, including a hose inside diameter (HOSE_INSD_DIA) 128, a tube outside diameter (TUBE_OD) 168, and a hose dash size (HOSE_DASH_SIZE) 140.

Bulk hose information table 200 may include, among other things, information related to one or more bulk hoses. Specifically, the bulk hose information table 200 may provide data related to one or more bulk hose products manufactured by the first manufacturer for use in work machine hose assemblies. As shown in FIG. 4, for example, the bulk hose information table 200 may have attributes or fields corresponding to a unique alpha numeric identification number (CAT_ID_NO_20) 202, a unique bulk hose alpha numeric part number (BULK_PART_NO) 204, a hose type classification value (HOSE_TYP) 206, an inside diameter measurement of the hose (HOSE_INSD_DIA) 208, an outside diameter measurement of the hose (HOSE_OD) 210, a hose dash size (HOSE_DASH_SIZE) 222, a type of hose cover (COVER_TYPE) 224 (e.g. a steel braid cover or a fabric/textile cover), and a hose construction type (CONSTR_TYPE) 226 that may correspond to a description of an arrangement of wire fibers within a hose wall (e.g. six layer spiral, four layer spiral or textile reinforced). The table 200 may also include a field indicating a part service level (PART_SVC_LVL) 228, which may be comprised of a numerical value indicating the service level priority of the part. A value of 4, for example, may indicate the part is discontinued, while a value of 1 may indicate the part is currently manufactured and has the highest priority of service.

The bulk hose information table also includes a set of fields indicating work environment restrictions. These fields include, a minimum pressure value that, if exceeded, may cause the hose to burst (MIN_BRST_PRESS) 212, a maximum recommended working pressure (MAX_WORK_PRESS) 214, a minimum bend radius (MIN_BND_RAD) 216 indicating a minimum radius a hose can bend without kinking or sustaining other types of damage, a lowest recommended operating temperature (LWST_TEMP) 218, and a maximum recommended operating temperature (MAX_TEMP) 220.

A hose cross-reference table 300 enables the system 10 to associate hoses manufactured by the first manufacturer with industry standard data. For example, as shown in FIG. 5, the hose cross-reference table 300 may include, among other things, general attributes or fields corresponding to a unique alpha numeric identification number (CAT_ID_NO_20) 302, a hose type classification value (HOSE_TYP) 304, and a hose dash size (HOSE_DASH_SIZE) 306. The hose cross-reference table may also include an industry standard field code (SPEC_TYP) 308 and an industry standard specification number (SPEC_NO) 310. Industry standard field codes and specification numbers are used to identify products that meet varying technical standard requirements. Typical examples of industry standard field codes may include European Standards (EN), the International Organization for Standardization (ISO), Japanese Industrial Standards (JIS), the Society of Automotive Engineers (SAE) and the German Institute for Standardization (DIN). Hoses that comply with one or more of these standards may include at least one industry standard field code 308 and specification number 310 on a layline of the hose. Hoses that comply with DIN specifications include an additional field specifying an industry standard specification type (DIN_HOSE_TYP) 312.

Figure 6:
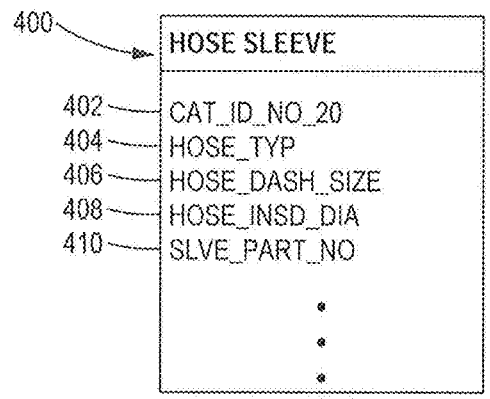
FIG. 6 is an exemplary database table representing hose sleeve information in accordance with the present invention.

The database 16 of the present system 10 further includes a hose sleeve information table 400, which may include, among other things, data related to reusable couplings. Reusable couplings may comprise a two-part system including a sleeve and the coupling. In the event of hose failure, the coupling and sleeve may be removed and reused. As shown in FIG. 6, for example, the hose sleeve information table 400 may have attributes or fields corresponding to a unique alpha numeric identification number (CAT_ID_NO_20) 402, a hose type classification value (HOSE_TYP) 404, an inside diameter measurement of the hose (HOSE_INSD_DIA) 408, a hose dash size (HOSE_DASH_SIZE) 406, and a unique alpha numeric sleeve part number (SLVE_PART_NO) 410.

Figure 7:
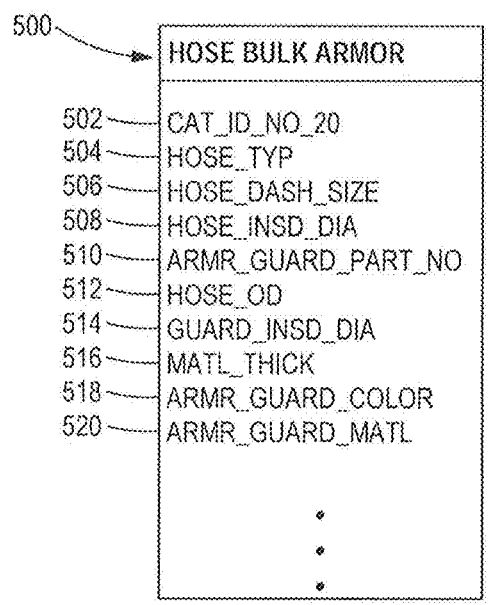
FIG. 7 is an exemplary database table representing hose bulk armor information in accordance with the present invention.

Operating a work machine is rugged operating conditions can leave hose assemblies susceptible to the elements. To protect a hose from debris and caustic fluids like gasoline, a hose armor guard may be used. Certain types of hose armor guards may be more suited to certain environments than others. A nylon abrasive sleeving, for example, may protect exposed hoses from debris and scuffing, while a fire sleeving guard may be flame resistant and best suited for high temperature operating conditions. As such, database 16 of the present system 10 includes a hose bulk armor information table 500, which may include, among other things, data related to armor guards for hose assemblies. As shown in FIG. 7, for example, the hose bulk armor information table 500 may have attributes or fields corresponding to a unique alpha numeric identification number (CAT_ID_NO_20) 502, a hose type classification value (HOSE_TYP) 504, a hose dash size (HOSE_DASH_SIZE) 506, an inside diameter measurement of the hose (HOSE_INSD_DIA) 508, and an outside diameter measurement of the hose (HOSE_OD) 512. Specific to the armor guard associated with a hose assembly, the hose bulk armor information table 500 also maintains attributes corresponding to a unique alpha numeric armor guard part number (ARMR_GUARD_PART_NO) 510, an inside diameter of the armor guard (GUARD_INSD_DIA) 514, a material thickness value (MATL_THICK) 516 corresponding to a number indicating the thickness of the material of the armor guard, an armor guard color (ARMR_GUARD_COLOR) 518, and an armor guard material (ARMR_GUARD_MATL) 520 corresponding to a description of the armor guard material (e.g. heavy-duty plastic, metal, or fire resistant).

Figure 8:
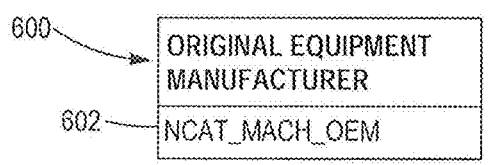
FIG. 8 is an exemplary database table representing original equipment manufacturer information in accordance with the present invention.

Finally, according to a preferred embodiment of the invention, and as discussed in more detail below with reference to FIGS. 8 and 9, the database 16 of the system 10 may maintain two additional tables, an original equipment manufacturer (OEM) information table 600 and a hose assembly build table 700. Briefly, the OEM information table 600, as shown in FIG. 8, may include a field corresponding to a name of a machine OEM (NCAT_MACH_OEM) 602. Similarly, the hose assembly build table 700, as shown in FIG. 9, may include a number of fields utilized by the system 10 for storing data generated by both a user of the system, as well as the system itself, for example, in calculating the hose cut length (HOSE_CUT_LGTH_1) 710. The information stored in both the OEM information table 600 and the hose assembly build table 700 is displayed to the user in the form of a bill of materials, after the user has completed each of the steps of the hose assembly builder tool.

INDUSTRIAL APPLICABILITY

The method and system in this disclosure may provide a hose assembly builder tool for use by dealers, service technicians, and persons who manage or service a mixed fleet of vehicles, among others. In particular, the disclosed hose assembly builder tool may be used to build a hose assembly from component parts manufactured by the first manufacturer (e.g. bulk hose, coupling, seals, armor, sleeves, etc.), based on information, provided by the user, related to a hose assembly of a second manufacturer. The hose assembly builder tool may be used dealers or service technicians having varying levels of expertise in the hydraulics field. As such, the tool not only provides clear step-by-step instructions for obtaining information used by the system, but also utilizes strategic filtering procedures to ensure entry of accurate data and, consequently, an accurate hose assembly build. In this manner, both product sales and customer satisfaction may be improved.

Figure 10:
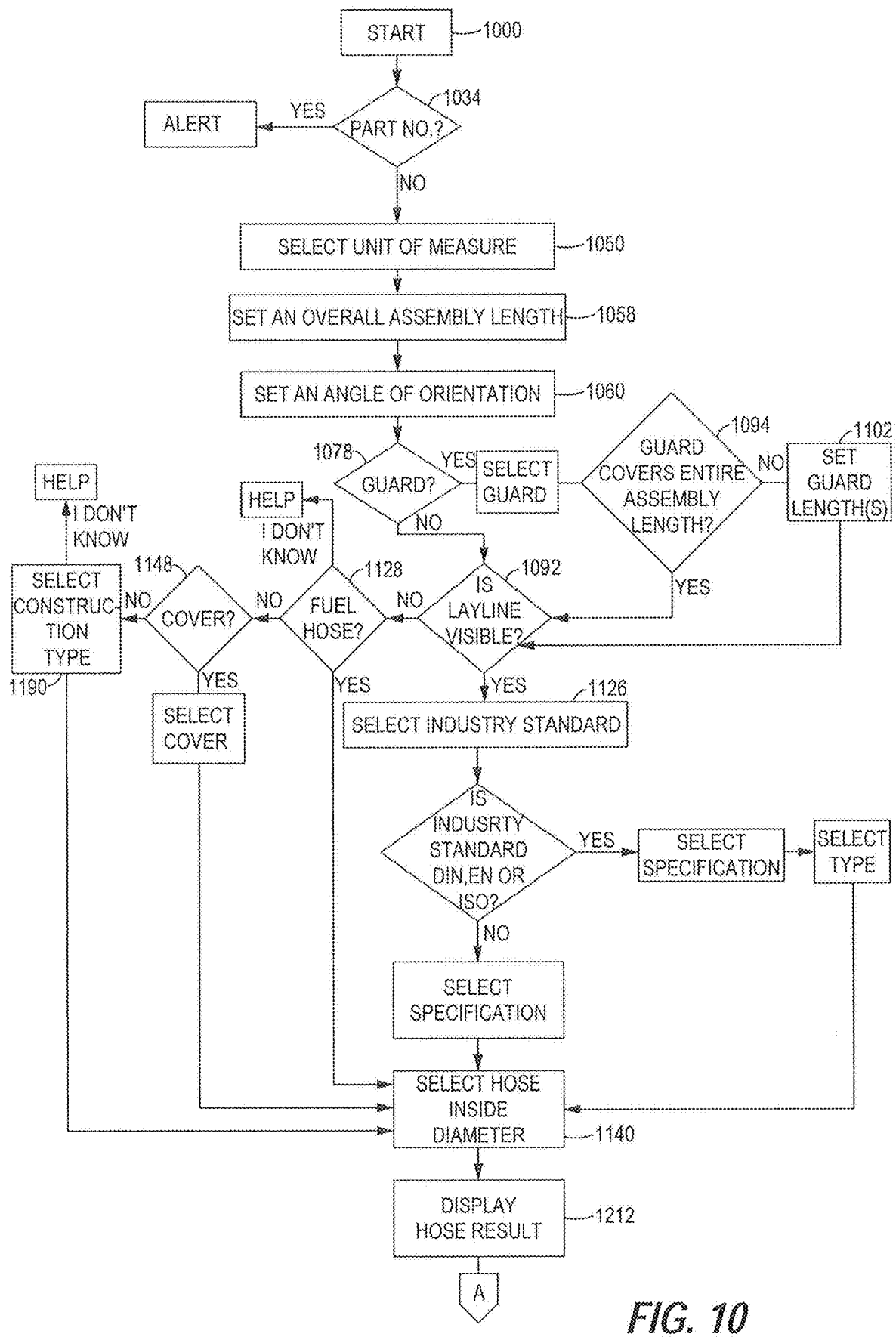
FIG. 10 is a flowchart depicting a hose selection process in accordance with the present invention.

FIGS. 10-14 illustrate a series of steps of the hose assembly builder tool. In one embodiment, as shown in FIG. 10, the hose assembly builder tool may prompt the user for information related to a hose of a hose assembly manufactured by a second manufacturer. Once the system has identified a hose manufactured by the first manufacturer from the second manufacturer's hose information provided by the user, the hose assembly builder tool may prompt the user for information related to a coupling of the hose assembly of the second manufacturer, as shown in FIGS. 11-14. FIGS. 15-61 are exemplary screen captures of a user interface of the hose assembly builder tool. In one aspect, the user interface of this disclosure may be web-based. For example, with reference to FIG. 1, the web server 14 may operate the hose assembly builder tool module 22 using the controller 18 to allow the user interfaces to operate in conjunction with the database 16. The hose assembly builder tool module 22 may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any user device 12 running a common web browser (e.g., Internet Explorer™, Firefox™ Chrome™, Safari™ or the like) may render the hose assembly tool executable.

Figure 15:
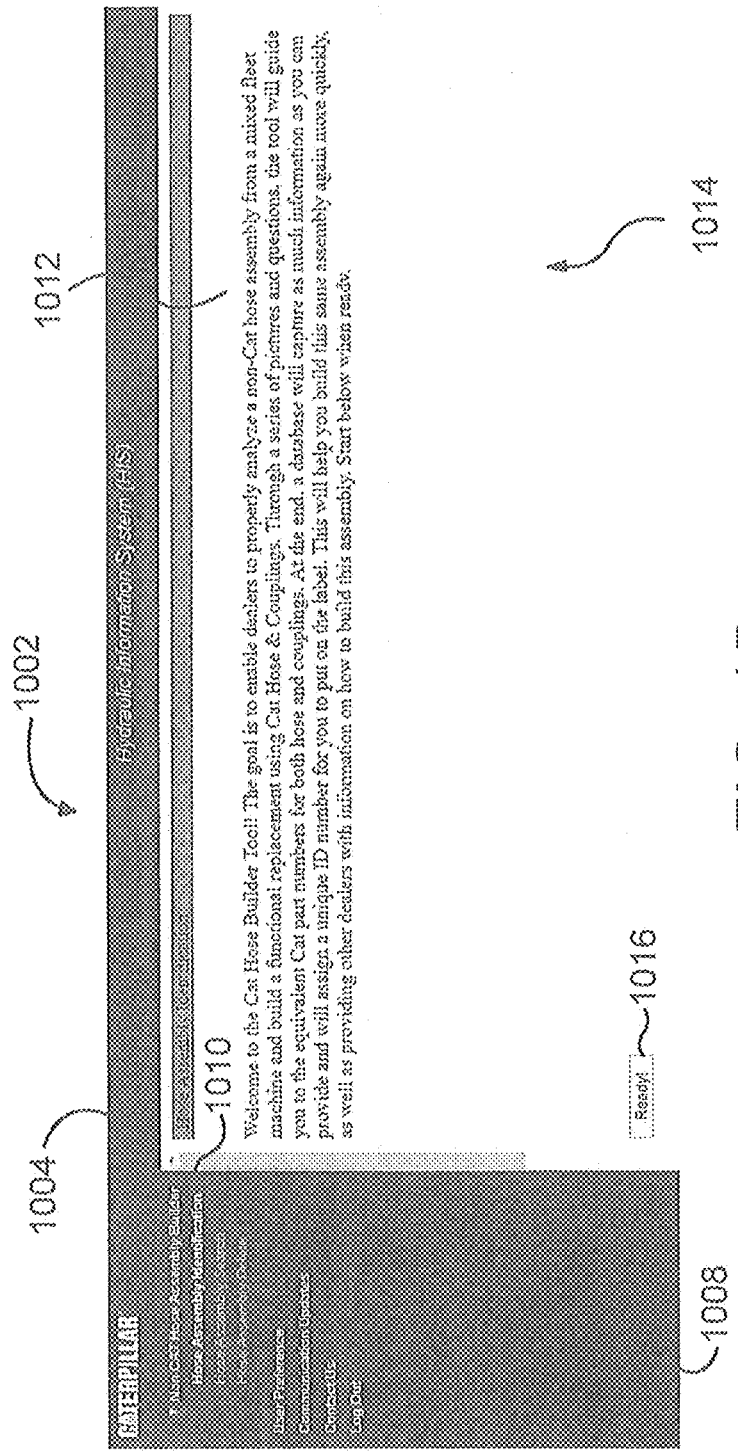
FIG. 15 is a user interface for a welcome screen of the hose assembly builder tool in accordance with the present invention.

As illustrated in FIG. 10, a preliminary step 1000 in the hose assembly builder tool may include providing the user with an introduction to the hose assembly builder tool. The step may comprise one or more informational interface screens. One interface screen associated with this step 1000 is illustrated in FIG. 15. Beginning with FIG. 15, a welcome screen 1002 of the hose assembly builder tool may be displayed and populated with information introducing the user to the hose assembly builder tool. Generally, the user interface layout may include a Hydraulic Information System frame 1004 with a plurality of links arranged in a side panel 1008. The plurality of links may include a Hose Assembly Identification link 1010, which the user may click in order to access the hose assembly builder tool. The user interface layout may further include a main panel 1012, in which the hose assembly builder tool prompts may be displayed. The welcome screen 1002 of the hose assembly builder tool includes welcome information 1014, as well as a button 1016, which a user may select to continue to the next page.

Figure 16:
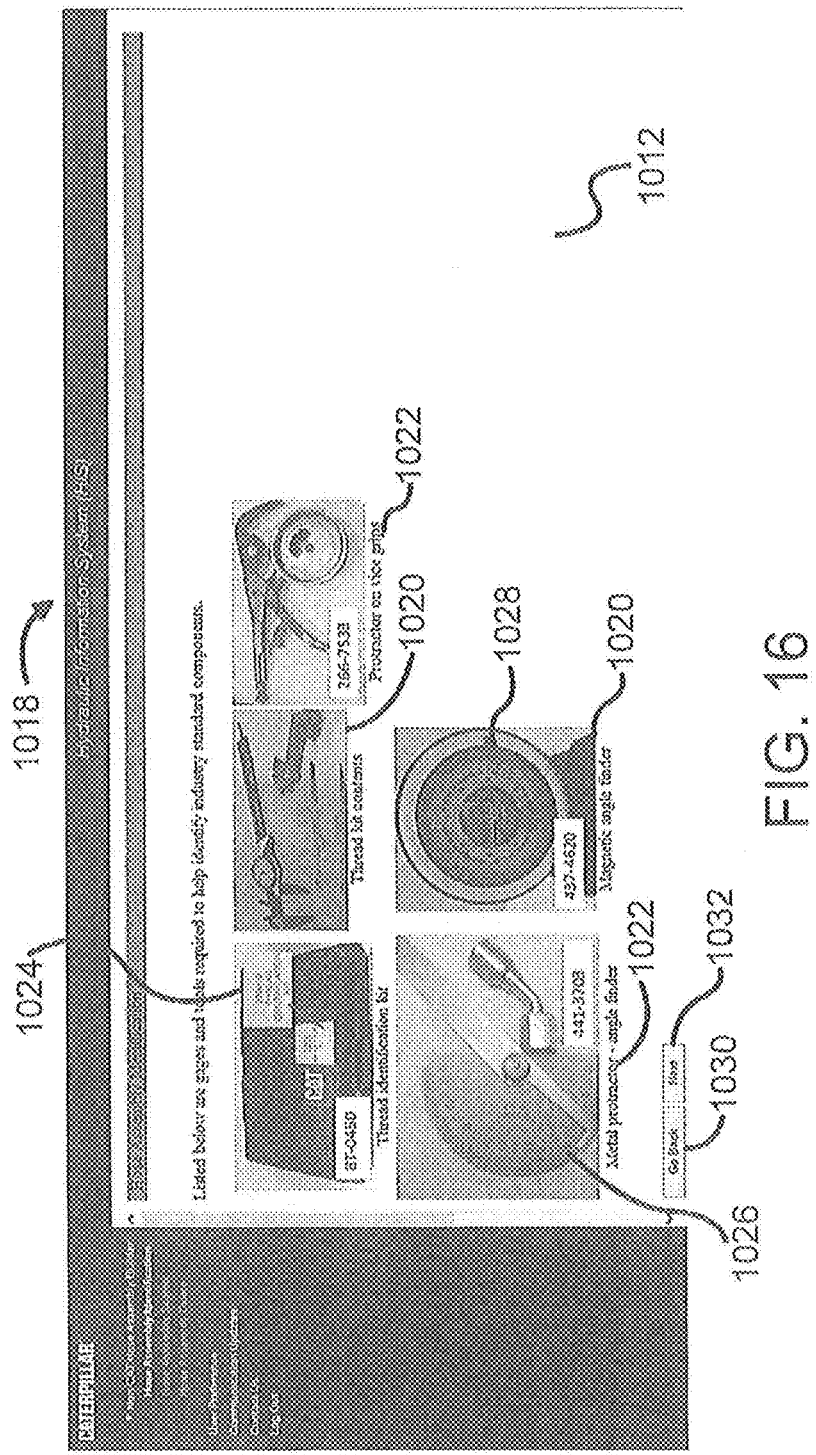
FIG. 16 is a user interface for a tool information screen of the hose assembly builder tool in accordance with the present invention.

The preliminary step 1000 may also include providing the user with a list of gauges and other tools that may be helpful in obtaining information from the hose assembly of the second manufacturer. This portion of step 1000 is illustrated by FIG. 16, which displays a tool information screen 1018. The tool information screen 1018 may display images 1020 and descriptions 1022 of gauges and tools to help identify components of the second manufacturer's hose assembly. For example, a thread identification kit 1024 may be necessary to measure and identify a coupling type, and a protractor 1026 or magnetic angle finder 1028 may be necessary to measure a coupling angle. The tool information screen 1018 may also include a button 1030, which the user may select to go back to the immediately previous page (here, for example, the welcome screen 1002) and a button 1032, which a user may select to move to the next page.

Figure 17:
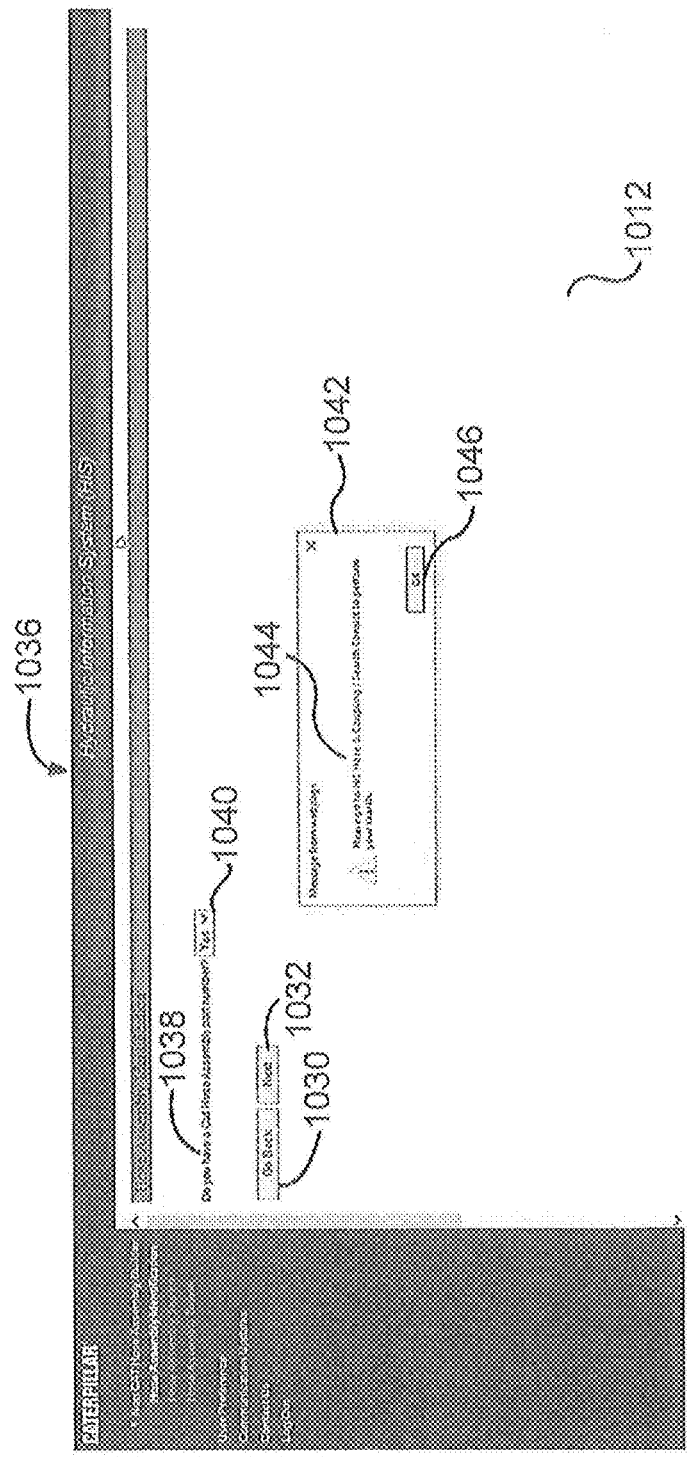
FIG. 17 is a user interface for a hose assembly part number screen of the hose assembly builder tool in accordance with the present invention.

Referring back to FIG. 10, the hose assembly builder tool may prompt the user as to whether or not they already have a part number of the first manufacturer (step 1034). This step 1034 may check to see whether or not the user has already completed a build in the hose assembly builder tool. If the user has already identified a part number, then they may perform a search using a Hydraulic Information System Hose & Coupling Search/Consist feature, which allows the user to search a part number of the first manufacturer to retrieve a bill of materials for that part number. If the user does not have a part number of the first manufacturer, then they may choose to continue through the system. The interface screen related to step 1034 is illustrated at FIG. 17, which depicts a part number inquiry screen 1036.

The main panel 1012 of the part number inquiry screen 1036 may include an inquiry 1038 as to whether or not the user possesses the first manufacturer's part number, along with a drop-down menu 1040 with values for the user to select in response to the inquiry. In this example, the values for response may include "Yes" and "No," although other values may be used depending, for example, on the wording of the inquiry 1038. The part number inquiry screen 1036 may also include the button 1030, which the user may select to go back to the immediately previous page (here, for example, the tool information screen 1018) and the button 1032, which a user may select to move to the next page. Depending on the user's response to the inquiry 1038, the hose assembly builder tool may respond differently. If the user indicates they do not have a part number of the first manufacturer (in this example, by selecting "No" from the drop-down menu), and then selects the "Next" button 1032, the user will be directed to the next page. If, however, the user indicates they do have a part number of the first manufacturer (in this example, by selecting "Yes" from the drop-down menu), and then selects the "Next" button 1032, the hose assembly builder tool may launch a pop-up screen 1042 to display an alert 1044. The alert 1044 may indicate that the user may use their part number to perform a search using the Hydraulic Information System Hose & Coupling Search/Consist feature. The user may close the pop-up screen 1042 using a button 1046, which may return the user to the part number inquiry screen 1036. The user may then access the Hydraulic Information System Hose & Coupling Search/Consist feature at a link 1048 located in the side panel 1008.

Figure 18:
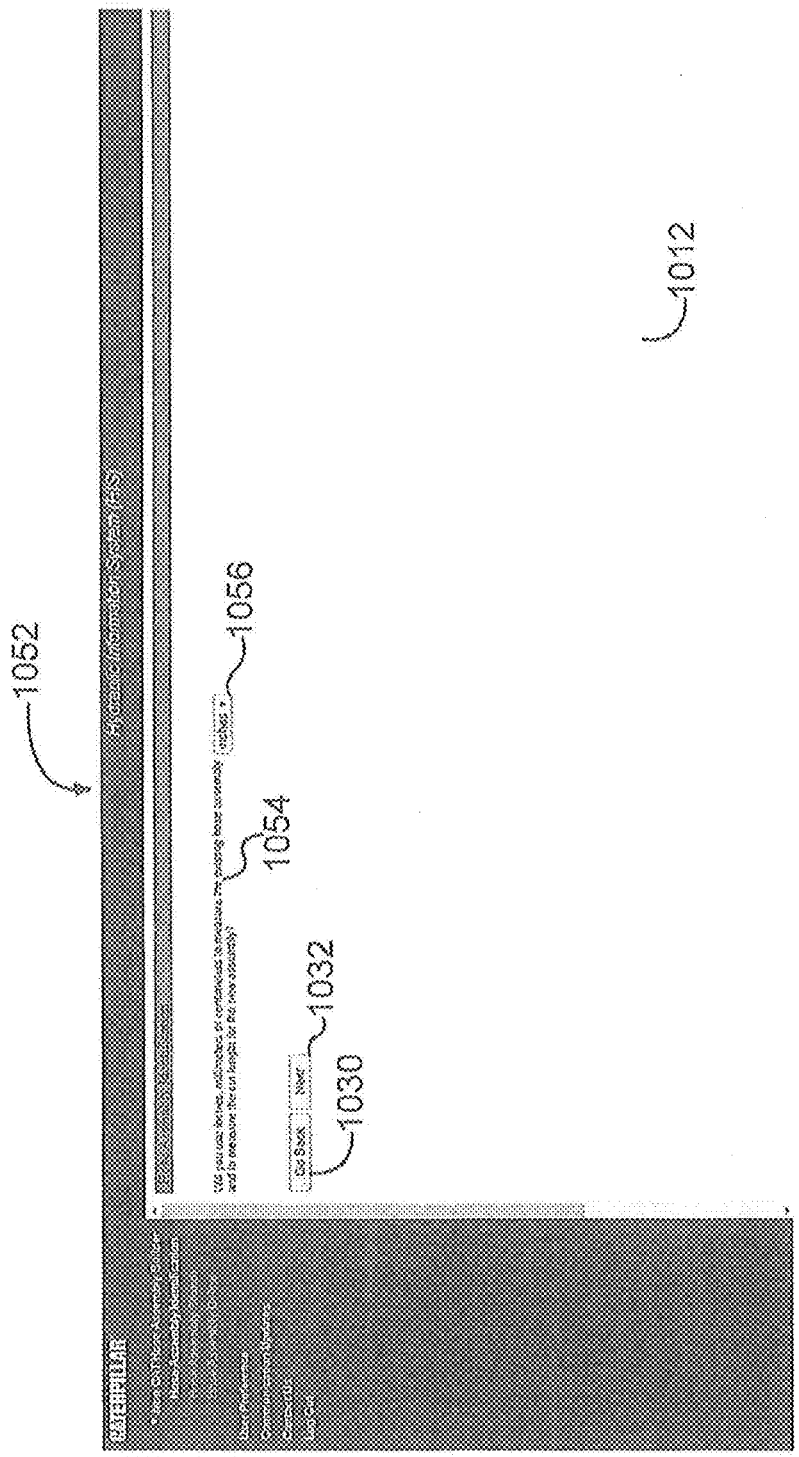
FIG. 18 is a user interface for a unit of measure preference screen of the hose assembly builder tool in accordance with the present invention.

Referring again to FIG. 10, at step 1050 the hose assembly builder tool may prompt the user as to a unit of measure preference. This step 1050 not only allows the user to specify the unit of measure he or she will use when entering measurements to the hose assembly builder tool, but also informs the hose assembly builder tool the specific unit of measure it should use to display measurement values. The interface screen related to step 1050 is illustrated at FIG. 18, which depicts a unit of measure preference screen 1052.

The main panel 1012 of the unit of measure preference screen 1052 may include an inquiry 1054 as to which unit of measure the user will use to measure the second manufacturer's hose assembly and to measure the resulting built hose assembly, along with a drop-down menu 1056 with values for the user to select in response to the inquiry. In this example, the values for response may include "inches," "mm," and "cm," although other values may be used. Once the user selects the unit of measure from the drop-down menu and selects the "Next" button 1032, the unit of measure will be stored, and the user will be directed to the next page. The unit of measure value may be stored in the hose assembly build table 700 (FIG. 9) at a unit of measure abbreviation (UM_ABR) 886 field, for future reference by the hose assembly builder tool.

Figure 19:
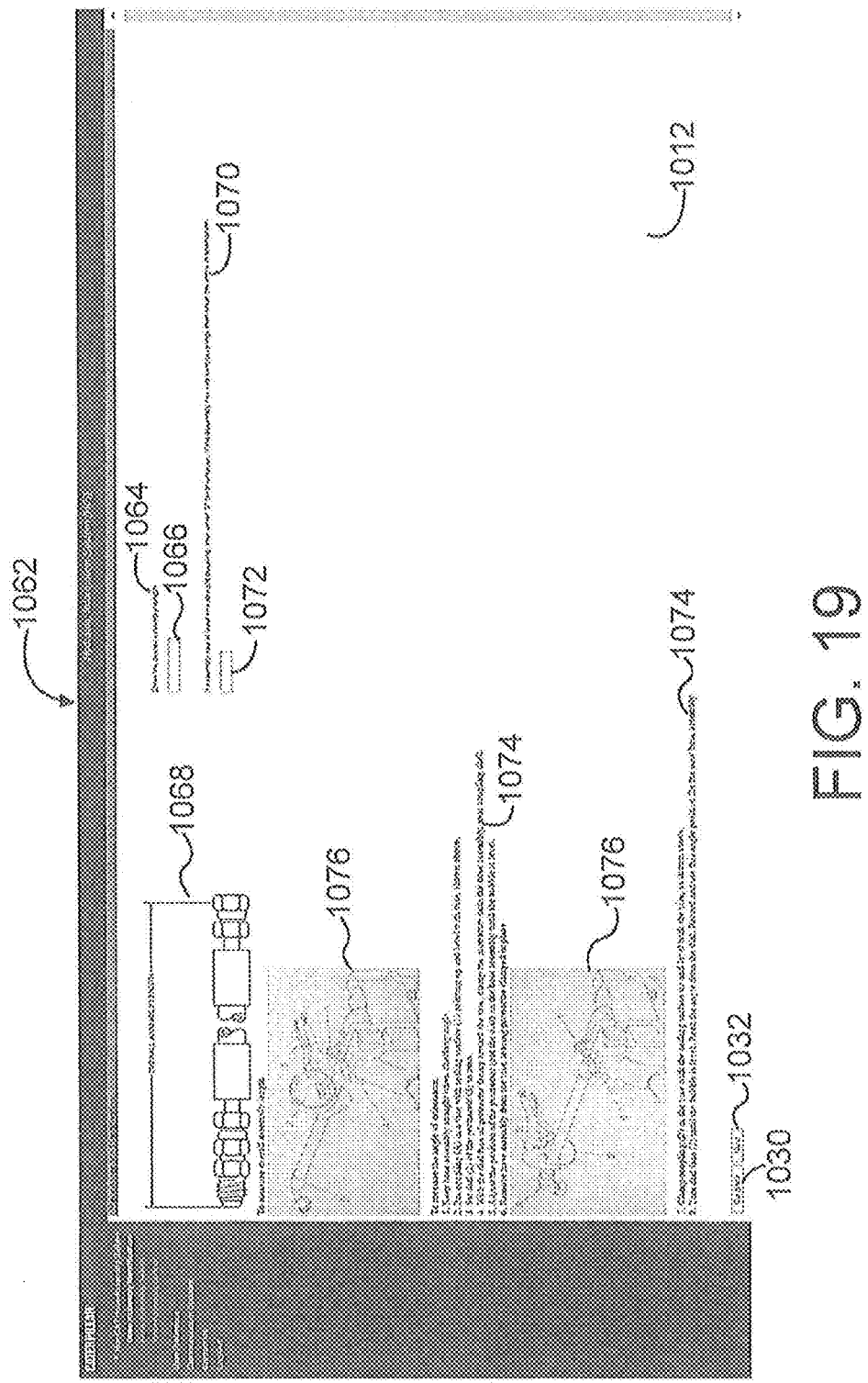
FIG. 19 is a user interface for a standard assembly information screen of the hose assembly builder tool in accordance with the present invention.

At step 1058 (FIG. 10) the hose assembly builder tool may prompt the user as to an overall assembly length of the second manufacturer's hose assembly, and at step 1060 the hose assembly builder tool may prompt the user as to an angle of orientation of the couplings of the second manufacturer's hose assembly. Step 1058 and step 1060 are illustrated by FIG. 19, which displays a standard assembly information screen 1062. The standard assembly information screen 1062 may include a direction 1064 prompting the user to enter an overall length of the second manufacturer's hose assembly, and a text box 1066 for the user to enter the value of the overall length of the second manufacturer's hose assembly. The standard assembly information screen 1062 may display instructions 1068 illustrating to the user how to measure the overall assembly length of the second manufacturer's hose assembly. The instructions 1068 may be in the form of text or images, and may portray to the user, for example, that the overall assembly length measurement should include not just a hose portion of a hose assembly, but the couplings as well. Once the user has followed the instructions 1068, he or she may enter the value of the overall assembly length in the text box 1066. The hose assembly builder tool stored the user's preferred unit of measure (UM_ABR) 886 in previous step 1050, so the user need not specify that in this step 1058.

The standard assembly information screen 1062 may also include a direction 1070 prompting the user to enter an angle of orientation of the second manufacturer's couplings, and a text box 1072 for the user to enter the value of the angle of orientation. The standard assembly information screen 1062 may display instructions 1074 and images 1076 illustrating to the user how to measure the angle of orientation of the second manufacturer's couplings. Once the user has followed the instructions 1074, he or she may enter the value of the angle of orientation of the couplings of the second manufacturer's hose assembly in the text box 1072.

Once the user enters the overall assembly length in text box 1066 and the angle of orientation in the text box 1072, and selects the "Next" button 1032, the overall assembly length and the angle of orientation will be stored, and the user will be directed to the next page. The overall assembly length and the angle of orientation values may be stored in the hose assembly build table 700 (FIG. 9) at a hose assembly length (HOSE_ASSM_LGTH) 752 field and an angle of orientation (ANG_ORIENT_1) 738 field, for future reference by the hose assembly builder tool.

Figure 20:
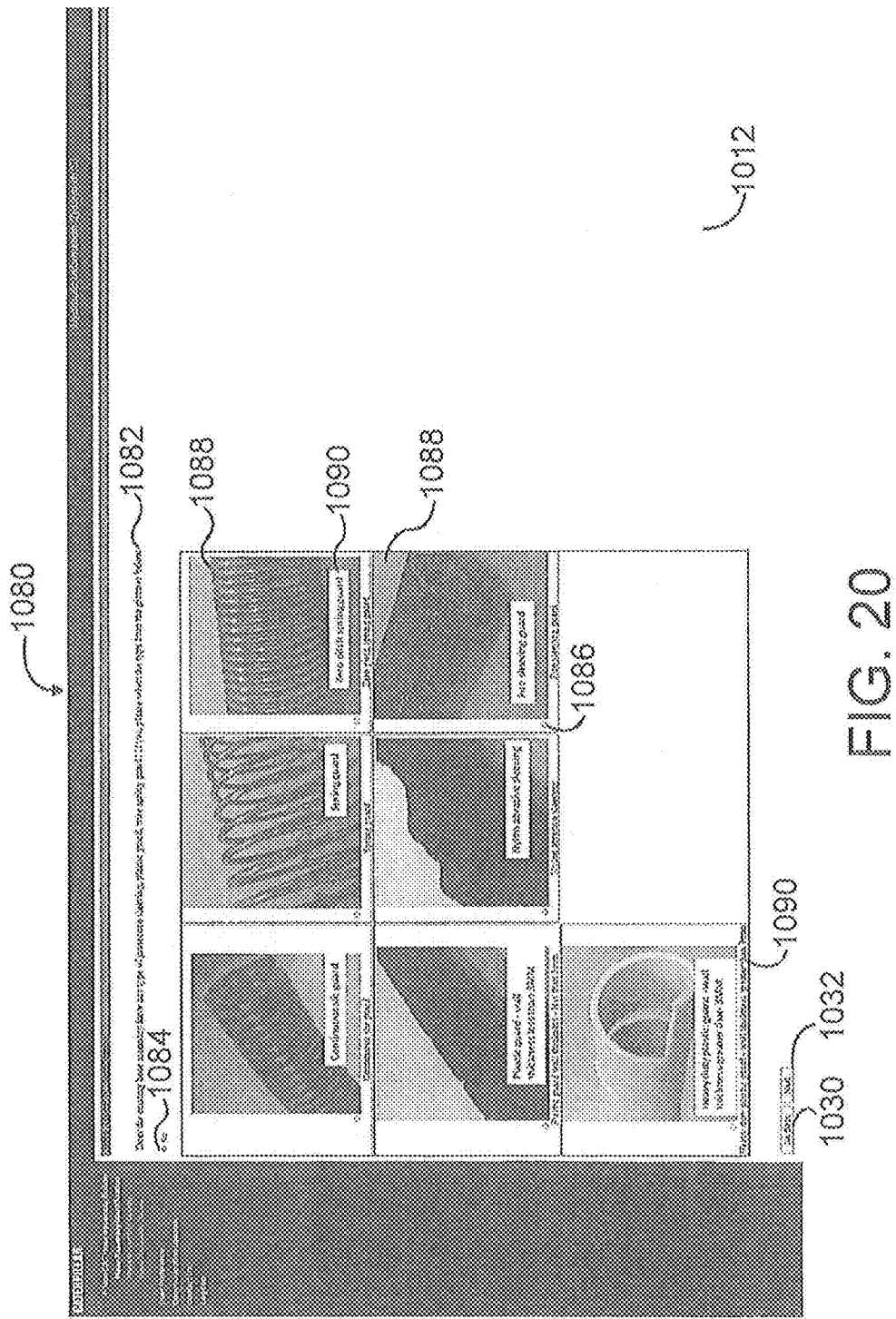
FIG. 20 is a user interface for a hose guard selection screen of the hose assembly builder tool in accordance with the present invention.

Referring back to FIG. 10, at step 1078 the hose assembly builder tool may prompt the user regarding the existence of any protective sleeving or guard surrounding the hose of the second manufacturer's hose assembly. If, for example, the second manufacturer's hose includes a protective sleeve or guard, the user may also select the type of hose guard installed. Step 1078 is illustrated by FIG. 20, which displays a hose guard selection screen 1080.

The hose guard selection screen 1080 may include the main panel 1012, as well as an inquiry 1082 as to whether or not the second manufacturer's hose assembly has any type of protective sleeving or guard. If the second manufacturer's hose assembly does not have any protective sleeving or guard, the user may select an option 1084 indicating as such. In this example, the option 1084 may have a "No" value. If the second manufacturer's hose assembly has a protective sleeving or guard, the user may select the type of guard from a set of options 1086. Each guard type may be displayed with an image 1088 of the guard and a description 1090 of the guard, so the user may easily identify what type of guard the second manufacturer's hose assembly uses. In this example, values for response may include "Continuous slit guard," "Spring guard," "Zero pitch spring guard," "Plastic guard—wall thickness less than 3 mm," "Nylon abrasive sleeving," "Fire sleeving guard," and "Heavy duty plastic guard—wall thickness greater than 3 mm" although other values may be used.

Depending on the user's response to the inquiry 1082, the hose assembly builder tool may respond differently. If the user indicates the second manufacturer's hose assembly does not have any protective sleeve or guard (in this example, by selecting the "No" option 1084), and then selects the "Next" button 1032, the user will be directed to step 1092 to determine the presence of a layline. If, however, the user indicates the second manufacturer's hose assembly has a protective sleeve or guard (in this example, by selecting one of the guard type options 1086), and then selects the "Next" button 1032, the user will be directed to an intermediate step 1094 to determine the length of the protective sleeve or guard. If the user indicates the second manufacturer's hose assembly does not have any protective sleeve or guard, then no values are stored in the hose assembly build table 700 (FIG. 9) at an armor guard part number (ARMR_GRD_PART_NO) 740 field, an armor guard material (ARMR_GUARD_MATL) 750 field, or armor length fields (ARMR_LGTH_1) 742, (ARMR_LGTH_2) 744, (ARMR_LGTH_3) 746, and (ARMR_LGTH_4) 748. If the user selects one of the guard type option 1086, then the material of the guard type selected may be stored in the hose assembly build table 700 (FIG. 9) at the armor guard material (ARMR_GUARD_MATL) 750 field, for future reference by the hose assembly tool.

Figure 21:
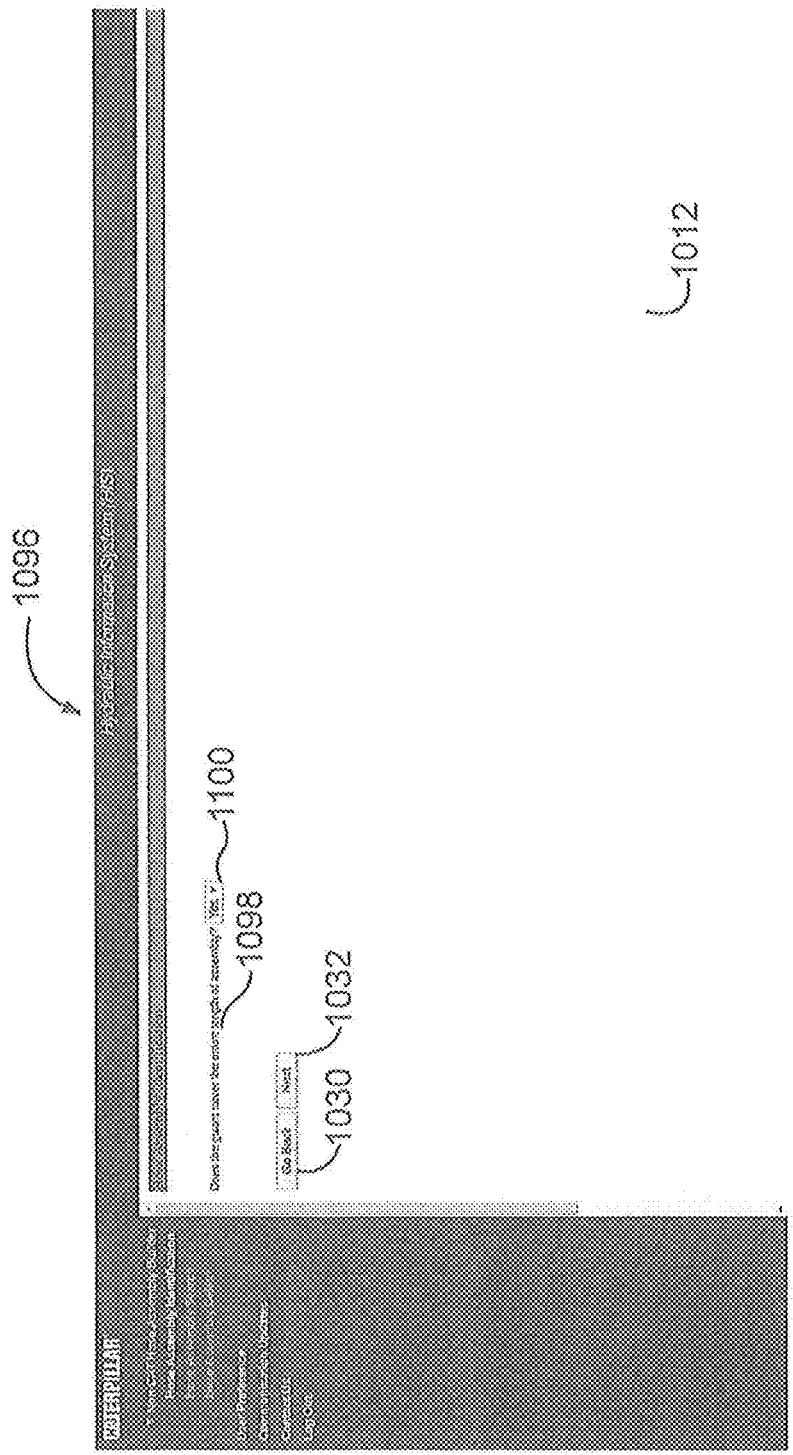
FIGS. 21-22 are user interfaces for hose guard length screens of the hose assembly builder tool in accordance with the present invention.

At step 1094 (FIG. 10) the hose assembly builder tool may prompt the user as whether the hose guard selected in step 1078 covers the entire length of the second manufacturer's hose assembly. Hose guards may not always be a single piece. For example, depending on a variety of factors, such as whether the hose turns or bends, the angle at which the hose turns or bends, and proximity of equipment and moving parts, the guard may be installed in multiple pieces, and may not cover the entire length of the hose. The interface screen related to step 1094 is illustrated at FIG. 21, which depicts a hose length indicator screen 1096.

The main panel 1012 of the hose length indicator screen 1096 may include an inquiry 1098 as to whether or not the guard selected by the user in step 1078 cover the entire length of the hose assembly, along with a drop-down menu 1100 with values for the user to select in response to the inquiry. In this example, the values for response may include "Yes" and "No," although other values may be used depending, for example, on the wording of the inquiry 1098. Depending on the user's response to the inquiry 1098, the hose assembly builder tool may respond differently. If the user indicates the guard covers the entire length of the hose assembly (in this example, by selecting "Yes" from the drop-down menu), and then selects the "Next" button 1032, the user will be directed to step 1092 to determine the presence of a layline. In this scenario, the length of the guard may be determined to equal the overall assembly length, and the value stored in the hose assembly length (HOSE_ASSM_LGTH) 752 field may be stored in the hose assembly build table 700 (FIG. 9) at the armor guard length (ARMR_LGTH_1) 742 field, for future reference by the hose assembly tool. The remaining armor guard length fields may remain empty. If, instead, the user indicates the guard does not cover the entire length of the hose assembly (in this example, by selecting "No" from the drop-down menu), and then selects the "Next" button 1032, the user will be directed to step 1102 (FIG. 10) to specify the length of the hose assembly. In this scenario, no data is stored in the hose assembly build table 700 (FIG. 9).

Figure 22:
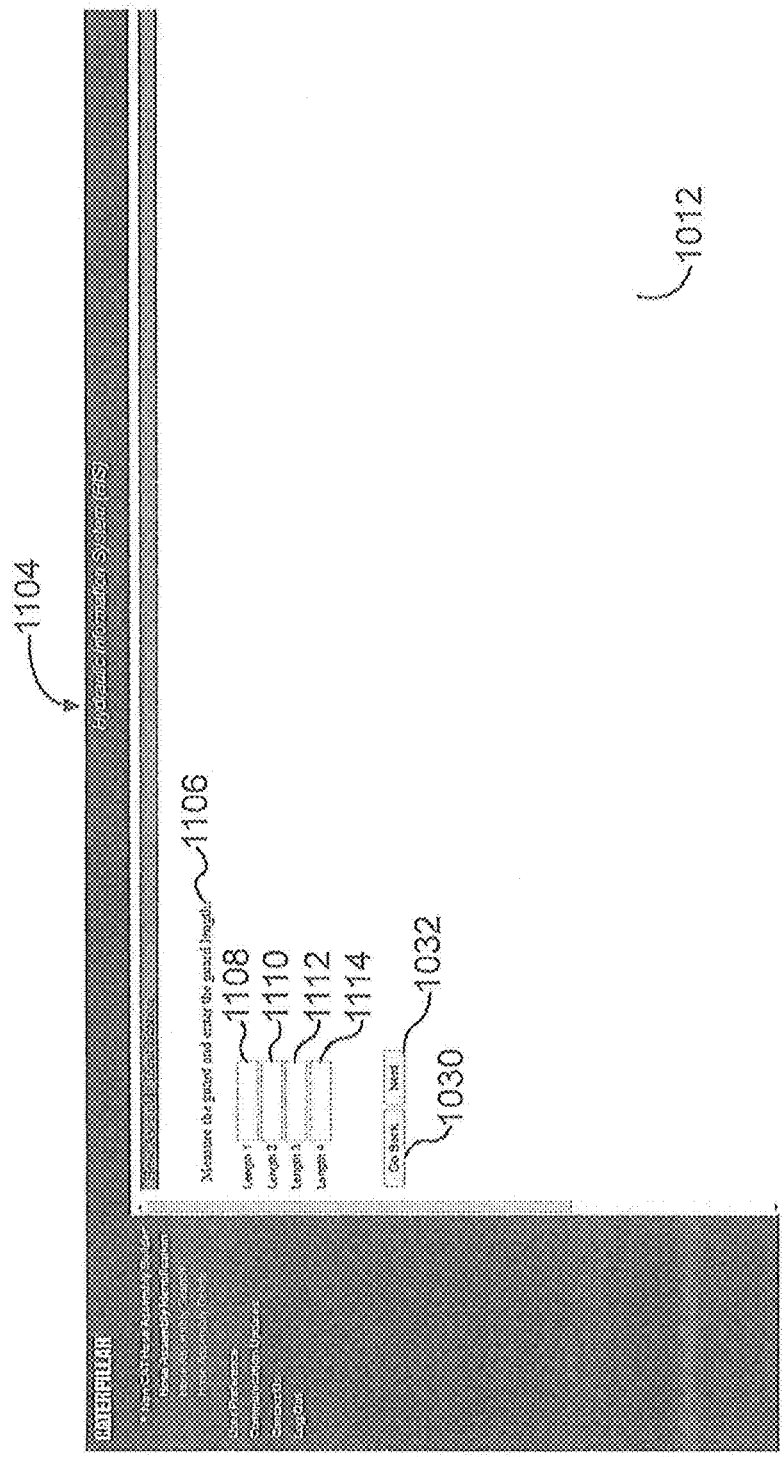

At step 1102 (FIG. 10) the hose assembly builder tool may prompt the user to enter a guard length of the second manufacturer's hose assembly. Step 1102 is illustrated by FIG. 22, which displays a guard length specification screen 1104. The guard length specification screen 1104 may include a direction 1106 prompting the user to measure a first guard length in a first text box 1108, a second guard length in a second text box 1110, a third guard length in a third text box 1112, and a fourth guard length in a fourth text box 1114. Once the user has measured the guard length or guard lengths, he or she may enter the values in the text boxes 1108, 1110, 1112, 1114. The hose assembly builder tool stored the user's preferred unit of measure (UM_ABR) 886 in previous step 1050, so the user need not specify the unit of measure in this step 1102. In addition, while the hose assembly builder tool provides a user with four text boxes 1108, 1110, 1112, 1114, the user may enter between one and four values, depending on the number of guard sections present in the second manufacturer's hose assembly.

Once the user enters the values corresponding to the length of each section of hose guard, and selects the "Next" button 1032, the length of each guard section will be stored, and the user will be directed to the next step 1092. The length of each guard section may be stored in the hose assembly build table 700 (FIG. 9). Specifically, the value entered in the text box 1108 corresponding to "Length 1" may be stored in the armor guard length 1 (ARMR_LGTH_1) 742 field, the value entered in the text box 1110 corresponding to "Length 2" may be stored in the armor guard length 2 (ARMR_LGTH_2) 744 field, the value entered in the text box 1112 corresponding to "Length 3" may be stored in the armor guard length 3 (ARMR_LGTH_3) 746 field, and the value entered in the text box 1114 corresponding to "Length 4" may be stored in the armor guard length 4 (ARMR_LGTH_4) 748 field, for future reference by the hose assembly builder tool.

Figure 23:
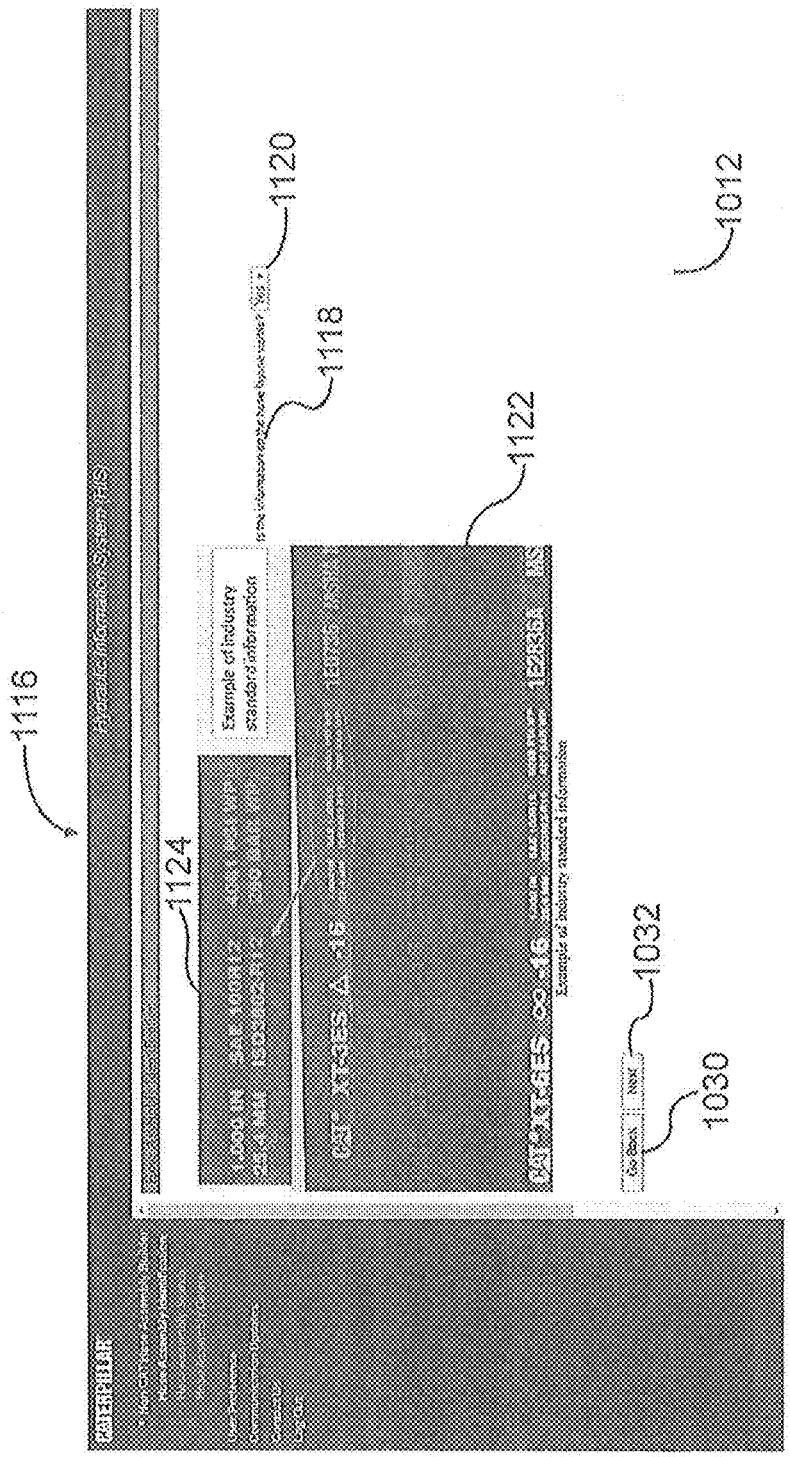
FIG. 23 is a user interface for indicating layline visibility in the hose assembly builder tool in accordance with the present invention.

Referring back to FIG. 10, the hose assembly builder tool may prompt the user as to whether or not the information on the second manufacturer's hose layline is visible (step 1092). A hose layline is a line of printed information that extends the length of the hose, and may contain information about the hose's properties, including the size, working pressure, industry standard, among other information. Step 1092 may check to see whether or not the information on the layline is visible to the user. If the layline information is visible to the user, then the user may be prompted in a further step to enter the industry standard information visible on the layline. If the layline information is not visible, then the hose assembly builder tool will walk the user through a series of instructions to determine the type of hose of the second manufacturer's hose assembly. The interface screen related to step 1092 is illustrated at FIG. 23, which depicts a layline visibility screen 1116.

The main panel 1012 of the layline visibility screen 1116 may include an inquiry 1118 as to whether or not the information on the second manufacturer's hose layline is visible, along with a drop-down menu 1120 with values for the user to select in response to the inquiry. In this example, the values for response may include "Yes" and "No," although other values may be used depending, for example, on the wording of the inquiry 1118. The layline visibility screen 1116 may display instructions 1122 illustrating to the user how to identify the layline information, and may include an example of industry standard information that may be visible on the layline. The instructions 1122 may be in the form of text or images, or other format. In this instance, the instructions 1122 include an image of three hoses of the first manufacturer with visible layline information. The industry standard information has been highlighted and shown in an enlarged image 1124 to ensure a user may be able to identify the information on the second manufacturer's hose layline, and easily determine if the layline is visible.

Depending on the user's response to the inquiry 1118, the hose assembly builder tool may respond differently. If the user indicates the hose layline is visible (in this example, by selecting "Yes" from the drop-down menu), and then selects the "Next" button 1032, the user may be directed to the next step 1126 to enter the industry standard information that is visible on the layline of the second manufacturer's hoes. If, instead, the user indicates the hose layline is not visible (in this example, by selecting "No" from the drop-down menu), and then selects the "Next" button 1032, the user may be directed to intermediate step 1128 to determine a type of hose using physical characteristics of the hose itself. Once the user selects the whether the hose layline is visible from the drop-down menu and selects the "Next" button 1032, a hose layline visibility indicator will be stored. The hose layline visibility indicator value may be stored in the hose assembly build table 700 (FIG. 9) at a layline visibility (LAY_VIS) 770 field, for future reference by the hose assembly builder tool.

Figure 24:
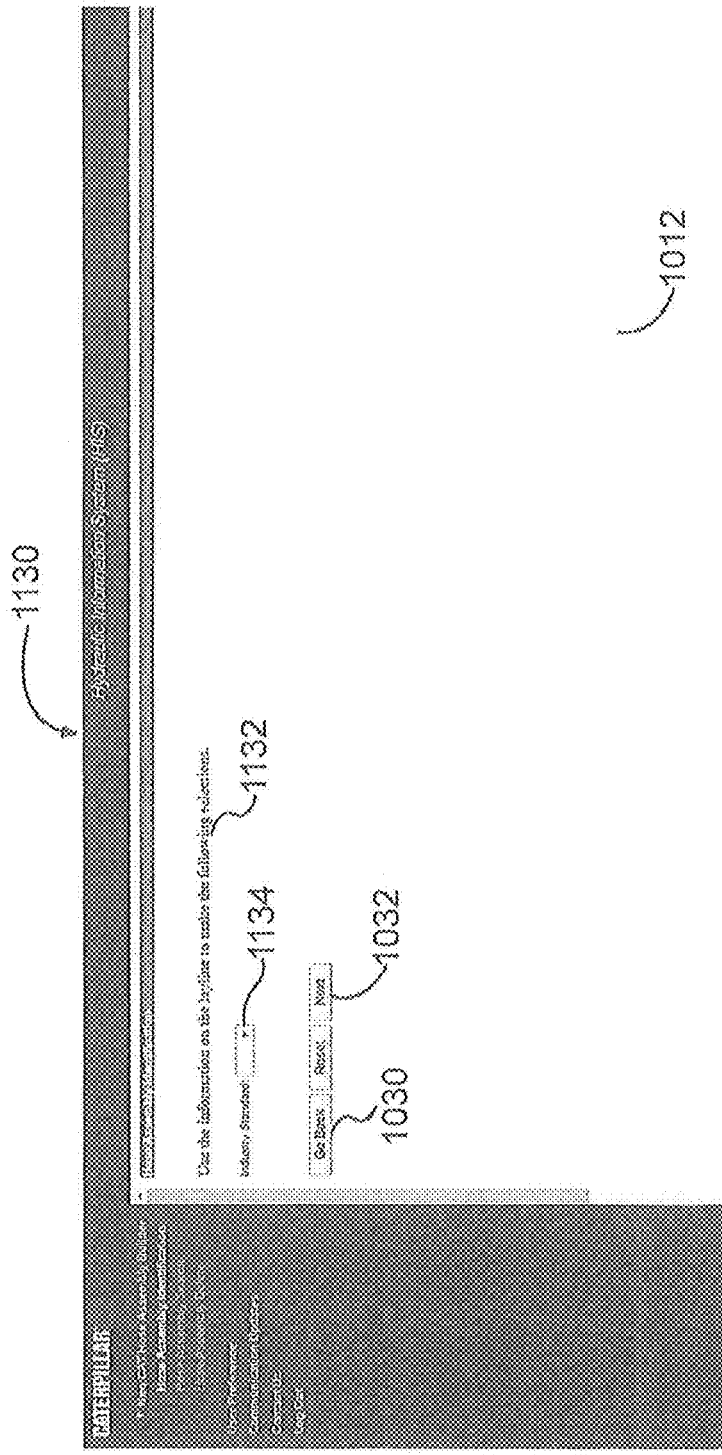
FIGS. 24-25 are user interfaces for selecting industry standard information in the hose assembly builder tool in accordance with the present invention.
Figure 25:
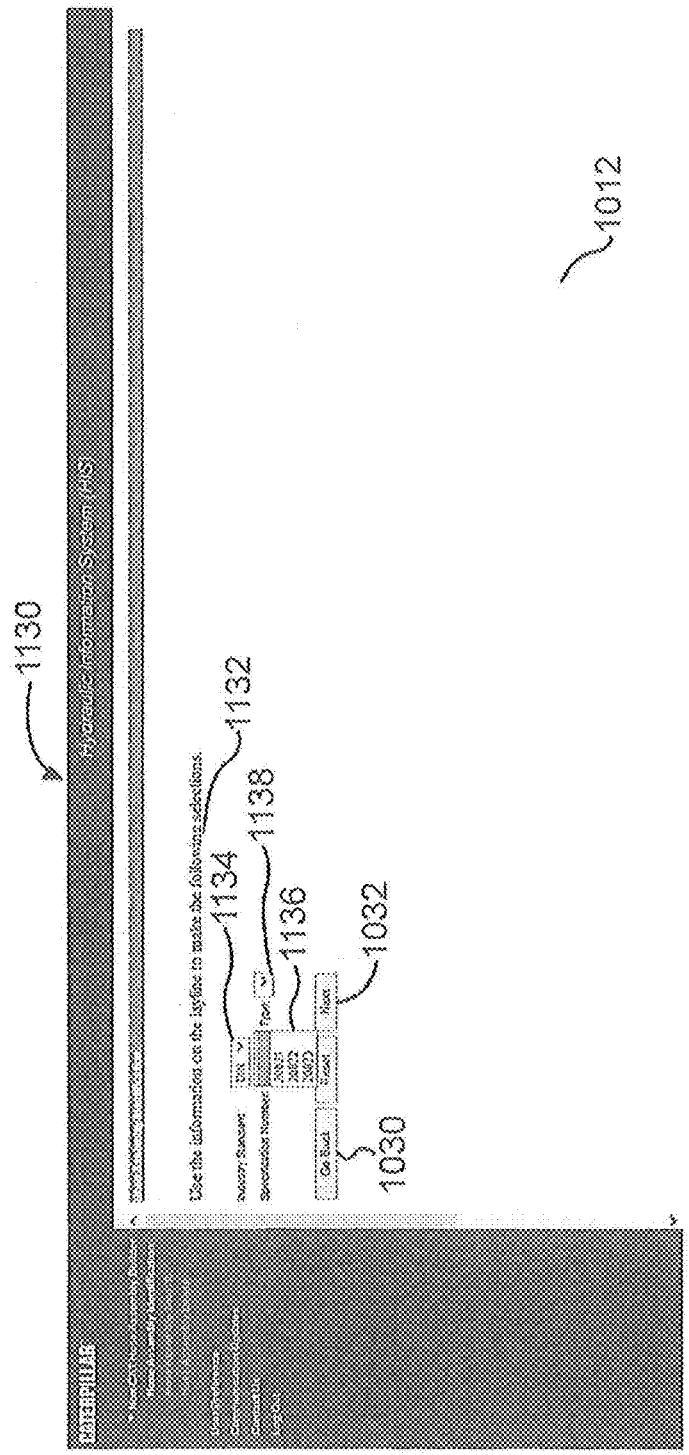

If, at step 1092, the user indicates the hose layline of the second manufacturer's hose is visible, the hose assembly builder tool will direct the user to step 1126 to identify the industry standard information printed on the hose layline. Step 1126 may begin by requiring the user to enter an industry standard field code, found on the hose layline. Depending on the industry standard field code selected by the user, the hose assembly builder tool may also require the user to enter an industry standard specification number, and may also require the user to enter an industry standard specification type code, all of which may be found on the hose layline. Since industry standard specifications are international (i.e. not specific to a brand or manufacturer), this step 1126 allows the hose assembly builder tool to easily identify a hose type of the first manufacturer that meets the same industry standards as the second manufacturer's hose. The interface screen related to step 1126 is illustrated at FIGS. 24 and 25, which depict an industry standard selection screen 1130.

The main panel 1012 of the industry standard selection screen 1130 may include a direction 1132 to the user to use the information provided on the hose layline to make a series of selections, along with a drop-down menu 1134 labeled "Industry Standard:" and including values for the user to select in response to the inquiry. In this example, the values associated with the drop-down menu 1134 may include industry standard field codes "DIN," "EN," "ISO," "JIS," and "SAE," although other industry standard field codes may also be listed. Once the user selects the industry standard field code from the drop-down menu 1134, the industry standard field code will be stored. The industry standard field code value may be stored in the hose assembly build table 700 (FIG. 9) at an industry standard field code (SPEC_TYP) 772 field.

When the user selects the industry standard field code from the drop-down menu 1134, a new drop-down menu 1136 (FIG. 25) labeled "Specification Number:" will load on the screen 1130. By selecting the industry standard field code from drop-down menu 1134, the user executes a filtering process in order to populate the "Specification Number" drop-down menu 1136. For example, if the user selects "DIN" from drop-down menu 1134, the hose assembly builder tool may populate the drop-down menu 1136 with all of the specification numbers associated with the DIN field code. To achieve this, the hose assembly builder tool may filter the hose cross-reference information table 300 (FIG. 5), and identify records where a value in the SPEC_TYP 308 field matches the value stored in the SPEC_TYP 772 field. The hose assembly builder tool may then populate the "Specification Number" drop-down menu 1136 with any values stored in the SPEC_NO 308 field of the identified records. In the example illustrated in FIG. 25, the specification numbers associated with the DIN industry standard include "20021," "20022," and "20023." Once the user selects the specification number from the drop-down menu 1136, the specification number may be stored in the hose assembly build table 700 (FIG. 9) at an industry standard specification number (SPEC_NO) 774 field. If the user selected the "JIS" or "SAE" industry standard field codes, step 1126 is complete, and the user may select the "Next" button 1032 to move to the next step 1140.

If the user selected the "DIN," "EN," or "ISO" industry standard field codes, an additional drop-down menu 1138 labeled "Type:" will also load on the screen 1130 at the time the user selects the industry standard field code. The "Type" drop-down menu 1138 may not populate, however, until the user selects the specification number from the drop-down menu 1136. By selecting the specification number from drop-down menu 1136, the user executes a filtering process in order to populate the "Type" drop-down menu 1138. For example, if the user selects "DIN" from drop-down menu 1134, and then selects "20022" from the drop-down menu 1136, the hose assembly builder tool may populate the drop-down menu 1138 with all of the specification types associated with the DIN field code and the specification number 20022. To achieve this, the hose assembly builder tool may filter the hose cross-reference information table 300 (FIG. 5) to identify any records where a value in the SPEC_TYP 308 field matches the value stored in the SPEC_TYP 772 field and where a value in the SPEC_NO 310 field matches the value stored in the SPEC_NO 774 field. The hose assembly builder tool may then populate the "Type" drop-down menu 1138 with any values stored in the DIN_HOSE_TYP 312 field of the identified records. Once the user selects the specification type from the drop-down menu 1138 and selects the "Next" button 1032, an industry standard specification type will be stored. The industry standard specification type value may be stored in the hose assembly build table 700 (FIG. 9) at an industry standard specification type (DIN_HOSE_TYP) 776 field, for future reference by the hose assembly builder tool. After selecting the industry standard specification type of the second manufacturer's hose, the user may select the "Next" button 1032 to move to the next step 1140.

Figure 26:
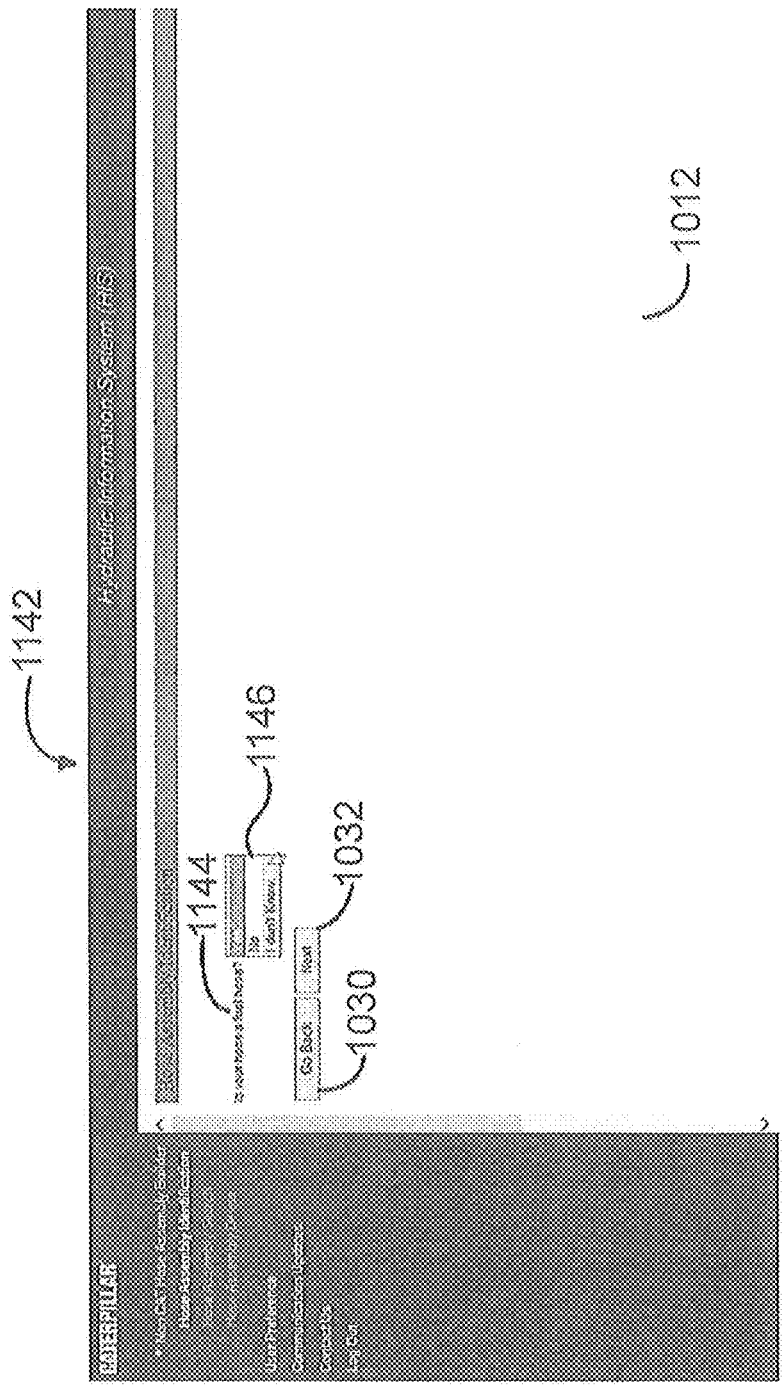
FIG. 26 is a user interface for selecting a fuel hose indicator in the hose assembly builder tool in accordance with the present invention.

If, at step 1092, the user indicates the hose layline of the second manufacturer's hose is not visible, the hose assembly builder tool will direct the user to step 1128 (FIG. 10). At step 1128, the hose assembly builder tool may prompt the user as whether the second manufacturer's hose is a hose used for transporting fuel. Fuel hoses are specially designed to withstand the caustic properties of gasoline and other fuels. As such, they may have specially designed covers or internal constructions to ensure, for example, the fuel hose does not rupture or melt. An interface screen related to step 1128 is illustrated at FIG. 26, which depicts a fuel hose indicator screen 1142.

The main panel 1012 of the fuel hose indicator screen 1142 may include an inquiry 1144 as to whether or not the second manufacturer's hose is a fuel hose, along with a drop-down menu 1146 with values for the user to select in response to the inquiry. In this example, the values for response may include "Yes," "No," and "I Don't Know," although other values may be used depending, for example, on the wording of the inquiry 1144. Depending on the user's response to the inquiry 1144, the hose assembly builder tool may respond differently. If the user indicates the second manufacturer's hose is a fuel hose (in this example, by selecting "Yes" from the drop-down menu 1146), and then selects the "Next" button 1032, the user will be directed to step 1140 to determine an inside diameter of the second manufacturer's hose. In this instance, a fuel hose indicator will be stored. The fuel hose indicator value may be stored in the hose assembly build table 700 (FIG. 9) at a fuel hose indicator (FUEL_HOSE_IND) 780 field, for future reference by the hose assembly builder tool. If the user indicates the second manufacturer's hose is not a fuel hose (in this example, by selecting "No" from the drop-down menu 1146), and then selects the "Next" button 1032, the user will be directed to step 1148 to determine whether the second manufacturer's hose has a unique cover. In this instance, the fuel hose indicator will also be stored in the hose assembly build table 700 (FIG. 9) at the fuel hose indicator (FUEL_HOSE_IND) 780 field, for future reference by the hose assembly builder tool.

Figure 27:
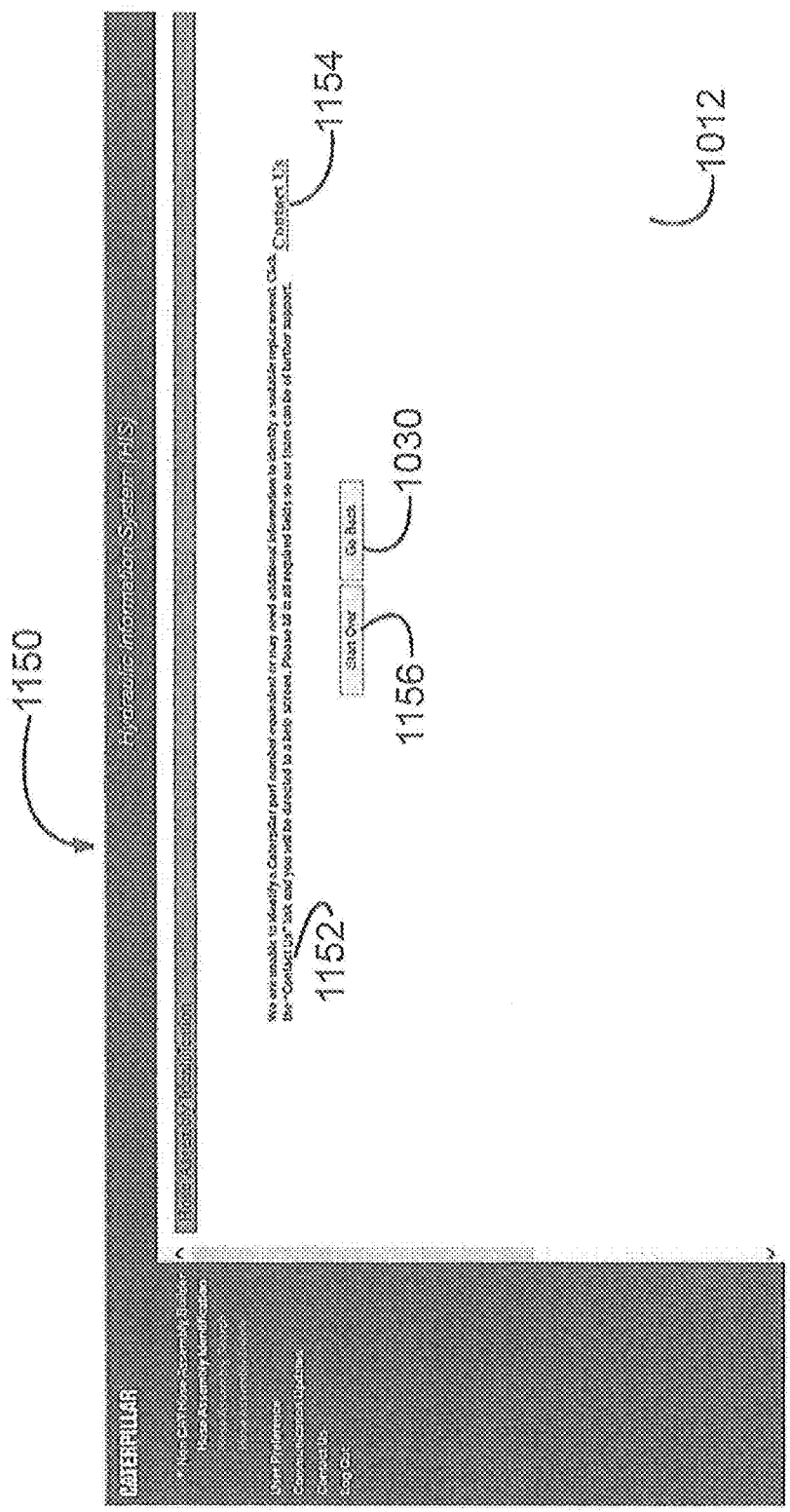
FIG. 27 is a user interface for an error screen of the hose assembly builder tool in accordance with the present invention.
Figure 28:
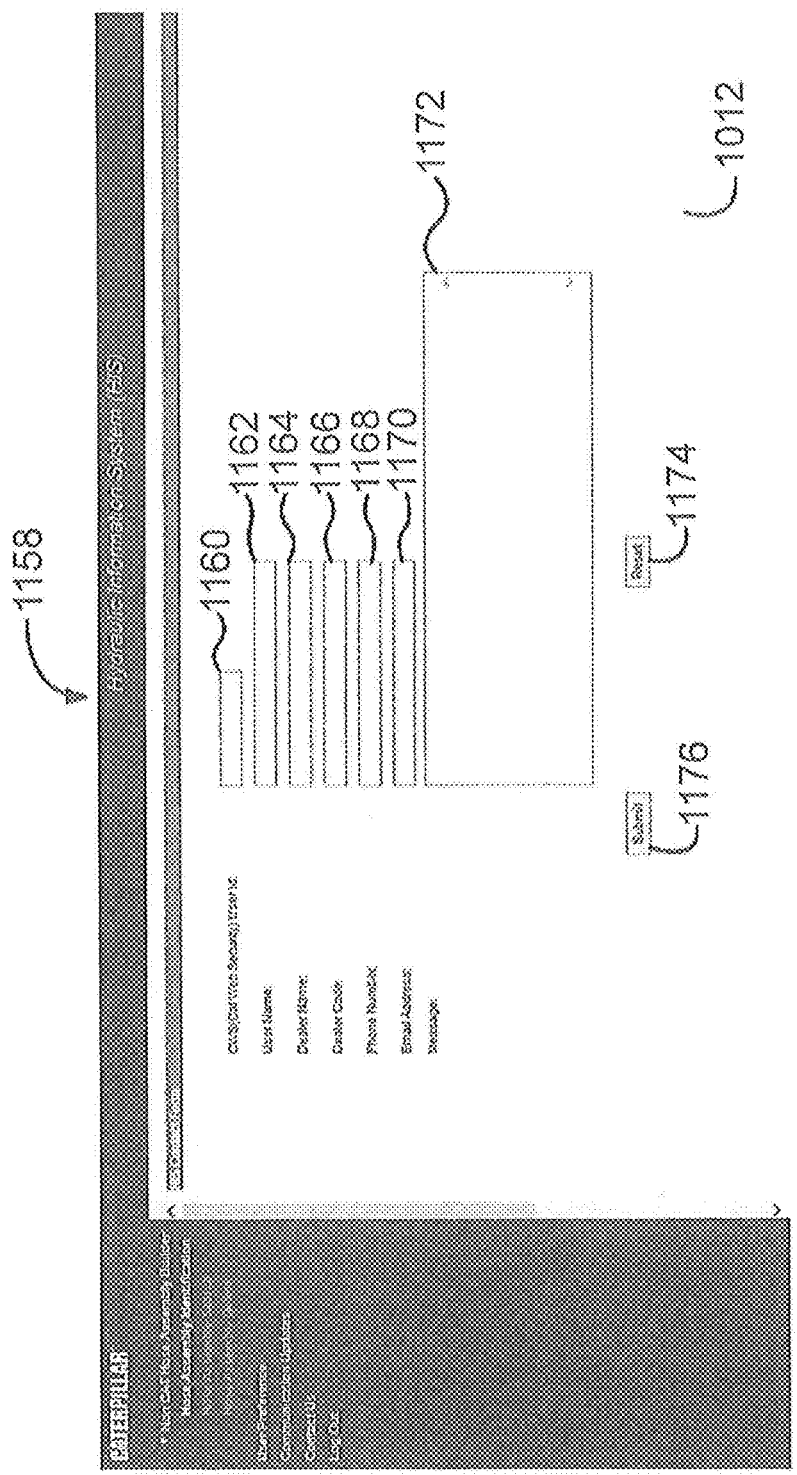
FIG. 28 is a user interface for a contact us screen of the hose assembly builder tool in accordance with the present invention.

Finally, if the user indicates that he or she is uncertain if the second manufacturer's hose is a fuel hose (in this example, by selecting "I Don't Know" from the drop-down menu 1146), and then selects the "Next" button 1032, the user will be directed to a help screen 1150 (FIG. 27) and "Contact Us" page (FIG. 28). In this scenario, no data is stored in this hose assembly build table 700 (FIG. 9). The help screen 1150 is illustrated at FIG. 27. The main panel 1012 of the hose length indicator screen 1096 may include a message 1152 to the user that the hose assembly builder tool is unable to identify a part number of the first manufacturer equivalent to the second manufacturer's hose assembly and additional information may be necessary, and a "Contact Us" link 1154. The main panel 1012 may also include a "Start Over" button 1156, which, if selected by the user, returns the user to the tool information screen 1018 (FIG. 16). Similarly, selecting the "Go Back" button 1030 will return the user to the previous screen (here, the fuel hose indicator screen 1142). Finally, if the user selects the "Contact Us" link 1154, the user may be directed to a contact us screen 1158, as illustrated in FIG. 28.

The main panel 1012 of the contact us screen 1158 may include a number of fields for the user to provide identifying information, as well as a message. More specifically, the fields may include a Web Security user ID 1160, a User Name 1162, a Dealer Name 1164, a Dealer Code 1166, a Phone Number 1168, an Email Address 1170, and a message 1172. The user may clear any data in the fields by selecting the "Reset" button 1174. Once the user is satisfied with the content of each field, the user may select the "Submit" button 1176. The data from the fields is then aggregated and sent via e-mail server 24 (FIG. 1) to an e-mail inbox monitored by a help desk employee.

Figure 29:
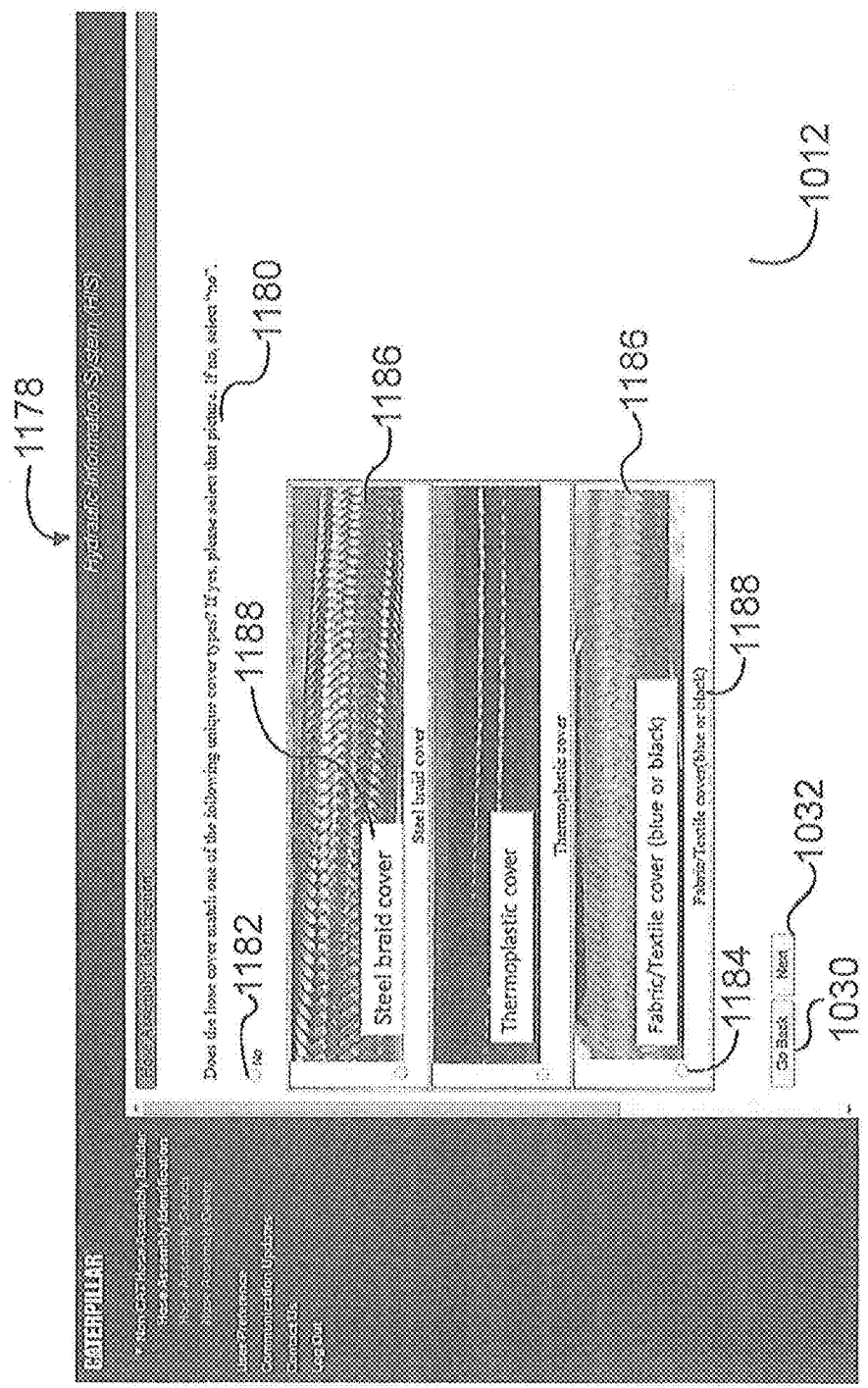
FIG. 29 is a user interface for selecting a hose cover type in the hose assembly builder tool in accordance with the present invention.

Referring back to FIG. 10, at step 1148 the hose assembly builder tool may prompt the user regarding the existence of a unique hose cover style on an exterior surface of the second manufacturer's hose. If, for example, the second manufacturer's hose includes a unique cover, the user may select the type of unique cover from a set of options. Step 1148 is illustrated by FIG. 29, which displays a hose cover selection screen 1178.

The hose cover selection screen 1178 may include the main panel 1012, as well as an inquiry 1180 as to whether or not the second manufacturer's hose assembly has a unique cover type. If the second manufacturer's hose assembly does not have a unique cover type, the user may select an option 1182 indicating as such. In this example, the option 1182 may have a "No" value. If the second manufacturer's hose assembly has a unique cover type, the user may select the type of unique cover from a set of options 1184. Each cover type may be displayed with an image 1186 of the cover and a description 1188 of the cover, so the user may easily identify what type of cover the second manufacturer's hose assembly uses. In this example, values for response may include "Steel braid cover," "Thermoplastic cover," and "Fabric/Textile cover (blue or black)," although other values may be used.

Depending on the user's response to the inquiry 1180, the hose assembly builder tool may respond differently. If the user indicates the second manufacturer's hose assembly does not have a unique cover (in this example, by selecting the "No" option 1182), and then selects the "Next" button 1032, the user will be directed to step 1190 to determine the construction type of the second manufacturer's hose. If, however, the user indicates the second manufacturer's hose assembly has a unique cover (in this example, by selecting one of the cover type options 1184), and then selects the "Next" button 1032, the user will be directed to step 1140 to select an inside diameter of the second manufacturer's hose. If the user indicates the second manufacturer's hose assembly does not have a unique cover, then no values are stored in the hose assembly build table 700 (FIG. 9) at a cover type (COVER_TYPE) 782 field. If the user selects one of the cover type options 1184, then the material (e.g. rubber, steel braid) comprising the unique cover selected may be stored in the hose assembly build table 700 (FIG. 9) at the cover type (COVER_TYPE) 782 field, for future reference by the hose assembly tool.

Figure 30:
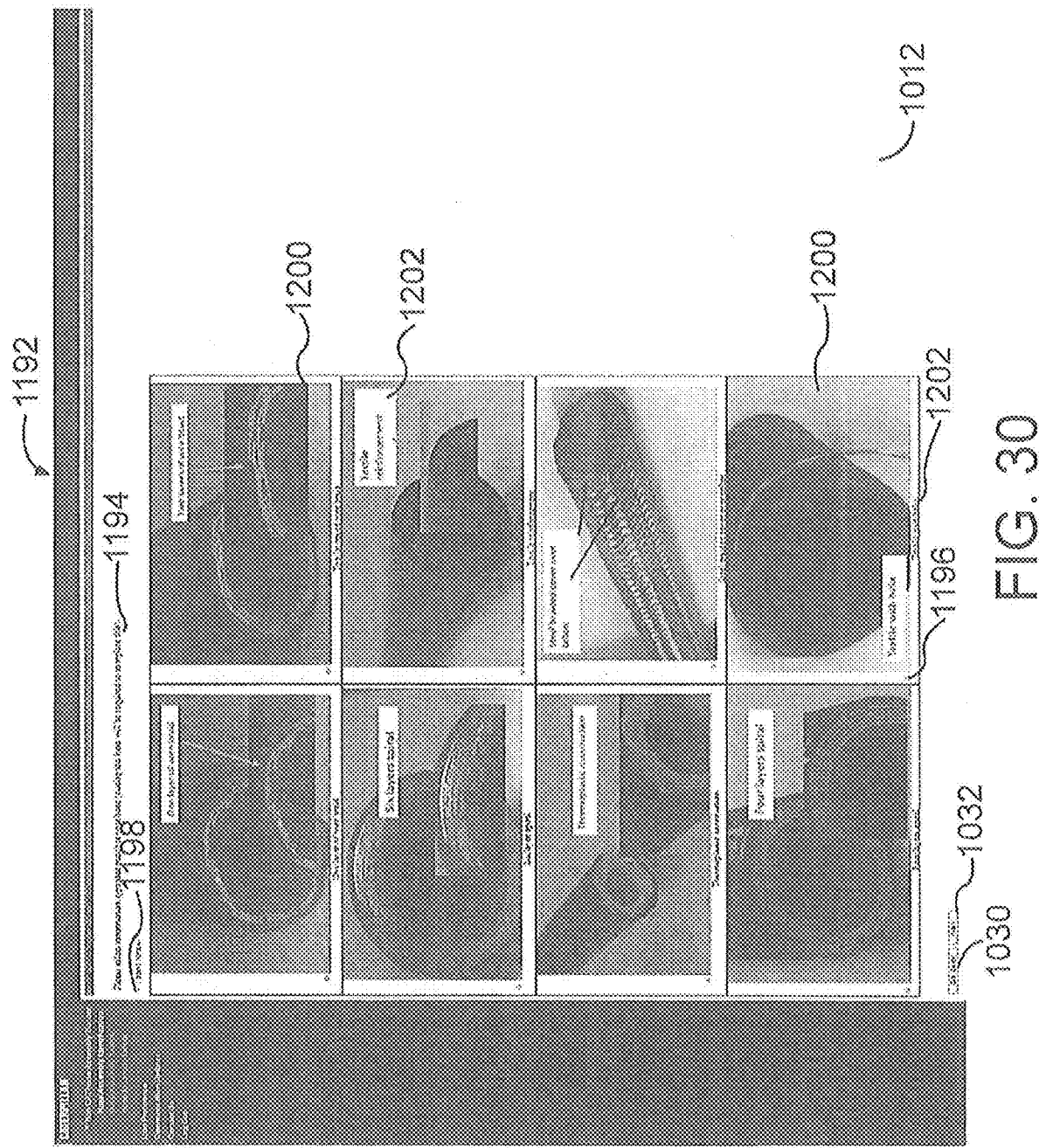
FIG. 30 is a user interface for selecting a hose construction type in the hose assembly builder tool in accordance with the present invention.

At step 1190 (FIG. 10), the hose assembly builder tool may prompt the user to select the construction type of the second manufacturer's hose by analyzing a cross-section of the second manufacturer's hose. To analyze a cross-section of the second manufacturer's hose, the user may cut the hose. If, for example, the user cuts the second manufacturer's hose and recognizes the construction, the user may select the type of construction from a set of options. Step 1190 is illustrated by FIG. 30, which displays a hose construction selection screen 1192.

The hose construction selection screen 1192 may include the main panel 1012, as well as a direction 1194 to select a construction type that matches the construction type of the second manufacturer's hose. If the second manufacturer's hose assembly does not have a construction type matching one of a set of options 1196, the user may select an option 1198 indicating as such. In this example, the option 1198 may have an "I Don't Know" value. If the second manufacturer's hose assembly has a recognizable construction type, the user may select the type of construction from the set of options 1196. Each construction type may be displayed with an image 1200 of the cross-section showing the construction of the hose and a description 1202 of the construction type, so the user may easily identify what type of construction the second manufacturer's hose assembly employs. In this example, values for response may include "One layer of wire braid," "Two layers of wire braid," Six layers spiral," "Textile reinforcement," "Thermoplastic construction," "Steel braided cover over Teflon," "Four layers spiral," and "Textile with helix," although other values may be used.

Depending on the user's response to the direction 1194, the hose assembly builder tool may respond differently. If the user indicates that he or she is unable to match the construction of the second manufacturer's hose to one of the construction type options 1196 (in this example, by selecting the "I Don't Know" option 1198), and then selects the "Next" button 1032, the user will be directed to the help screen 1150 (FIG. 27). If, however, the user is able to match the construction of the second manufacturer's hose with one of the construction type options 1196 (in this example, by selecting one of the construction type options 1196), and then selects the "Next" button 1032, the user will be directed to step 1140 to select an inside diameter of the second manufacturer's hose. If the user indicates that he or she is unable to match the construction of the second manufacturer's hose to one of the construction options 1196, then no values are stored in the hose assembly build table 700 (FIG. 9) at a construction type (CONSTR_TYPE) 784 field. On the other hand, if the user selects one of the construction type options 1196, then the construction type selected may be stored in the hose assembly build table 700 (FIG. 9) at the construction type (CONSTR_TYPE) 784 field, for future reference by the hose assembly tool.

Figure 31:
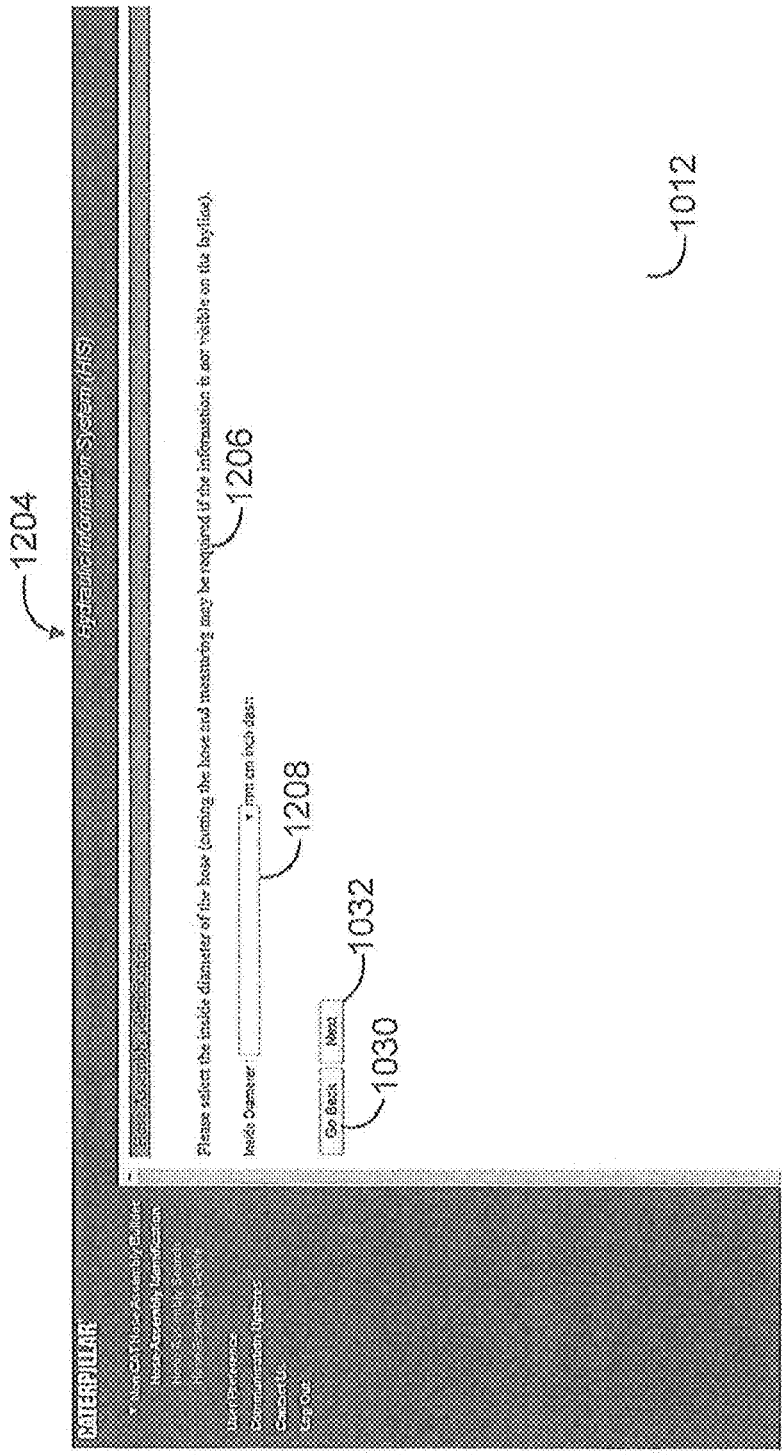
FIGS. 31-32 is a user interface for selecting an inside diameter of a hose in the hose assembly builder tool in accordance with the present invention.

Referring back to FIG. 10, at step 1140 the hose assembly builder tool may prompt the user to select an inside diameter of the second manufacturer's hose. If the hose layline is not visible, then the user may be required to cut the hose and measure the inside diameter. The interface screen related to step 1140 is illustrated at FIGS. 31 and 32, which depict an inside diameter selection screen 1204.

The main panel 1012 of the inside diameter selection screen 1204 may include direction 1206 to select an inside diameter of the second manufacturer's hose, along with a drop-down menu 1208 labeled "Inside Diameter:" and including values for the user to select in response to the inquiry. In this example, the drop-down menu 1208 is populated when the hose assembly builder tool loads the screen 1204. When the user navigates to the inside diameter selection screen 1204, the user executes a filtering process in order to populate the "Inside Diameter" drop-down menu 1208. To achieve this, the hose assembly builder tool may first examine the value stored in the LAY_VIS 770 field. If the LAY_VIS 770 field indicates the hose layline was visible, then the hose assembly builder tool may perform a first filter of the hose cross-reference information table 300 (FIG. 5), to identify records where a value in the SPEC_TYP 308 field matches the value stored in the SPEC_TYP 772 field, a value in the SPEC_NO 310 field matches the value stored in the SPEC_NO 774 field, and a value in the DIN HOSE_TYP 312 field matches the value stored in the DIN HOSE_TYP 776 field. The hose assembly builder tool may perform a second filter on the bulk hose information table 200 (FIG. 4), to identify records where a value in the CAT_ID_NO_20 202 field matches the values stored in the CAT_ID_NO_20 302 field of the identified records from the first filter, and where a value in the PART_SVC_LVL 228 field indicates the part is currently being manufactured. The hose assembly builder tool may then populate the "Inside Diameter" drop-down menu 1208 with any values stored in the HOSE_INSD_DIA 208 and HOSE_DASH_SIZE 222 of the identified records.

Alternatively, if the LAY_VIS 770 field indicates the hose layline was not visible, then the hose assembly builder tool may perform a filter on the bulk hose information table 200 (FIG. 4) directly, to identify records where a value in the COVER_TYPE 224 field matches the value stored in the COVER_TYPE 782 field, where a value in the CONSTR_TYPE 226 field matches the value stored in the CONSTR_TYPE 784 field, and where a value in the PART_SVC_LVL 228 field indicates the part is currently being manufactured. The hose assembly builder tool may then populate the "Inside Diameter" drop-down menu 1208 with any values stored in the HOSE_INSD_DIA 208 and HOSE_DASH_SIZE 222 of the identified records.

Figure 32:
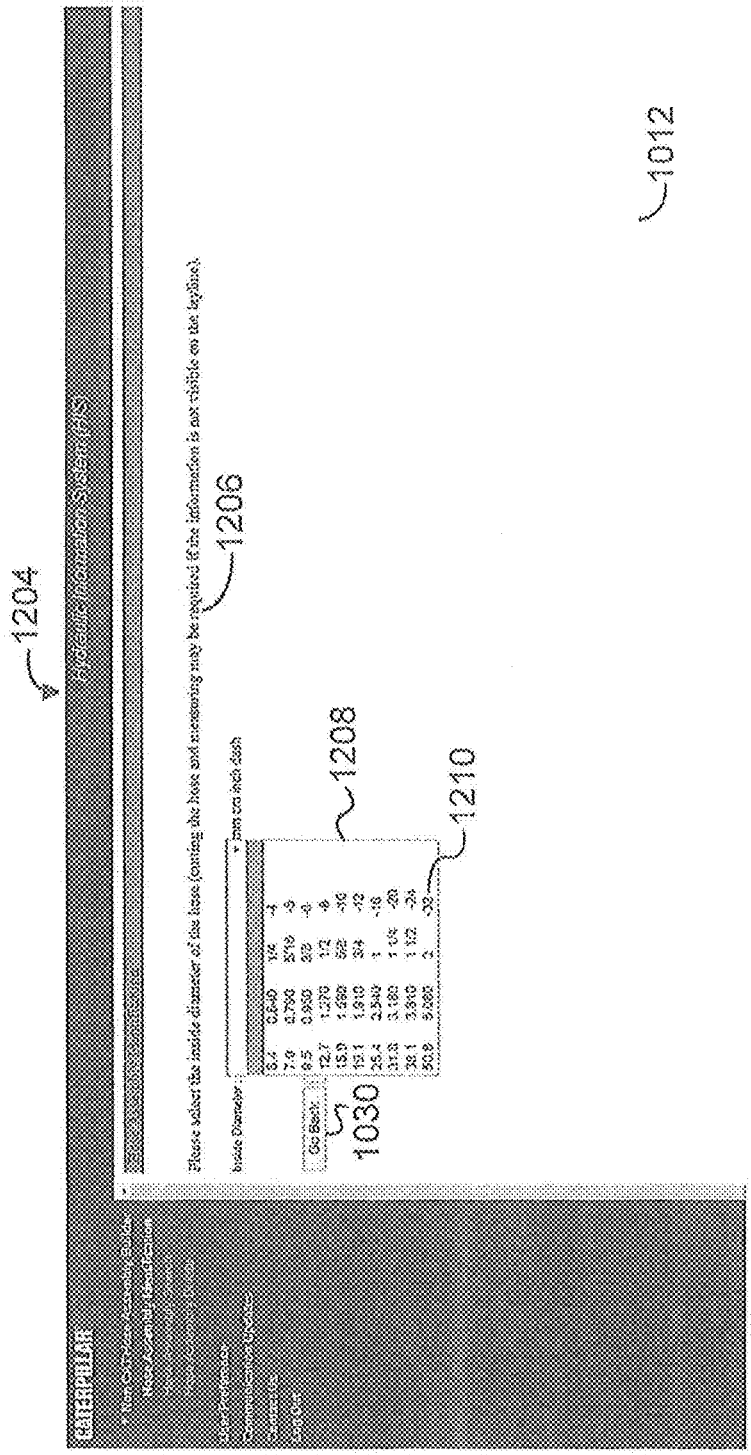

In the example illustrated in FIG. 32, the inside diameter values may be formatted to list the inside diameter of the second manufacturer's hose in mm, cm, inches, and finally a dash hose size. For example, the option 1210 "50.8 5.080 2-32" indicates that the inside diameter of the hose is 50.8 millimeters (mm) or 5.080 centimeters (cm) or 2 inches (in) or −32 dash. A hose dash size refers to a measurement in $\frac{1}{16}$ in increments. For example, option 1210 indicates a hose dash size of −32. To calculate the hose inside diameter in inches using the dash size, the user should multiply 32 by $\frac{1}{16}$, which equals 2 in. Once the user selects the inside diameter from the drop-down menu 1208 and selects the "Next" button 1032, an inside diameter and hose dash size will be stored. The inside diameter value may be stored, in mm, in the hose assembly build table 700 (FIG. 9) at a hose inside diameter (HOSE_INSD_DIA) 706 field, for future reference by the hose assembly builder tool. Likewise, the hose dash size value may be stored in the hose assembly build table 700 at a hose dash size (HOSE_DASH_SIZE) 778 field, for future reference by the hose assembly builder tool.

Figure 33:
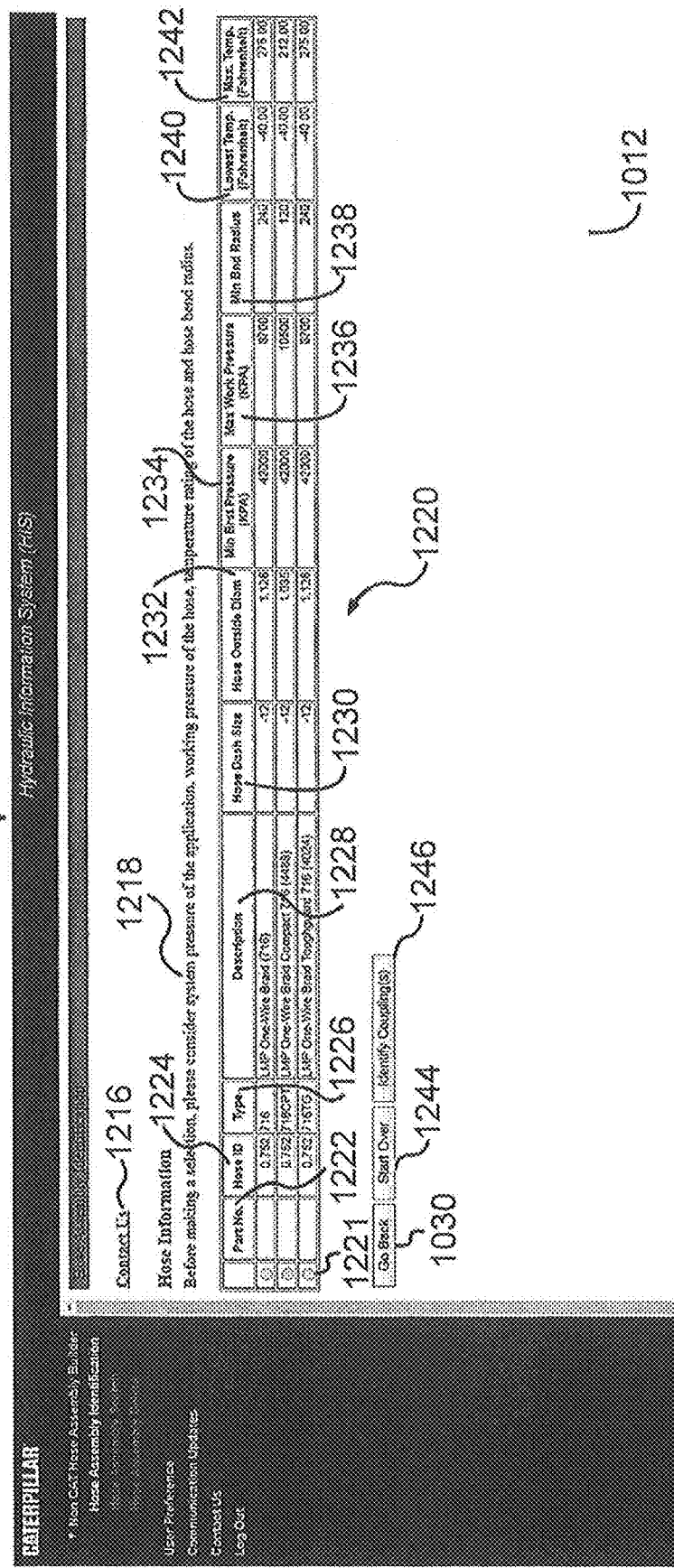
FIG. 33 is a user interface for a hose build information screen of the hose assembly builder tool in accordance with the present invention.

Referring again to FIG. 10, at a step 1212 a hose build result list may be displayed to the user. The interface screen related to step 1212 is illustrated at FIG. 33, which depicts a hose build result screen 1214. The main panel 1012 of the hose build result screen 1214 may include a "Contact Us" link 1216, and an instructional statement 1218, along with a list 1220 of selectable hose build results corresponding to hoses manufactured by the first manufacturer meeting all criteria specified by the user in each of the previous steps. The hose build result screen 1214 may also include the "Go Back" button 1030, a "Start Over" button 1244 and an "Identify Coupling(s)" button 1246. Selecting the "Start Over" button 1244 returns the user to the layline visibility screen 1116 (FIG. 23). Selecting the "Identify Coupling(s)" button 1246 directs the user to the next step to begin identifying the couplings of the second manufacturer's hose assembly.

Each build result may include an indicator 1221 that is selectable by the user. The list 1220 of selectable hose build results may be populated when the hose assembly builder tool loads the hose build result screen 1214. When the user navigates to the hose build result screen 1214, the user executes a filtering process in order to populate the list 1220 of compatible hoses of the first manufacturer. To achieve this, the hose assembly builder tool may first examine the value stored in the LAY_VIS 770 field. If the LAY_VIS 770 field indicates the hose layline was visible, then the hose assembly builder tool may perform a first filter of the hose cross-reference information table 300 (FIG. 5), to identify records where a value in the SPEC_TYP 308 field matches the value stored in the SPEC_TYP 772 field, a value in the SPEC_NO 310 field matches the value stored in the SPEC_NO 774 field, a value in the DIN_HOSE_TYP 312 field matches the value stored in the DIN_HOSE_TYP 776 field, and a value in the HOSE_DASH_SIZE 306 matches the value stored in the HOSE_DASH_SIZE 778 field. The hose assembly builder tool may then perform a second filter on the bulk hose information table 200 (FIG. 4), to identify records where a value in the CAT_ID_NO_20 202 field matches the values stored in the CAT_ID_NO_20 302 field of the identified records from the first filter, and where a value in the PART_SVC_LVL 228 field indicates the part is currently manufactured. The hose assembly builder tool may then populate the list 1220 of selectable hose build results.

Alternatively, if the LAY_VIS 770 field indicates the hose layline was not visible, then the hose assembly builder tool may perform a filter on the bulk hose information table 200 (FIG. 4) directly, to identify records where a value in the COVER_TYPE 224 field matches the value stored in the COVER_TYPE 782 field, a value in the CONSTR_TYPE 226 field matches the value stored in the CONSTR_TYPE 784 field, a value in the HOSE_INSD_DIA 208 field matches the value stored in the HOSE_INSD_DIA 706 field, a value in the HOSE_DASH_SIZE 222 field matches the value stored in the HOSE_DASH_SIZE 778 field, and where a value in the PART_SVC_LVL 228 field indicates the part is currently manufactured. The hose assembly builder tool may then populate the list 1220 of selectable hose build results.

The list 1220 of selectable hose build results may be comprised of hoses of the first manufacturer that are compatible with the second manufacturer's hose assembly. When the list 1220 is comprised of more than one compatible hose of the first manufacturer, the user may consider at least pressure of the application, working pressure of the hose, temperature rating of the hose and the hose bend radius before making a hose selection. As such, each compatible hose listed in the list 1220 of selectable hose build results includes a part number 1222 of the first manufacturer, a hose inside diameter 1224, a hose type 1226, a hose description 1228, a hose dash size 1230, a hose outside diameter 1232, a minimum burst pressure (displayed in kPa) 1234, a maximum work pressure (displayed in kPa) 1236, a minimum bend radius 1238, a lowest recommended operating temperature (displayed in Fahrenheit) 1240, and a maximum recommended operating temperature (displayed in Fahrenheit) 1242. As mentioned above, the hose assembly builder tool may populate the list 1220 of selectable hose build results after filtering has been completed. More specifically, the part number 1222 value may correspond to the CAT-_ID_NO_20 202 value, the hose inside diameter 1224 value may correspond to the HOSE_INSD_DIA 208 field, the hose type 1226 value may correspond to the HOSE_TYP 206 field, the hose dash size 1230 value may correspond to the HOSE_DASH_SIZE 222 field, the hose outside diameter 1232 value may correspond to the HOSE_OD 210 field, the minimum burst pressure (displayed in kPa) 1234 value may correspond to the MIN_BRST_PRESS 212 field, the maximum work pressure (displayed in kPa) 1236 value may correspond to the MAX_WRK_PRESS 214 field, the minimum bend radius 1238 value may correspond to the MIN_BND_RAD 216 field, the lowest recommended operating temperature (displayed in Fahrenheit) 1240 value may correspond to the LWST_TEMP 218 field, and the maximum recommended operating temperature (displayed in Fahrenheit) 1242 value may correspond to the MAX_TEMP 220 field.

Once the user selects one of the compatible first manufacturer's hoses from the list 1220 of hose build results, and selects the "Identify Coupling(s)" button 1246, information associated with the selected hose of the first manufacturer may be stored in the hose assembly build table 700 (FIG. 9), and the user may be directed to a first step 1248 in identifying one or more couplings manufactured by the second manufacturer. More specifically the part number 1222 of the first manufacturer may be stored at a bulk part number (BULK_PART_NO) 708 field, and the hose type 1226 may be stored at a hose type (HOSE_TYP) 704 field. Additionally, using the part number 1222, a search may be completed on the hose bulk armor information table 500 (FIG. 7) to obtain an armor guard part number associated with the selected hose of the first manufacturer. The value obtained from the search may be stored at an armor guard part number (ARMR_GUARD_PART_NO) 740 field.

Figure 11:
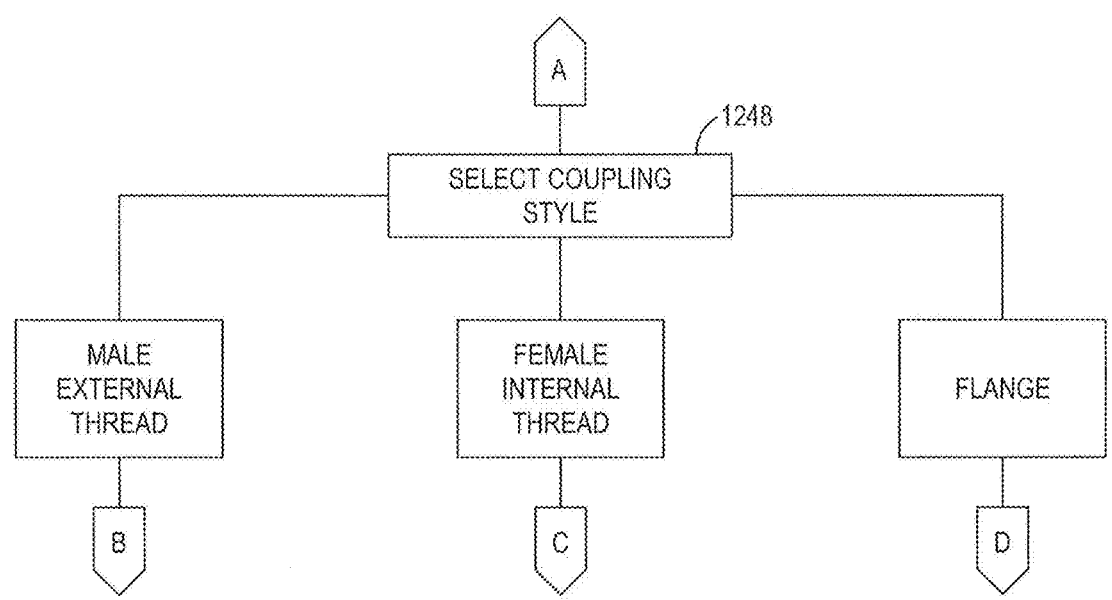
FIGS. 11-14 is a flowchart depicting a coupling selection process in accordance with the present invention.
Figure 34:
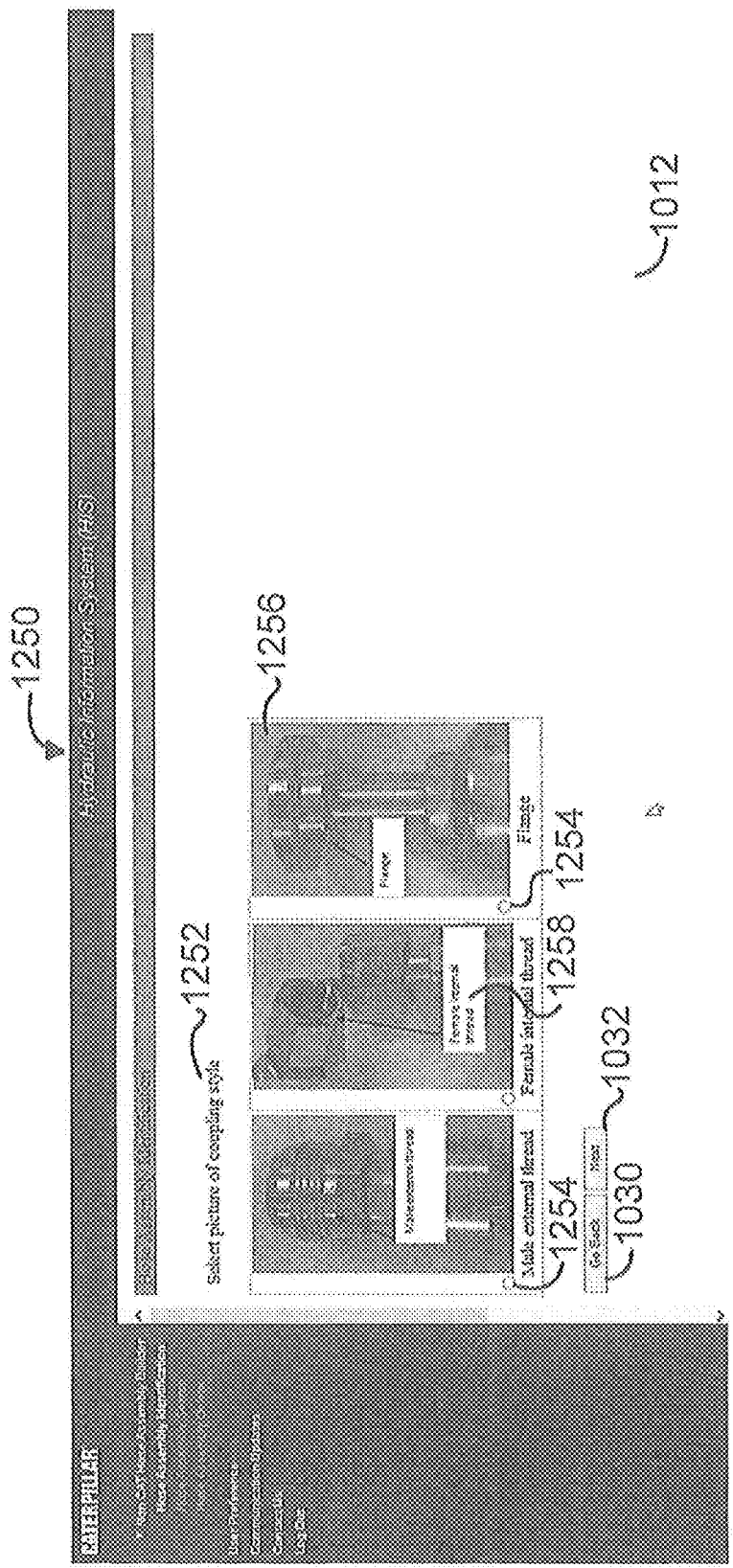
FIG. 34 is a user interface for selecting a coupling style in the hose assembly builder tool in accordance with the present invention.

Referring now to FIG. 11, the hose assembly builder tool may prompt the user to select a coupling style of the second manufacturer's coupling (step 1248). This step 1248 may be a first step in identifying a coupling associated with the second manufacturer's hose assembly. The interface screen related to step 1248 is illustrated at FIG. 34, which depicts a coupling style selection screen 1250.

The main panel 1012 of the coupling style selection screen 1250 may include a direction 1252 to the user to select a coupling style of the second manufacturer's coupling, along with a set of options 1254 with values for the user to select in response to the inquiry. The user may select the style of coupling from the set of options 1254. Each coupling style may be displayed with an image 1256 of the coupling style and a description 1258 of the coupling style, so the user may more easily identify the second manufacturer's coupling style. In this example, values for response may include "Male external thread," "Female internal thread," and "Flange," although other values may be used. Depending on the user's response to the direction 1252, the hose assembly builder tool may respond differently. If the user indicates the second manufacturer's coupling has a male external thread coupling style (in this example, by selecting the "Male external thread" option from the set of options 1254), and then selects the "Next" button 1032, the user will be directed to step 1260 (FIG. 12) related to identifying a male external threaded coupling. If, however, the user indicates the second manufacturer's coupling has a female internal thread coupling style (in this example, by selecting the "Female internal thread" option from the set of options 1254), and then selects the "Next" button 1032, the user will be directed to step 1262 related to identifying a female internal threaded coupling. Finally, if the user indicates the second manufacturer's coupling has a flange coupling style (in this example, by selecting the "Flange" option from the set of options 1254), and then selects the "Next" button 1032, the user will be directed to step 1264 related to identifying a flange coupling. When the user selects the "Next" button 1032, regardless the coupling style selected, the thread type (e.g. external, internal, flange) associated with the selected coupling style may be stored in the hose assembly build table 700 (FIG. 9) at the first coupling thread type (CPLNG_1_THRD_TYP) 786 field, for future reference by the hose assembly tool.

Figure 12:
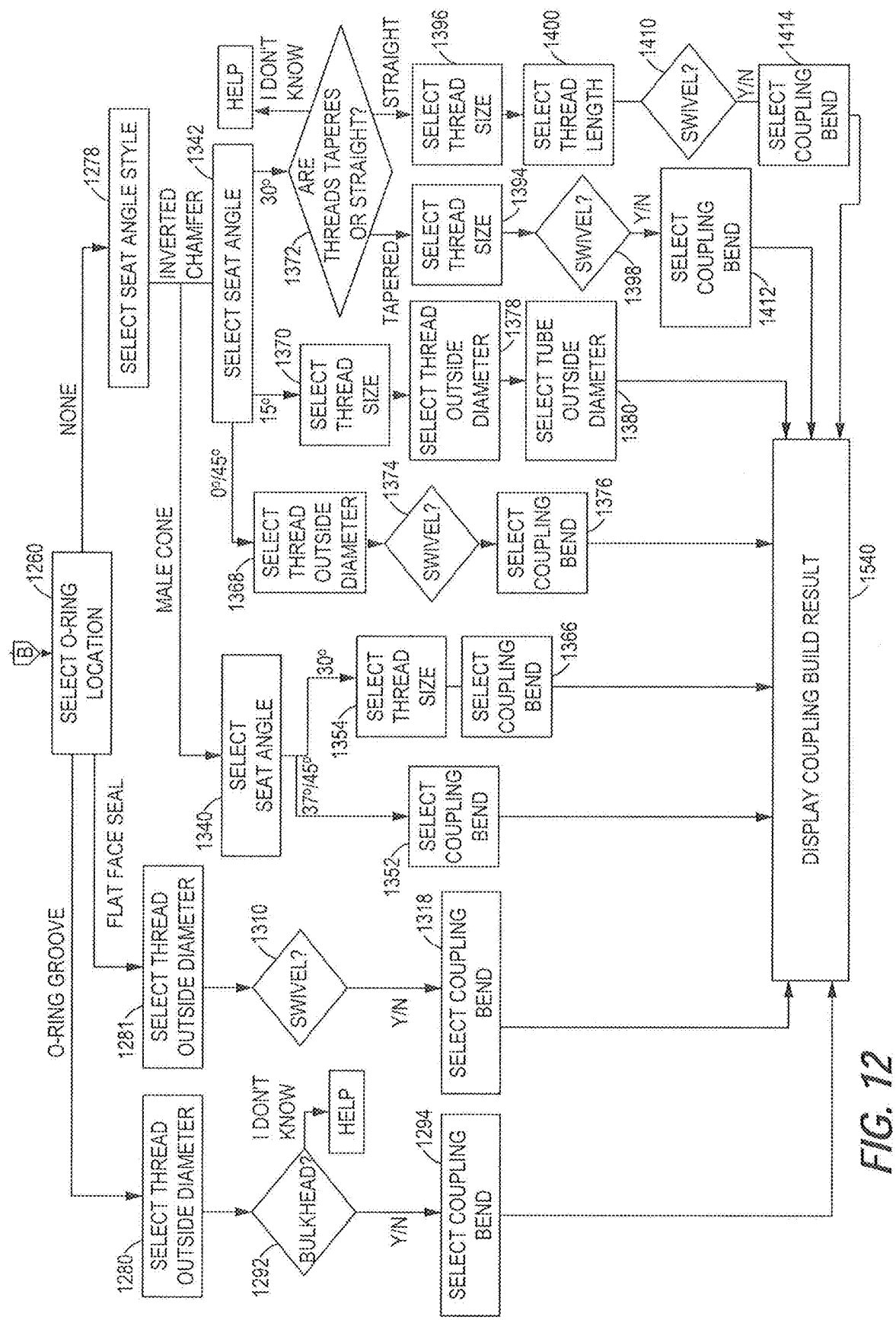
Figure 35:
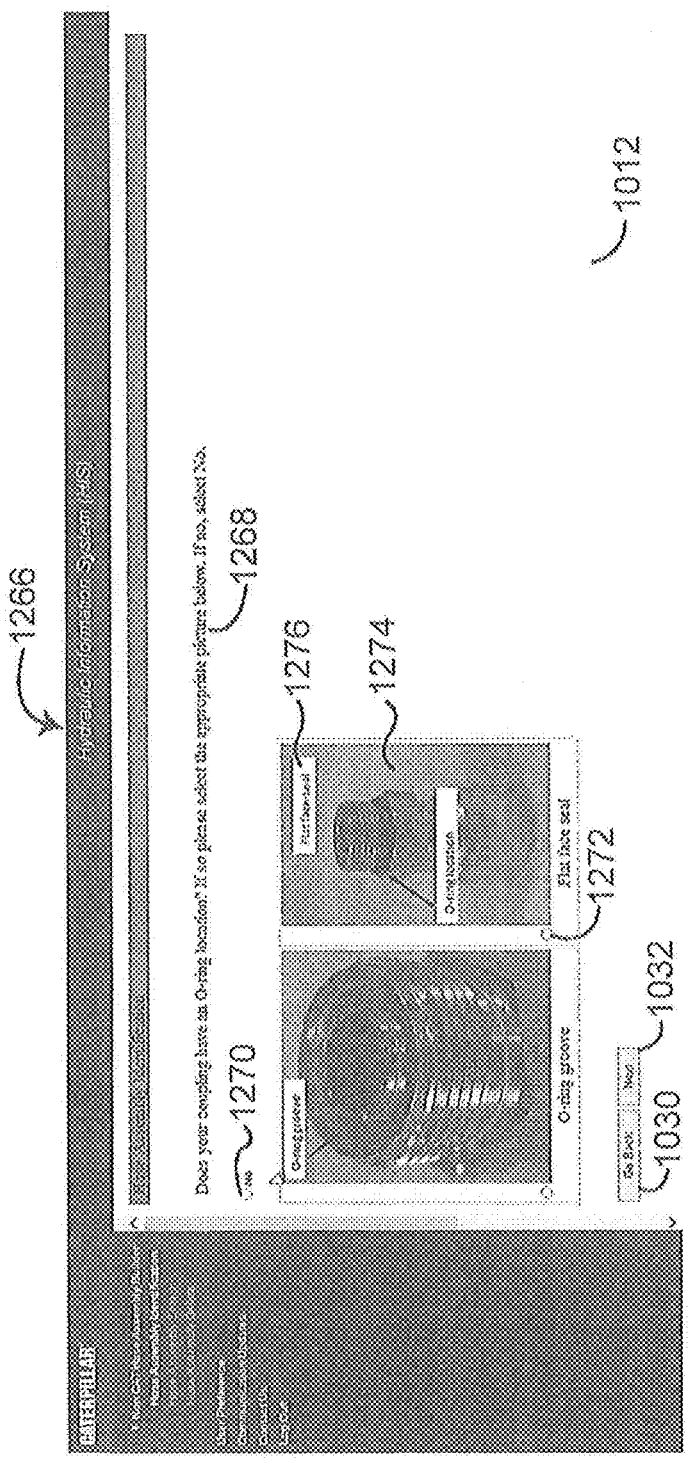
FIG. 35 is a user interface for selecting an O-ring location in the hose assembly builder tool in accordance with the present invention.

With reference now to FIG. 12, at step 1260 the hose assembly builder tool may prompt the user regarding the existence of an O-ring seal location on the second manufacturer's coupling. If, for example, the second manufacturer's coupling includes an O-ring seal, the user may select the location of the O-ring from a set of options. Step 1260 is illustrated by FIG. 35, which displays an O-ring selection screen 1266.

The O-ring selection screen 1266 may include the main panel 1012, as well as an inquiry 1268 as to whether or not the second manufacturer's coupling has an O-ring location. If the second manufacturer's coupling does not have an O-ring location, the user may select an option 1270 indicating as such. In this example, the option 1270 may have a "No" value. If the second manufacturer's coupling has an O-ring location, the user may select the location from a set of options 1272. Each O-ring location may be displayed with an image 1274 of the O-ring location on a coupling and a description 1276 of the O-ring location, so the user may easily identify the location of the O-ring on the second manufacturer's coupling. In this example, values for response may include "O-ring groove," and "Flat face seal," although other values may be used.

Depending on the user's response to the inquiry 1268, the hose assembly builder tool may respond differently. If the user indicates the second manufacturer's coupling does not have an O-ring location (in this example, by selecting the "No" option 1270), and then selects the "Next" button 1032, the user will be directed to step 1278 to determine a seat angle style of the second manufacturer's coupling. If, instead, the user indicates the second manufacturer's coupling has an O-ring groove arrangement (in this example, by selecting the "O-ring groove" option), and then selects the "Next" button 1032, the user will be directed to step 1280 to select an outside diameter of the thread of the second manufacturer's coupling. Finally, if the user indicates the second manufacturer's coupling has flat face seal arrangement (in this example, by selecting the "Flat face seal" option), and then selects the "Next" button 1032, the user will be directed to step 1281 to select an outside diameter of the thread of the second manufacturer's coupling.

Referring again to FIG. 12, at step 1280 the hose assembly builder tool may prompt the user to select an outside diameter of the of the second manufacturer's coupling. The interface screen related to step 1280 is illustrated thread at FIG. 36, which depicts a thread outside diameter selection screen 1284.

The main panel 1012 of the thread outside diameter selection screen 1284 may include direction 1286 to measure the outside diameter of the second manufacturer's coupling thread, along with a drop-down menu 1288 including values for the user to select in response to the inquiry. The main panel 1012 may also include an image 1290, text instruction or other diagram or visual representation illustrating to the user the proper method for measuring the outside diameter of the second manufacturer's thread. In this example, the drop-down menu 1288 is populated when the hose assembly builder tool loads the screen 1284. When the user navigates to the thread outside diameter selection screen 1284, the user executes a filtering process in order to populate the drop-down menu 1288. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, an O_RING 150 field has a value of "Yes," a value in the THRD_TYP 154 field matches the value stored in the CPLNG_1_THRD_TYP 786 field, and where a value in the PART_SVC_LVL 180 field indicates the part is currently being manufactured. The hose assembly builder tool may then populate the drop-down menu 1288 with any values stored in the THRD_MAJ_OD 164 field. The hose assembly builder tool may display the values in the drop-down menu 1288 in a format of "mm-cm-inch," although other units of measure may be used. Once the user selects the size of the thread outside diameter of the second manufacturer's coupling from the drop-down menu 1288 and selects the "Next" button 1032, a thread outside diameter will be stored. The thread outside diameter size value may be stored, in mm, in the hose assembly build table 700 (FIG. 9) at an external thread major outside diameter (ETHD_1_THRD_MAJ_OD) 810 field, for future reference by the hose assembly builder tool.

Figure 37:
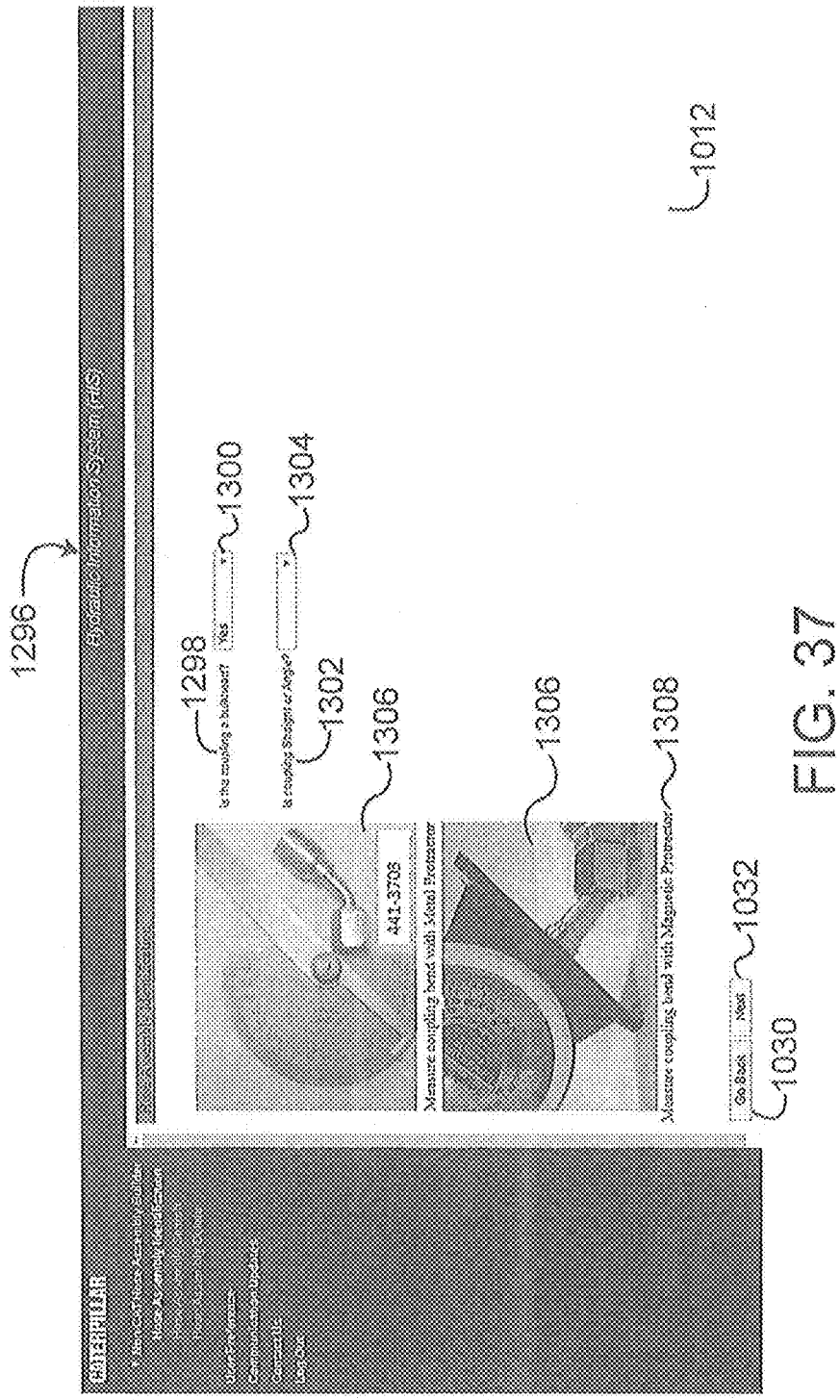
FIG. 37 is a user interface for selecting a bulk head indicator and coupling angle in the hose assembly builder tool in accordance with the present invention.

The hose assembly builder tool may query the user as to whether the second manufacturer's coupling is a bulkhead at step 1292 (FIG. 12), as well as query whether the second manufacturer's coupling is straight or angled at step 1294 (FIG. 12). At step 1292, the hose assembly builder tool may prompt the user as to whether the second manufacturer's coupling is a bulkhead. At step 1294, the hose assembly builder tool may prompt the user as to the angle of the coupling. Step 1292 and step 1294 are illustrated by FIG. 37, which displays a bulk head indicator and coupling angle screen 1296. The bulk head indicator and coupling angle screen 1296 may include an inquiry 1298 as to whether or not the second manufacturer's coupling is a bulkhead fitting, along with a drop-down menu 1300 with values for the user to select in response to the inquiry. In this example, the values for response may include "Yes," "No," and "I Don't Know," although other values may be used depending, for example, on the wording of the inquiry 1298. If the user selects the "Yes" or "No" response from the drop-down menu 1300 and selects the "Next" button 1032, a bulkhead indicator value will be stored. The bulkhead indicator value may be stored in the hose assembly build table 700 (FIG. 9) at a bulkhead indicator (ETHD_1_BULK_HEAD) 814 field, for future reference by the hose assembly builder tool. Alternatively, if the user indicates that he or she is unsure whether the second manufacturer's coupling is a bulkhead fitting (in this example, by selecting the "I Don't Know" option), and then selects the "Next" button 1032, the user will be directed to the help screen 1150 (FIG. 27).

At step 1294, the hose assembly builder tool may prompt the user as to the coupling bend angle. The bulk head indicator and coupling angle screen 1296, therefore, may also include an inquiry 1302 as to the bend angle of the second manufacturer's coupling, along with a drop-down menu 1304 with values for the user to select in response to the inquiry. The main panel 1012 may also include at least one image 1306, text instruction 1308, or other visual representation illustrating to the user the proper method for measuring a coupling bend angle using a metal protractor and with a magnetic protractor. In this example, the drop-down menu 1304 is populated when the hose assembly builder tool loads the screen 1296. When the user navigates to the bulk head indicator and coupling angle screen 1296, the user executes a filtering process in order to populate the drop-down menu 1304. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the values stored in the HOSE_DASH_SIZE 778 field, an O_RING 150 field has a value of "Yes," a value in the THRD_TYP 154 field matches the value stored in the CPLNG_1_THRD_TYP 786 field, a value in the THRD_MAJ_OD 164 field matches the value stored in the ETHD_1_THRD_MAJ_OD 810 field, a value in the BULK_HEAD field 158 matches the value stored in the ETHD_1_BULK_HEAD 814 field, and where a value in the PART_SVC_LVL 180 field indicates the part is currently being manufactured. The hose assembly builder tool may then populate the drop-down menu 1304 with any values stored in the CPLNG_BND 110 field. Once the user selects the coupling bend angle of the second manufacturer's coupling from the drop-down menu 1304 and selects the "Next" button 1032, a coupling bend angle will be stored. The coupling bend angle measurement may be stored in the hose assembly build table 700 (FIG. 9) at an external male coupling bend angle (ETHD_1_CPLNG_BND) 798 field, for future reference by the hose assembly builder tool.

Figure 36:
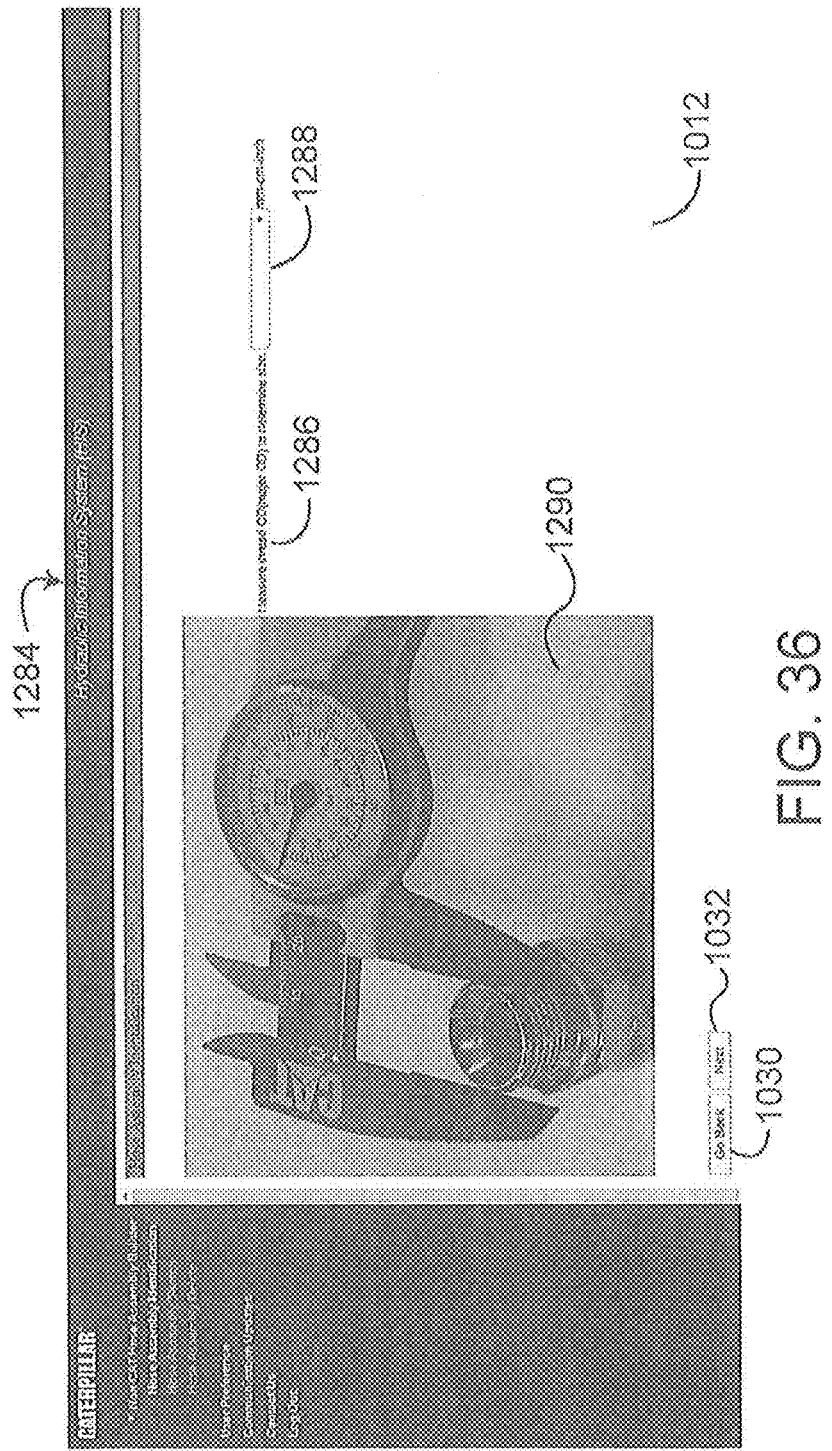
FIG. 36 is a user interface for selecting an outside diameter of a coupling in the hose assembly builder tool in accordance with the present invention.
Figure 38:
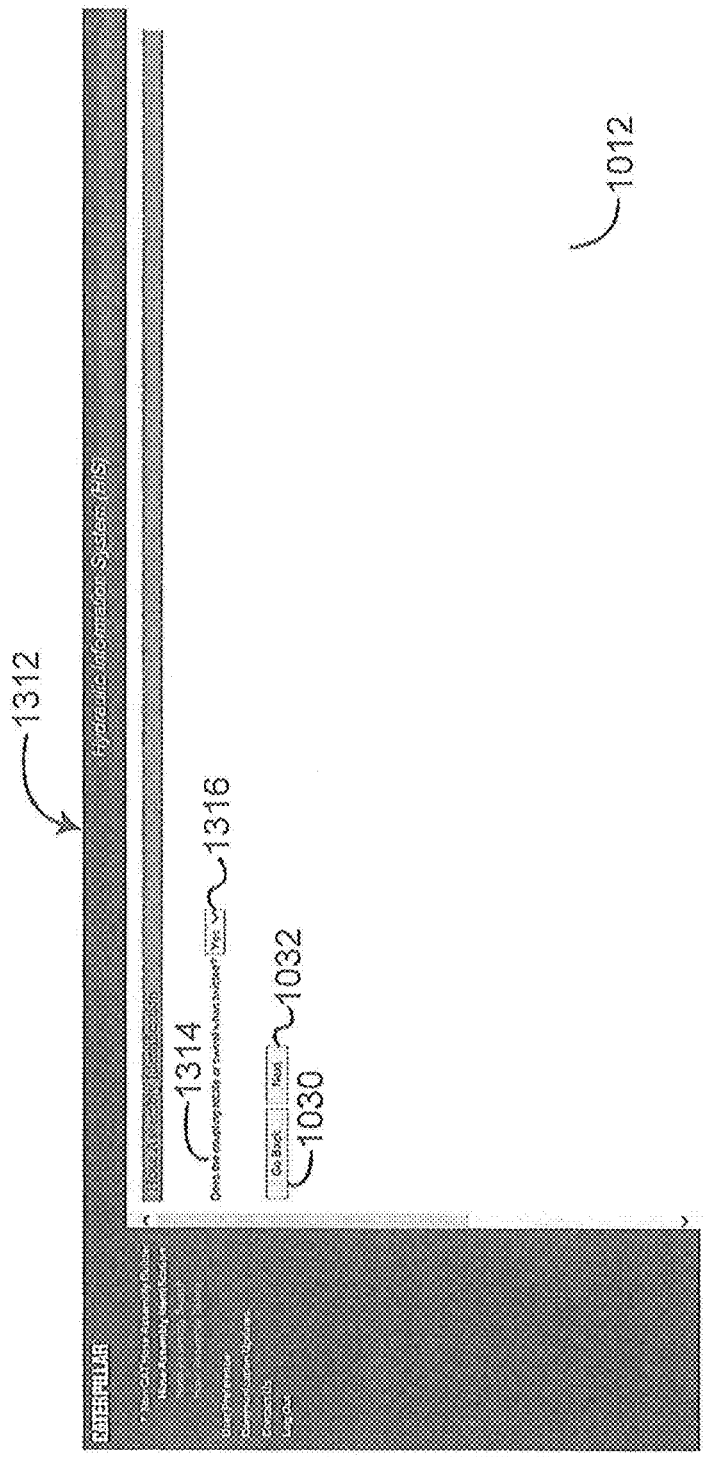
FIG. 38 is a user interface for selecting a coupling swivel in the hose assembly builder tool in accordance with the present invention.

Referring again to FIG. 12, at step 1281, the hose assembly builder tool may direct the user to the thread outside diameter selection screen 1284 (FIG. 36). After completing the thread outside diameter selection screen 1284 in step 1281, the user may proceed to step 1310. This step 1310 may prompt the user as to whether or not the coupling rotates or swivels when twisted. The interface screen related to step 1281 is illustrated at FIG. 38, which depicts a swivel information screen 1312.

The main panel 1012 of the swivel information screen 1312 may include an inquiry 1314 as to whether or not the coupling rotates or swivels when twisted, along with a drop-down menu 1316 with values for the user to select in response to the inquiry. In this example, the values for response may include "Yes" and "No," although other values may be used depending, for example, on the wording of the inquiry 1314. The swivel information screen 1312 may also include the button 1030, which the user may select to go back to the immediately previous page (here, for example, the thread outside diameter selection screen 1284) and the button 1032, which a user may select to move to the next step 1318 to determine a coupling bend angle. Once the user selects the swivel indicator from the drop-down menu 1316 and selects the "Next" button 1032, a swivel indicator may be stored. The swivel indicator may be stored in the hose assembly build table 700 (FIG. 9) at an external thread swivel (ETHD_1_SWIVEL) 822 field, for future reference by the hose assembly builder tool.

Figure 39:
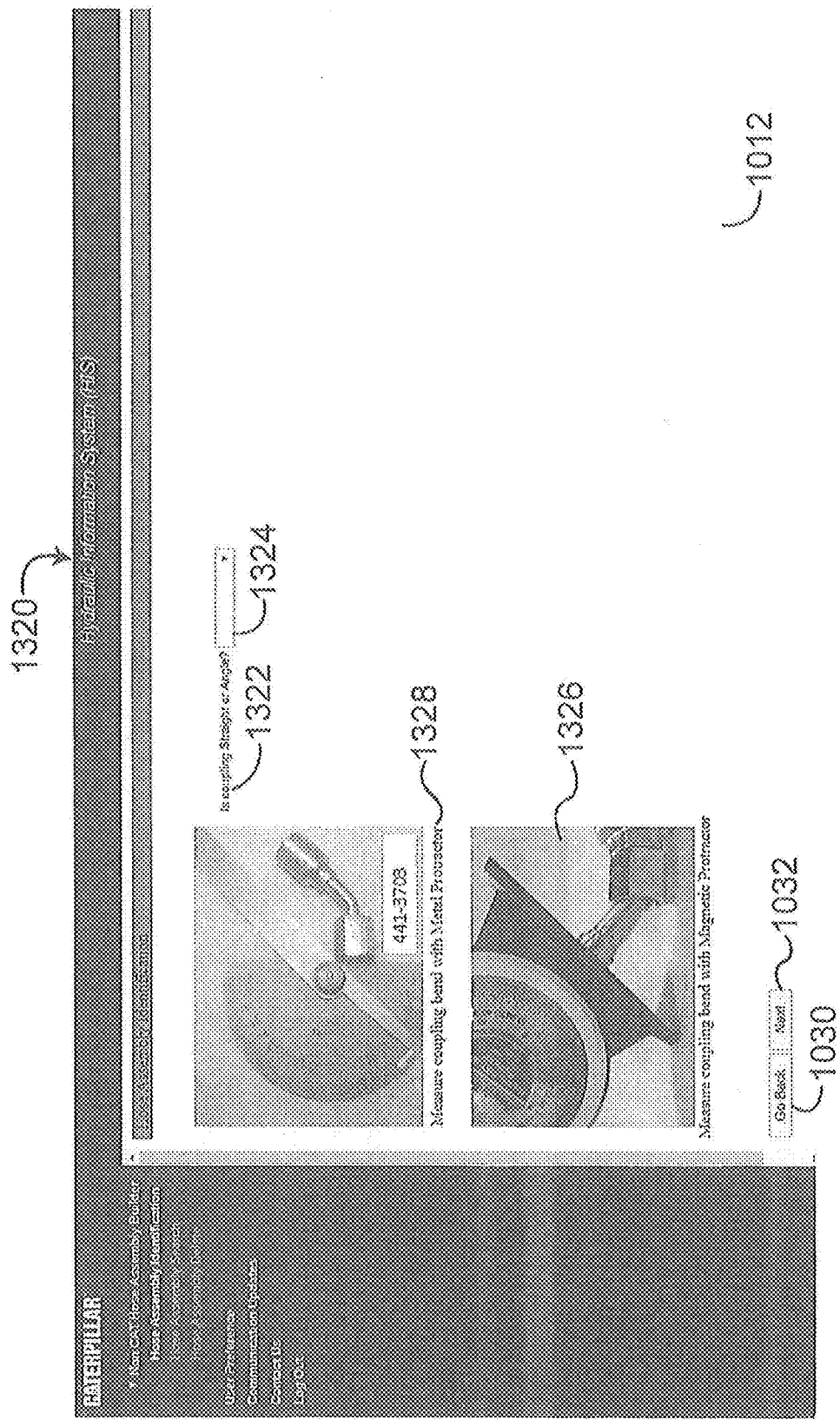
FIG. 39 is a user interface for selecting a coupling angle in the hose assembly builder tool in accordance with the present invention.

The hose assembly builder tool may query whether the second manufacturer's coupling is straight or angled at step 1318 (FIG. 12). Step 1318 is illustrated by FIG. 39, which displays a coupling bend angle screen 1320. The coupling bend angle screen 1320 may prompt the user as to the coupling bend angle. The coupling bend angle screen 1320, therefore, may also include an inquiry 1322 as to the bend angle of the second manufacturer's coupling, along with a drop-down menu 1324 with values for the user to select in response to the inquiry. The main panel 1012 may also include at least one image 1326, text instruction 1328, or other visual representation illustrating to the user the proper method for measuring a coupling bend angle using a metal protractor and with a magnetic protractor. In this example, the drop-down menu 1324 is populated when the hose assembly builder tool loads the screen 1320. When the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "Yes," a value in the THRD_TYP 154 field matches the value stored in the CPLNG_1_THRD_TYP 786 field, a value in the THRD_MAJ_OD 164 field matches the value stored in the ETHD_1_THRD_MAJ_OD 810 field, a value in the SWIVEL 160 field matches the value stored in the ETHD_1_SWIVEL 822 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external thread coupling bend angle (ETHD_1_CPLNG_BND) 798 field, for future reference by the hose assembly builder tool.

Figure 40:
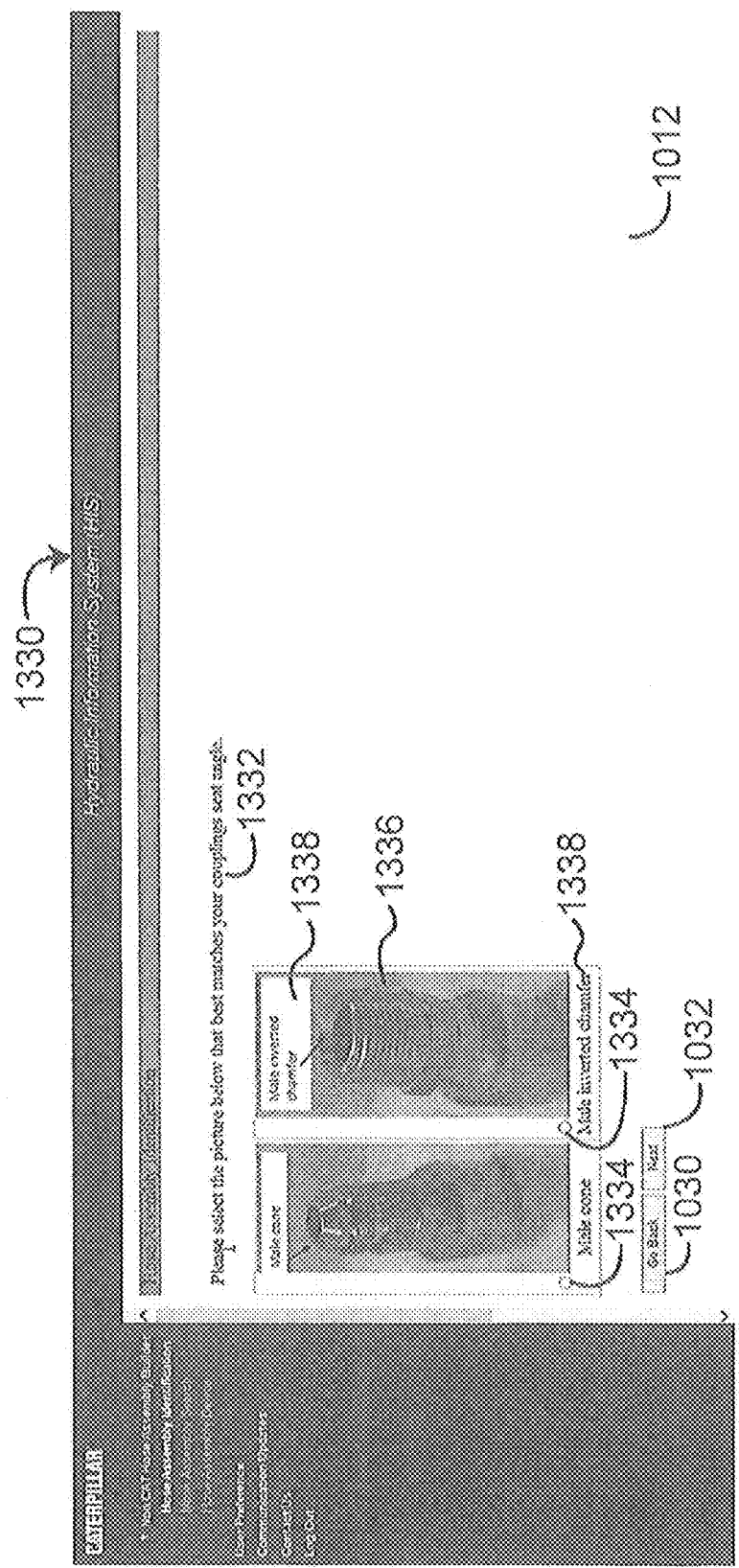
FIG. 40 is a user interface for selecting a coupling seat angle in the hose assembly builder tool in accordance with the present invention.

Continuing at step 1278, the hose assembly builder tool may prompt the user to select a coupling seat angle style of the second manufacturer's coupling. The interface screen related to step 1278 is illustrated at FIG. 40, which depicts a coupling seat angle style selection screen 1330.

The main panel 1012 of the coupling seat angle style selection screen 1330 may include a direction 1332 to the user to select a coupling seat angle style of the second manufacturer's coupling, along with a set of options 1334 with values for the user to select in response to the inquiry. The user may select the coupling seat angle style from the set of options 1334. Each coupling seat angle style may be displayed with an image 1336 of the seat angle style and a description 1338 of the seat angle style, so the user may more easily identify the second manufacturer's coupling seat angle style. In this example, values for response may include "Male cone," and "Male inverted chamfer," although other values may be used. Depending on the user's response to the direction 1332, the hose assembly builder tool may respond differently. If the user indicates the second manufacturer's coupling has a male cone coupling seat angle style (in this example, by selecting the "Male cone" option from the set of options 1334), and then selects the "Next" button 1032, the user will be directed to step 1340 (FIG. 12) related to identifying a seat angle measurement. If, however, the user indicates the second manufacturer's coupling has a male inverted coupling seat angle style (in this example, by selecting the "Male inverted chamfer" option from the set of options 1334), and then selects the "Next" button 1032, the user will be directed to step 1342 related to identifying a seat angle measurement. When the user selects the "Next" button 1032, regardless the coupling seat angle style selected, the coupling family (e.g. male cone, female swivel, etc.) associated with the selected coupling seat angle style may be stored in the hose assembly build table 700 (FIG. 9) at the first coupling family (ETHD_1_CPLNG_FAM) 802 field, for future reference by the hose assembly tool.

Figure 41:
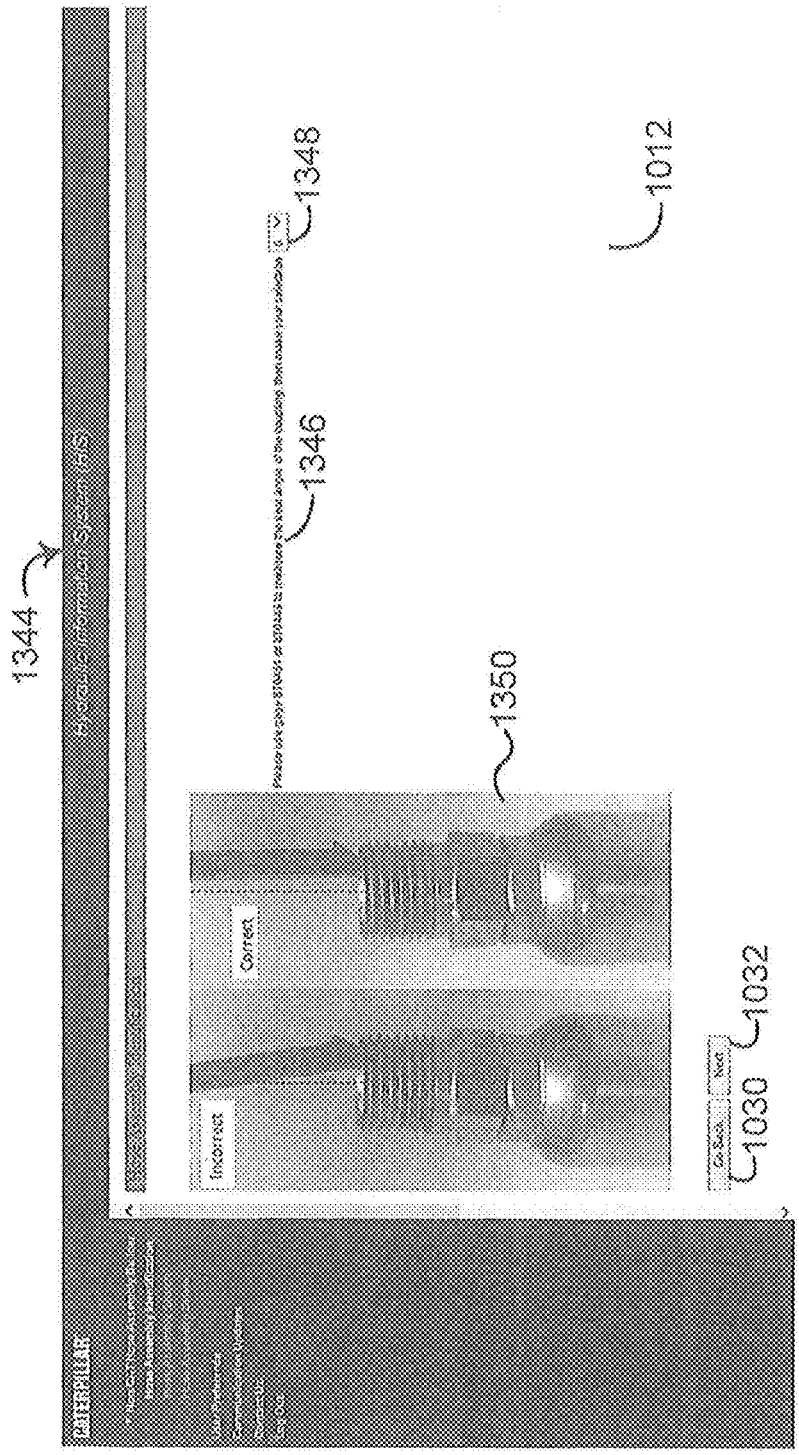
FIG. 41 is a user interface for selecting a coupling seat angle measurement in the hose assembly builder tool in accordance with the present invention.

Referring back to FIG. 12, at step 1340 the hose assembly builder tool may prompt the user to select a coupling seat angle of the second manufacturer's coupling. Using a gauge, the user may measure the seat angle of the coupling. The interface screen related to step 1340 is illustrated at FIG. 41, which depicts a seat angle measurement screen 1344.

The main panel 1012 of the seat angle measurement screen 1344 may include direction 1346 to select a measured seat angle of the second manufacturer's coupling, as well as at least one image 1350 or text instruction indicating a proper procedure and alignment for measuring the seat angle of the second manufacturer's coupling. The seat angle measurement screen 1344 may also include a drop-down menu 1348 having values for the user to select in response to the inquiry. In this example, the drop-down menu 1348 is populated when the hose assembly builder tool loads the screen 1344. When the user navigates to the seat angle measurement screen 1344, the user executes a filtering process in order to populate the drop-down menu 1348. To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ETHD_1_CPLNG_FAM 802 field, an O_RING 150 field has a value of "No," a value in the THRD_TYP 154 field matches the value stored in the CPLNG_1_THRD_TYP 786 field, and where a value in the PART_SVC_LVL 180 field indicates the part is currently being manufactured. The hose assembly builder tool may then populate the drop-down menu 1348 with any values stored in the SEAT_ANG 152 field.

Depending on the user's response to the direction 1346 and selection from the drop-down menu 1348, the hose assembly builder tool may respond differently. If the user indicates the second manufacturer's coupling has a 37 degree or 45 degree seat angle (in this example, by selecting a "37" or "45" option from the drop-down menu 1348), and then selects the "Next" button 1032, the user will be directed to step 1352 (FIG. 12) related to identifying a coupling bend angle measurement. If, however, the user indicates the second manufacturer's coupling has a 30 degree seat angle (in this example, by selecting the "30" option from the drop-down menu 1348), and then selects the "Next" button 1032, the user will be directed to step 1354 related to selecting a coupling thread size. When the user selects the "Next" button 1032, regardless of the coupling seat angle selected, the coupling seat angle may be stored in the hose assembly build table 700 (FIG. 9) at the first external thread coupling seat angle (ETHD_1_SEAT_ANG) 826 field, for future reference by the hose assembly tool.

Continuing to step 1352 (FIG. 12), the hose assembly builder tool may query whether the second manufacturer's coupling is straight or angled. Step 1352 is illustrated at FIG. 39, as discussed above. The coupling bend angle screen 1320 may prompt the user as to the coupling bend angle using the drop-down menu 1324 with values for the user to select in response to the inquiry. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the SEAT_ANG 152 field matches the value stored in the ETHD_1_SEAT_ANG 826 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ETHD_1_CPLNG_BND) 834 field, for future reference by the hose assembly tool.

Figure 42:
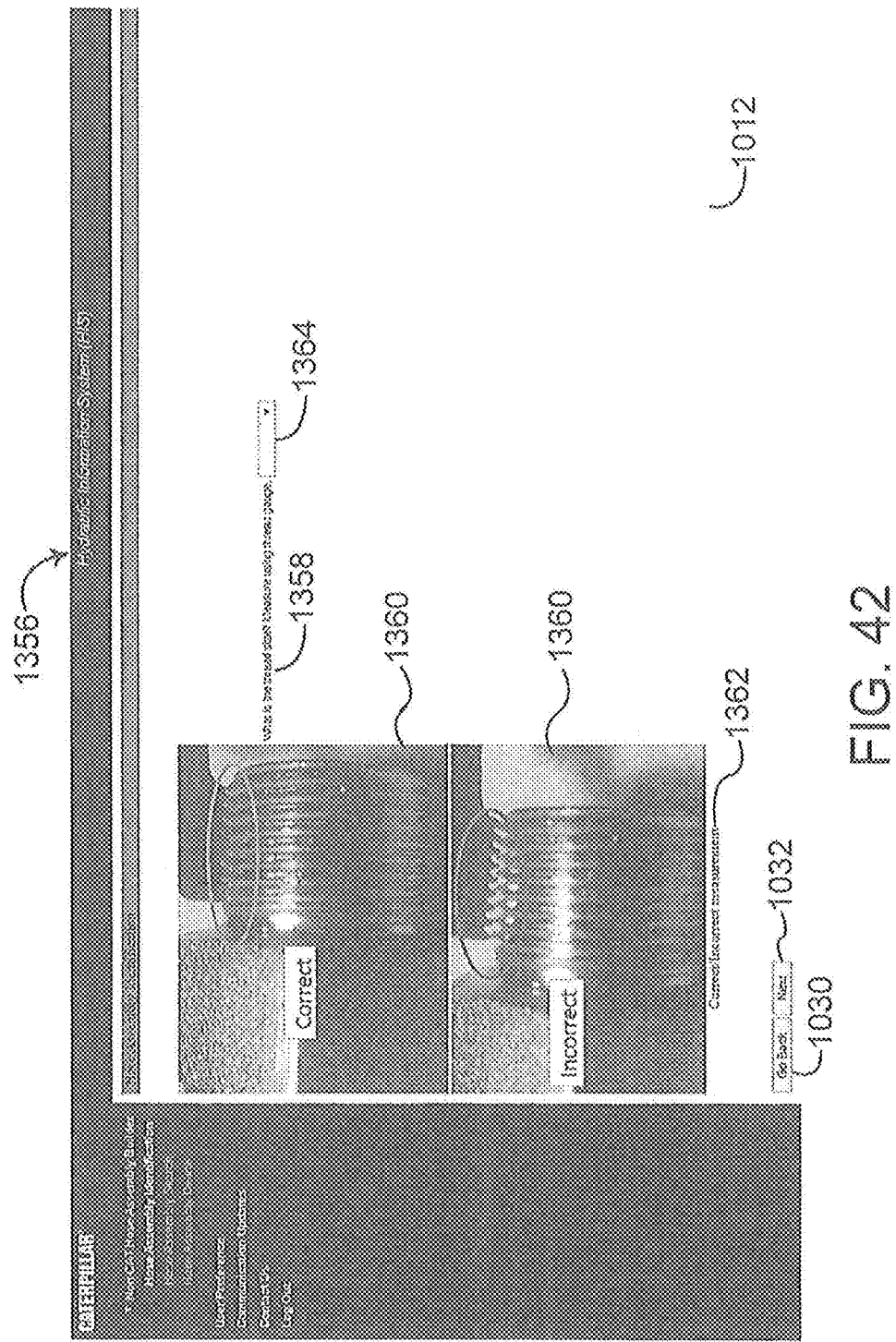
FIG. 42 is a user interface for selecting a thread size in the hose assembly builder tool in accordance with the present invention.

Referring again to FIG. 12, at step 1354 the hose assembly builder tool may prompt the user to measure and select a thread size of the male external thread. Using a thread gauge, the user may measure the gauge of the threads of the second manufacturer's coupling. The interface screen related to step 1354 is illustrated at FIG. 42, which depicts a thread gauge measurement screen 1356. The main panel 1012 of the thread gauge measurement screen 1356 may include direction 1358 to select a measured thread gauge of the second manufacturer's coupling, as well as at least one image 1360 and/or a text instruction 1362 indicating a proper procedure and alignment for measuring the thread gauge of the second manufacturer's coupling. The thread gauge measurement screen 1356 may also include a drop-down menu 1364 having values for the user to select in response to the inquiry. In this example, the drop-down menu 1364 is populated when the hose assembly builder tool loads the screen 1356. When the user navigates to the thread gauge measurement screen 1356, the user executes a filtering process in order to populate the drop-down menu 1364. To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ETHD_1_CPLNG_FAM 802 field, an O_RING 150 field has a value of "No," a value in the THRD_TYP 154 field matches the value stored in the CPLNG_1_THRD_TYP 786 field, and where a value in the PART_SVC_LVL 180 field indicates the part is currently being manufactured. The hose assembly builder tool may then populate the drop-down menu 1364 with any values stored in the THRD_SIZE 120 field. When the user selects the thread gauge size value from the drop-down menu, and then selects the "Next" button 1032, the user may be directed to the next step 1366 to determine a coupling bend angle, and the selected thread gauge size value may be stored in the hose assembly build table 700 (FIG. 9) at the external thread size (ETHD_1_THRD_SIZE) 830 field, for future reference by the hose assembly tool.

Continuing to step 1366 (FIG. 12), the hose assembly builder tool may query whether the second manufacturer's coupling is straight or angled. Step 1366 is illustrated at FIG. 39, as discussed above. The coupling bend angle screen 1320 may prompt the user as to the coupling bend angle using the drop-down menu 1324 with values for the user to select in response to the inquiry. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the SEAT_ANG 152 field matches the value stored in the ETHD_1_SEAT_ANG 826 field, a value in the THRD_SIZE 120 field matches the value stored in the ETHD_1_THRD_SIZE 120 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ETHD_1_CPLNG_BND) 834 field, for future reference by the hose assembly builder tool.

Referring again to FIG. 12, at step 1342 the hose assembly builder tool may prompt the user to select a coupling seat angle of the second manufacturer's coupling. Step 1342 is illustrated at FIG. 41, as discussed above. The seat angle measurement screen 1344 may prompt the user to select a coupling seat angle of the second manufacturer's coupling using the drop-down menu 1348 with values for the user to select in response to the inquiry. In this example, when the user navigates to the seat angle measurement screen 1344, the user executes a filtering process in order to populate the drop-down menu 1348. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 matches the value stored in the ETHD_1_CPLNG_FAM, and where a value in the PART_SVC_LVL 180 field indicates the part is currently being manufactured. The hose assembly builder tool may then populate the drop-down menu 1348 with any values stored in the SEAT_ANG 152 field. Once the user selects the seat angle of the second manufacturer's coupling from the drop-down menu 1348 and selects the "Next" button 1032, a coupling seat angle will be stored. The coupling seat angle measurement may be stored in the hose assembly build table 700 (FIG. 9) at an external coupling seat angle (ETHD_1_SEAT_ANG) 826 field, for future reference by the hose assembly builder tool.

Depending on the user's response to the direction 1346 and selection from the drop-down menu 1348, the hose assembly builder tool may respond differently. If the user indicates the second manufacturer's coupling has a 0 degree or 45 degree seat angle (in this example, by selecting a "0" or "45" option from the drop-down menu 1348), and then selects the "Next" button 1032, the user will be directed to step 1368 (FIG. 12) related to identifying a coupling thread outside diameter. If, however, the user indicates the second manufacturer's coupling has a 15 degree seat angle (in this example, by selecting the "15" option from the drop-down menu 1348), and then selects the "Next" button 1032, the user will be directed to step 1370 related to selecting a coupling thread size. Finally, if the user indicates the second manufacturer's coupling has a 30 degree seat angle (in this example, by selecting the "30" option from the drop-down menu 1348), and then selects the "Next" button 1032, the user will be directed to step 1372 related to identifying whether the coupling threads are tapered or straight. When the user selects the "Next" button 1032, regardless of the coupling seat angle selected, the coupling seat angle may be stored in the hose assembly build table 700 (FIG. 9) at the first external thread coupling seat angle (ETHD_1_SEAT_ANG) 826 field, for future reference by the hose assembly tool.

At step 1368 (FIG. 12) the hose assembly builder tool may direct the user to the thread outside diameter selection screen 1284 (FIG. 36). In this example, when the user navigates to the thread outside diameter selection screen 1284, the user executes a filtering process in order to populate the drop-down menu 1288. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 matches the value stored in the ETHD_1_CPLNG_FAM, a value in the SEAT_ANG 152 field matches the value stored in the ETHD_1_SEAT_ANG 826 field, and where a value in the PART_SVC_LVL 180 field indicates the part is currently being manufactured. The hose assembly builder tool may then populate the drop-down menu 1288 with any values stored in the THRD_MAJ_OD 164 field. Once the user selects the outside diameter of the second manufacturer's coupling thread from the drop-down menu 1288 and selects the "Next" button 1032, a thread outside diameter will be stored. The thread outside diameter size value may be stored, in mm, in the hose assembly build table 700 (FIG. 9) at an external thread major outside diameter (ETHD_1_THRD_MAJ_OD) 810 field, for future reference by the hose assembly builder tool. Regardless of the selection made by the user, the hose assembly builder tool will direct the user to the next step 1374 to determine a swivel value.

At step 1374 (FIG. 12) the hose assembly builder tool may direct the user to the swivel information screen 1312

(FIG. 38). After completing the swivel information screen 1312 in step 1374, the user may proceed to step 1376. At step 1376 (FIG. 12), the hose assembly builder tool may query whether the second manufacturer's coupling is straight or angled. Step 1376 is illustrated at FIG. 39, as discussed above. The coupling bend angle screen 1320 may prompt the user as to the coupling bend angle using the drop-down menu 1324 with values for the user to select in response to the inquiry. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the SWIVEL 160 field matches the value stored in the ETHD_1_SWIVEL 822 field, a value in the THRD_MAJ_OD 164 field matches the value stored in the ETHD_1_THRD_MAJ_OD 810 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ETHD_1_CPLNG_BND) 834 field, for future reference by the hose assembly builder tool.

Moving on to step 1370, as shown in FIG. 12, the hose assembly builder tool may direct the user to the thread gauge measurement screen 1356 (FIG. 42). As discussed above, the thread gauge measurement screen 1356 may include a drop-down menu 1364 having values for the user to select in response to the inquiry. In this example, the drop-down menu 1364 is populated when the hose assembly builder tool loads the screen 1356. When the user navigates to the thread gauge measurement screen 1356, the user executes a filtering process in order to populate the drop-down menu 1364. To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ETHD_1_CPLNG_FAM 802 field, an O_RING 150 field has a value of "No," a value in the SEAT_ANG 152 field matches a value stored in the ETHD_1_SEAT_ANG 826 field, a value in the THRD_TYP 154 field matches the value stored in the CPLNG_1_THRD_TYP 786 field, and where a value in the PART_SVC_LVL 180 field indicates the part is currently being manufactured. The hose assembly builder tool may then populate the drop-down menu 1364 with any values stored in the THRD_SIZE 120 field. When the user selects the thread gauge size value from the drop-down menu, and then selects the "Next" button 1032, the user may be directed to the next step 1378 to determine a thread outside diameter, and the selected thread gauge size value may be stored in the hose assembly build table 700 (FIG. 9) at the external thread size (ETHD_1_THRD_SIZE) 830 field, for future reference by the hose assembly tool.

At step 1378 (FIG. 12) the hose assembly builder tool may direct the user to the thread outside diameter selection screen 1284 (FIG. 36). In this example, when the user navigates to the thread outside diameter selection screen 1284, the user executes a filtering process in order to populate the drop-down menu 1288. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 matches the value stored in the ETHD_1_CPLNG_FAM, a value in the SEAT_ANG 152 field matches the value stored in the ETHD_1_SEAT_ANG 826 field, a value in the THRD_SIZE 120 field matches the value stored in the ETHD_1_THRD_SIZE 830 field, and where a value in the PART_SVC_LVL 180 field indicates the part is currently being manufactured. The hose assembly builder tool may then populate the drop-down menu 1288 with any values stored in the THRD_MAJ_OD 164 field. Once the user selects the outside diameter of the second manufacturer's coupling thread from the drop-down menu 1288 and selects the "Next" button 1032, a thread outside diameter will be stored. The thread outside diameter size value may be stored, in mm, in the hose assembly build table 700 (FIG. 9) at an external thread major outside diameter (ETHD_1_THRD_MAJ_OD) 810 field, for future reference by the hose assembly builder tool. Regardless of the selection made by the user, the hose assembly builder tool will direct the user to the next step 1380 to determine an outside diameter of a tube.

Figure 43:
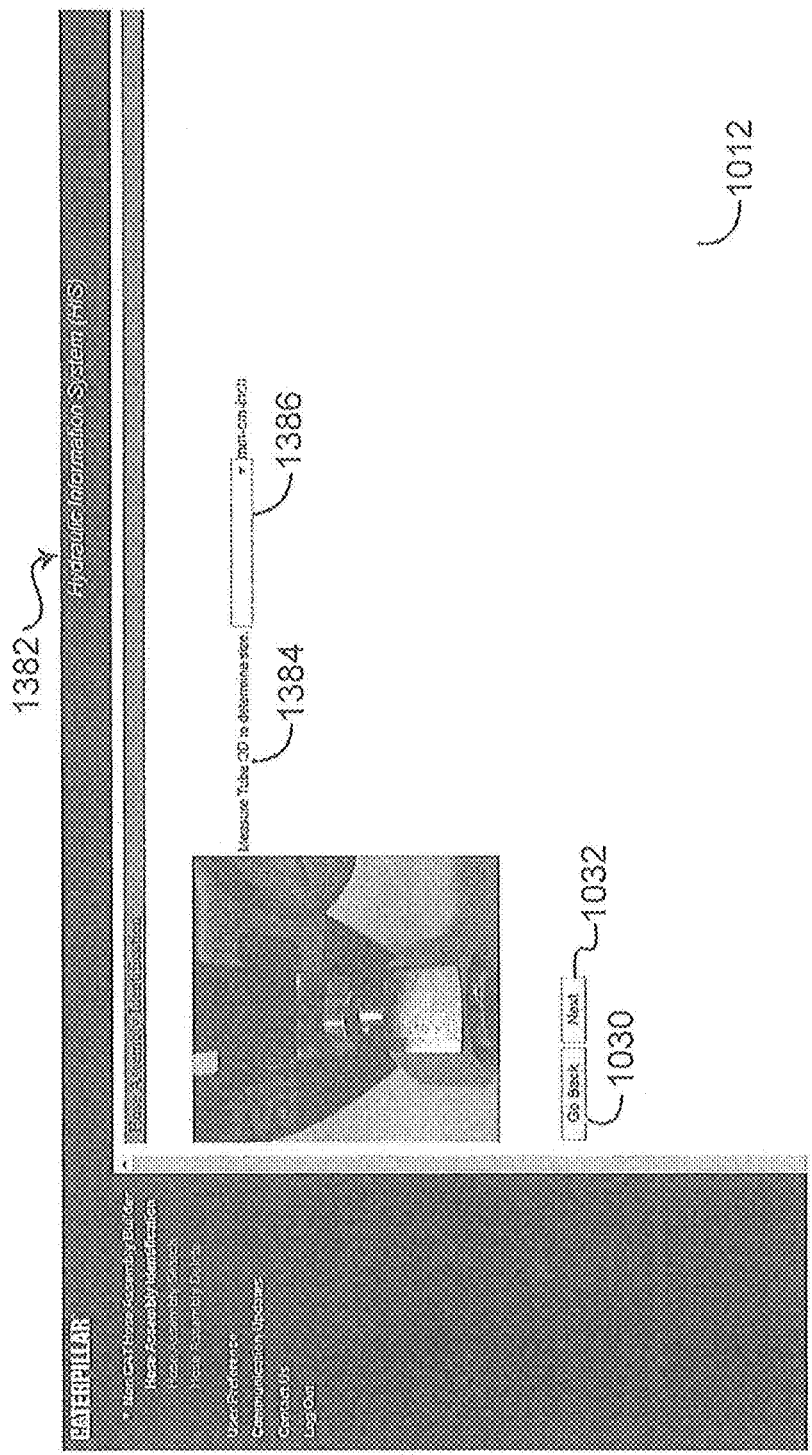
FIG. 43 is a user interface for selecting a tube outside diameter in the hose assembly builder tool in accordance with the present invention.

Referring now to FIG. 12, the hose assembly builder tool may prompt the user to measure and select a tube outside diameter of the second manufacturer's coupling (step 1380). The interface screen related to step 1380 is illustrated at FIG. 43, which depicts a tube outside diameter measurement screen 1382. The main panel 1012 of the tube outside diameter measurement screen 1382 may include a direction 1384 to the user to measure an outside diameter of the second manufacturer's coupling tube, and select its size. The main panel 1012 may also include a drop-down menu 1386, with values for the user to select in response to the inquiry. In this example, when the user navigates to the a tube outside diameter measurement screen 1382, the user executes a filtering process in order to populate the drop-down menu 1386.

To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 matches the value stored in the ETHD_1_CPLNG_FAM, a value in the SEAT_ANG 152 field matches the value stored in the ETHD_1_SEAT_ANG 826 field, a value in the THRD_SIZE 120 field matches the value stored in the ETHD_1_THRD_SIZE 830 field, a value in the THRD_MAJ_OD 164 matches a value stored in the ETHD_1_THRD_MAJ_OD 810 field, and where a value in the PART_SVC_LVL 180 field indicates the part is currently being manufactured. The hose assembly builder tool may then populate the drop-down menu 1386 with any values stored in the TUBE_OD 168 field. Once the user selects the outside diameter of the second manufacturer's coupling tube from the drop-down menu 1386 and selects the "Next" button 1032, a tube outside diameter will be stored. The tube outside diameter value may be stored, in mm, in the hose assembly build table 700 (FIG. 9) at an external tube outside diameter (ETHD_1_TUBE_OD) 810 field, for future reference by the hose assembly builder tool.

Figure 44:
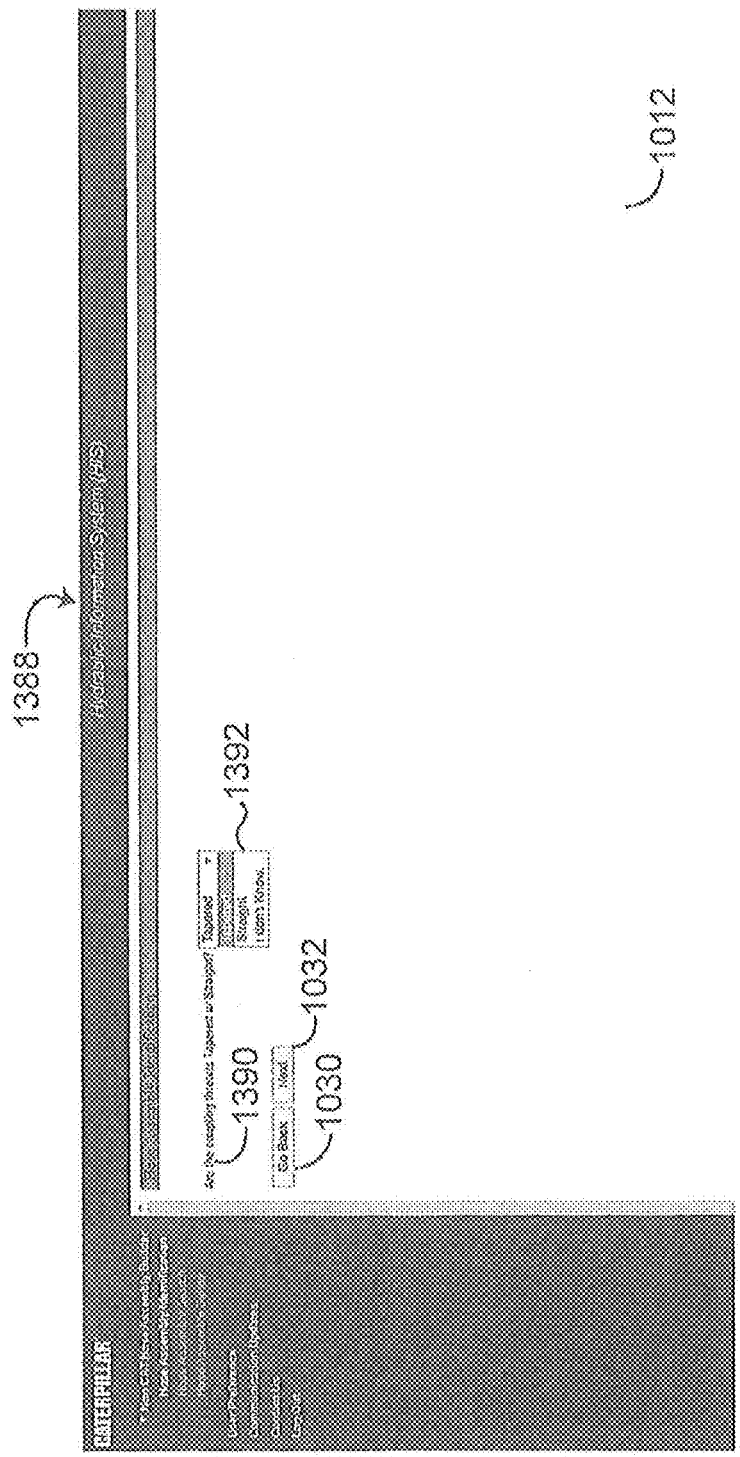
FIG. 44 is a user interface for selecting a taper or straight thread in the hose assembly builder tool in accordance with the present invention.
Figure 45:
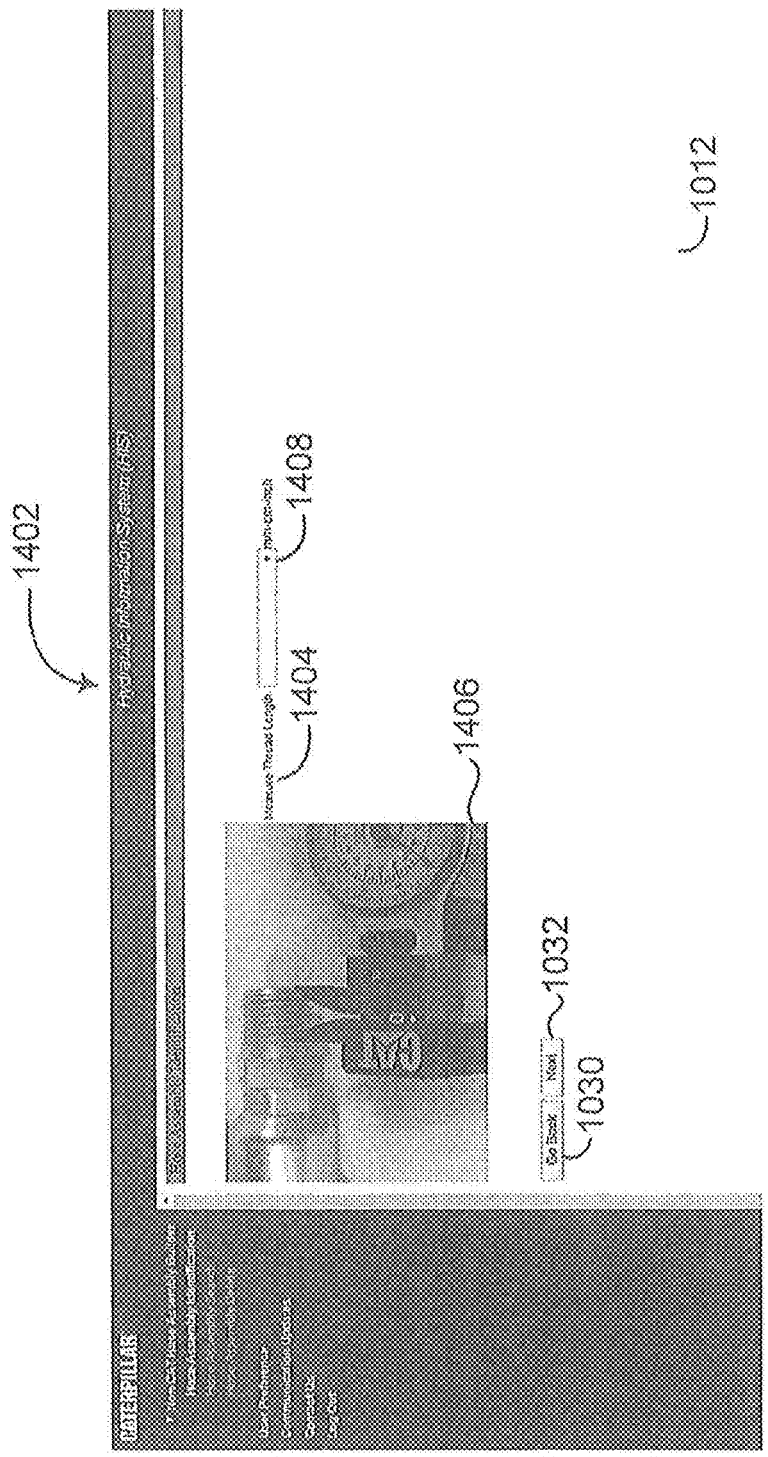
FIG. 45 is a user interface for selecting a thread length in the hose assembly builder tool in accordance with the present invention.

If, at step 1342 (FIG. 12), the user indicates the seat angle of the second manufacturer's coupling is 30 degrees, the hose assembly builder tool will direct the user to step 1372 (FIG. 12). At step 1372, the hose assembly builder tool may prompt the user as whether the second manufacturer's coupling threads are tapered or straight. An interface screen related to step 1372 is illustrated at FIG. 44, which depicts a taper selection screen 1388.

The main panel 1012 of the taper selection screen 1388 may include an inquiry 1390 as to whether or not the second manufacturer's coupling threads are tapered or straight, along with a drop-down menu 1392 with values for the user to select in response to the inquiry. In this example, the values for response may include "Tapered," "Straight," and "I Don't Know," although other values may be used depending, for example, on the wording of the inquiry 1390. Depending on the user's response to the inquiry 1390, the hose assembly builder tool may respond differently. If the user indicates the second manufacturer's coupling has tapered threads (in this example, by selecting "Tapered" from the drop-down menu 1392), and then selects the "Next" button 1032, the user will be directed to step 1394 to determine a thread size of the second manufacturer's coupling. In this instance, the tapered value will be stored in the hose assembly build table 700 (FIG. 9) at the connection type (ETHD_1_CNT_TYP) 806 field, for future reference by the hose assembly builder tool. If, instead, the user indicates the second manufacturer's coupling has straight threads (in this example, by selecting "Straight" from the drop-down menu 1392), and then selects the "Next" button 1032, the user will be directed to step 1396 to determine a thread size of the second manufacturer's coupling. In this instance, the straight value will be stored in the hose assembly build table 700 (FIG. 9) at the connection type (ETHD_1_CNT_TYP) 806 field, for future reference by the hose assembly builder tool. Finally, if the user indicates that he or she is uncertain if the second manufacturer's coupling threads are straight or tapered (in this example, by selecting "I Don't Know" from the drop-down menu 1392), and then selects the "Next" button 1032, the user will be directed to the help screen 1150 (FIG. 27) and, optionally, the "Contact Us" page (FIG. 28).

To perform steps 1394 and 1396 (FIG. 12) the hose assembly builder tool may direct the user to the thread gauge measurement screen 1356, as illustrated in FIG. 42. As described above, the thread gauge measurement screen 1356 may include the drop-down menu 1364 having thread gauge measurement values for the user to select. In this example, the drop-down menu 1364 is populated when the hose assembly builder tool loads the thread gauge measurement screen 1356. To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ETHD_1_CPLNG_FAM 802 field, an O_RING 150 field has a value of "No," a value in the THRD_TYP 154 field matches the value stored in the CPLNG_1_THRD_TYP 786 field, a value in the SEAT_ANG 152 field matches the value stored in the ETHD_1_SEAT_ANG 826 field, a value in the CNT_TYP 146 field matches the value stored in the ETHD 1 CNT_TYP 806 field, and where a value in the PART_SVC_LVL 180 field indicates the part is currently being manufactured. The hose assembly builder tool may then populate the drop-down menu 1364 with any values stored in the THRD_SIZE 120 field. When the user selects the thread gauge size value from the drop-down menu, the selected thread gauge size value may be stored in the hose assembly build table 700 (FIG. 9) at the external thread size (ETHD_1_THRD_SIZE) 830 field, for future reference by the hose assembly tool. In step 1394, after selecting the thread gauge size value and selecting the "Next" button 1032, the user may be directed to a next step 1398 to determine a swivel indicator. Similarly, in step 1396, after selecting the thread gauge size value and selecting the "Next" button 1032, the user may be directed to a next step 1400 to determine a thread length.

Step 1400 (FIG. 12) prompts a user to measure and select a thread length of the second manufacturer's coupling. The interface screen related to step 1400 is illustrated at FIG. 36, which depicts a thread length measurement screen 1402. More specifically, the main panel 1012 of the thread length measurement screen 1402 may include in instruction 1404 to measure the length of the second manufacturer's coupling thread. The main panel 1012 may also include an image 1406, text or other diagram that indicates how the user may properly measure the length of the coupling. Finally, the main panel 1012 may also include a drop-down menu 1408 including values for the user to select in response to the instruction 1404. In this example, the drop-down menu 1408 is populated when the hose assembly builder tool loads the screen 1402. When the user navigates to the thread length measurement screen 1402, the user executes a filtering process in order to populate the drop-down menu 1408. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 field matches the value stored in the ETHD_1_CPLNG_FAM 802 field, a value in the SEAT_ANG 152 field matches the value stored in the ETHD_1_SEAT_ANG 826 field, a value in the THRD_SIZE 120 field matches the value stored in the ETHD_1_THRD_SIZE 834 field, and where a value in the PART_SVC_LVL 180 field indicates the part is currently being manufactured. The hose assembly builder tool may then populate the drop-down menu 1408 with any values stored in the THRD_LGTH 174 field. The hose assembly builder tool may display the values in the drop-down menu 1408 in a format of "mm-cm-inch," although other units of measure may be used. Once the user selects the length of the thread of the second manufacturer's coupling from the drop-down menu 1408 and selects the "Next" button 1032, a thread length will be stored, and the user will be directed to step 1410 to determine a swivel indicator. The thread length value may be stored, in mm, in the hose assembly build table 700 (FIG. 9) at an external thread length (ETHD_1_THRD_LGTH) 838 field, for future reference by the hose assembly builder tool.

To perform steps 1398 and 1410 (FIG. 12) the hose assembly builder tool may direct the user to the swivel information screen 1312, as illustrated in FIG. 38. As described above, the swivel information screen 1312 may include the drop-down menu 1316 with values for the user to select in response to the swivel inquiry. In this example, the values for response may include "Yes" and "No," although other values may be used depending, for example, on the wording of the inquiry 1314. Once the user selects the swivel indicator from the drop-down menu 1316 and selects the "Next" button 1032, a swivel indicator may be stored. The swivel indicator may be stored in the hose assembly build table 700 (FIG. 9) at an external thread swivel (ETHD_1_SWIVEL) 822 field, for future reference by the hose assembly builder tool. In step 1398, after selecting the swivel indicator value and selecting the "Next" button 1032, the user may be directed to a next step 1412 to determine a coupling bend angle. Similarly, in step 1410, after selecting the swivel indicator value and selecting the "Next" button 1032, the user may be directed to a next step 1414 to determine to determine a coupling bend angle.

After completing step 1398, the user may proceed to step 1412. At step 1412 (FIG. 12), the hose assembly builder tool may direct the user to the coupling bend angle screen 1320, as illustrated at FIG. 39, as discussed above. The coupling bend angle screen 1320 may prompt the user as to the coupling bend angle using the drop-down menu 1324 with values for the user to select in response to the inquiry. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 field matches the values stored in the ETHD_1_CPLNG_FAM 802 field, a value in the SEAT_ANG 152 field matches the stored value in the ETHD_1_SEAT_ANG 826, a value in the CNT_TYP 146 field matches the value stored in the ETHD_1_CNT_TYP 806 field, a value in the THRD_SIZE 120 field matches the value stored in the ETHD_1_THRD_SIZE 830 field, a value in the SWIVEL 160 field matches the value stored in the ETHD_1_SWIVEL 822 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ETHD_1_CPLNG_BND) 834 field, for future reference by the hose assembly builder tool.

At step 1414 (FIG. 12), the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, an O_RING 150 field has a value of "No," a value in the THRD_TYP 154 field matches the value stored in the CPLNG_1_THRD_TYP 786 field, a value in the CPLNG_FAM 148 field matches the values stored in the ETHD_1_CPLNG_FAM 802 field, a value in the SEAT_ANG 152 field matches the stored value in the ETHD_1_SEAT_ANG 826, a value in the CNT_TYP 146 field matches the value stored in the ETHD_1_CNT_TYP 806 field, a value in the THRD_SIZE 120 field matches the value stored in the ETHD_1_THRD_SIZE 830 field, a value in the THRD_LGTH 174 field matches the value stored in the ETHD_1_THRD_LGTH 838 field, a value in the SWIVEL 160 field matches the value stored in the ETHD_1_SWIVEL 822 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ETHD_1_CPLNG_BND) 834 field, for future reference by the hose assembly builder tool.

Figure 13:
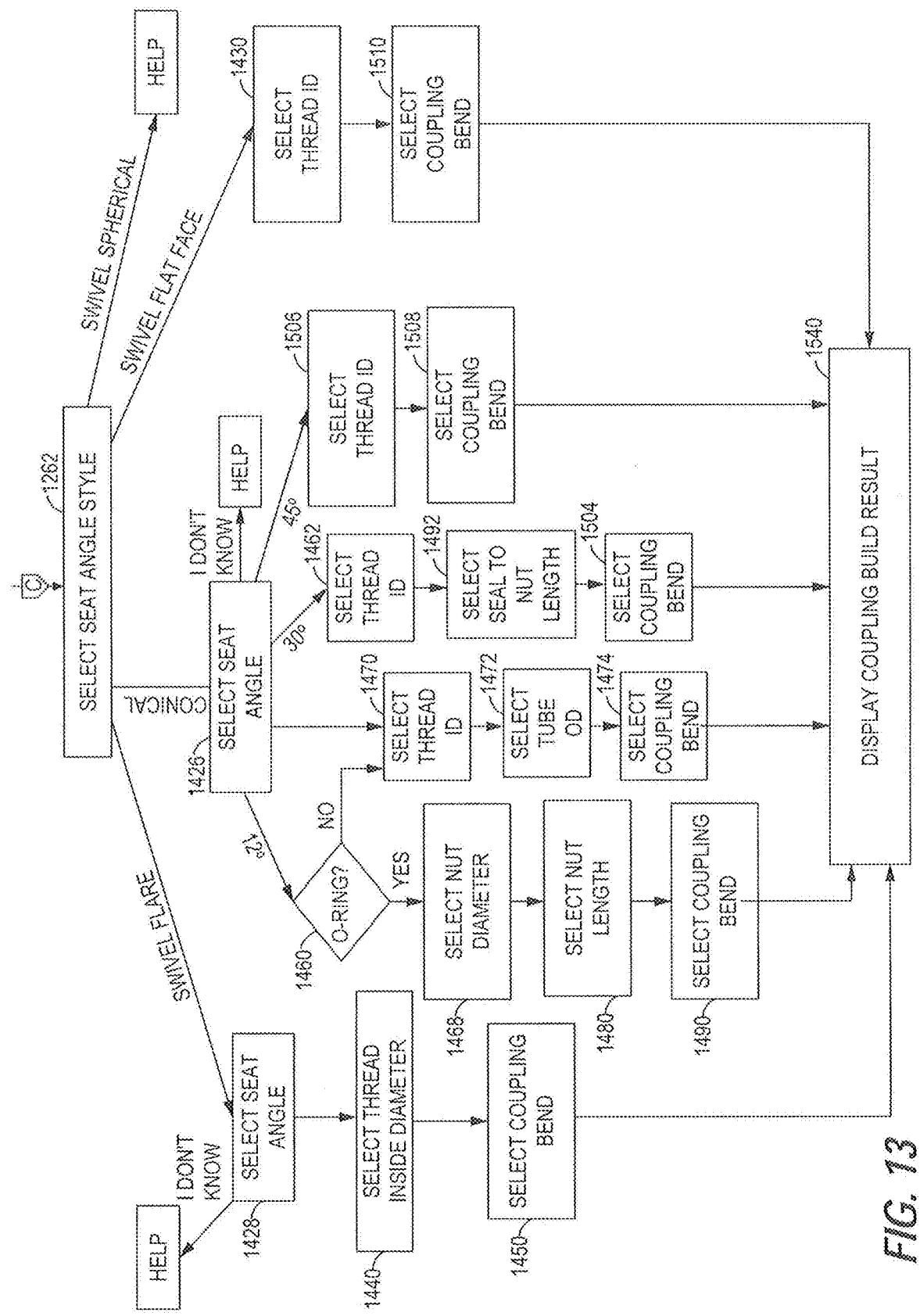
Figure 46:
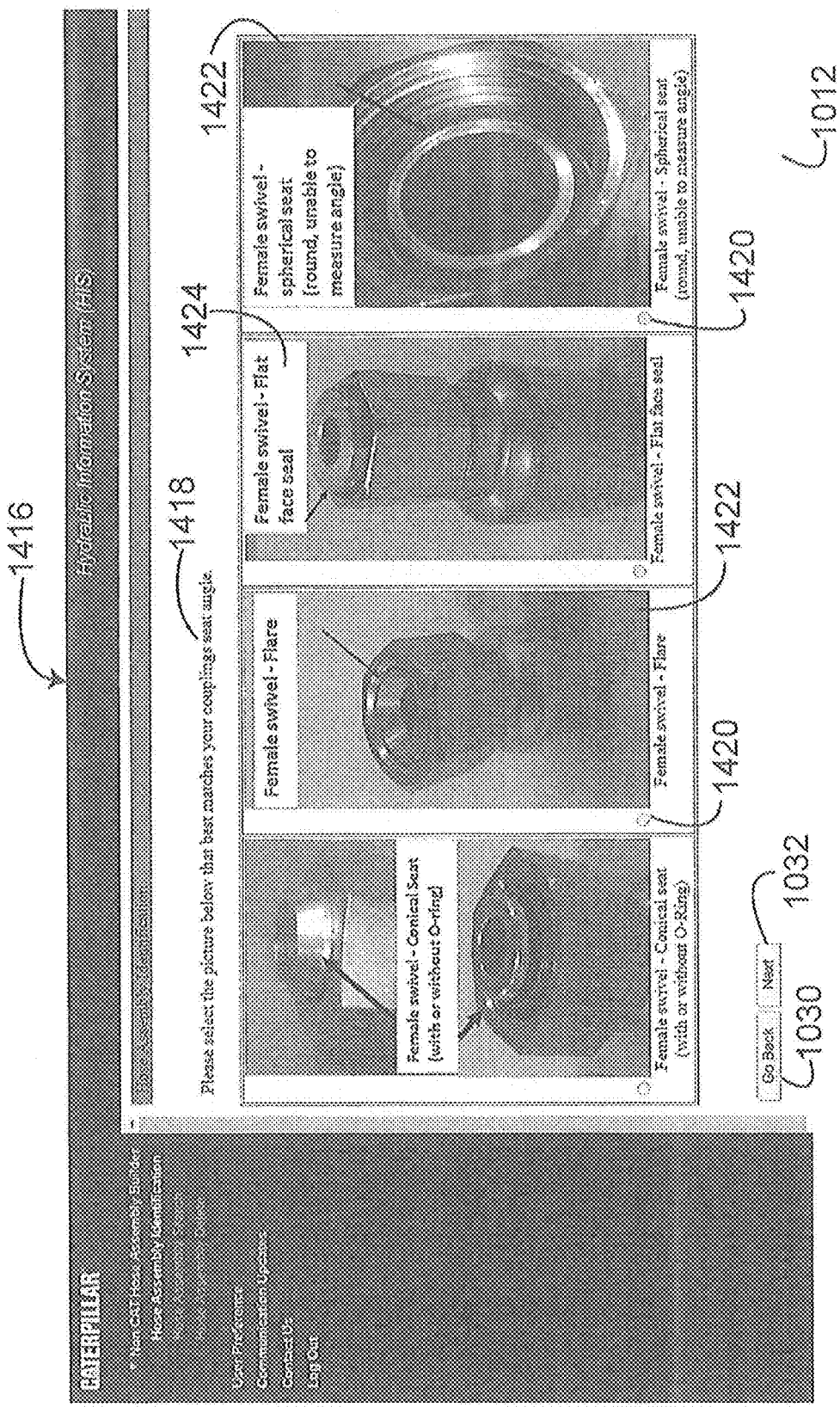
FIG. 46 is a user interface for selecting a coupling seat angle in the hose assembly builder tool in accordance with the present invention.

Referring now to FIG. 13, at step 1262 the hose assembly builder tool may prompt the user to select a coupling seat angle style of the second manufacturer's coupling. The interface screen related to step 1262 is illustrated at FIG. 46, which depicts a coupling seat angle style selection screen 1416.

The main panel 1012 of the coupling seat angle style selection screen 1416 may include a direction 1418 to the user to select a coupling seat angle style of the second manufacturer's coupling, along with a set of options 1420 with values for the user to select in response to the inquiry. The user may select the coupling seat angle style from the set of options 1420. Each coupling seat angle style may be displayed with an image 1422 of the seat angle style and a description 1424 of the seat angle style, so the user may more easily identify the second manufacturer's coupling seat angle style. In this example, values for response may include "Female swivel—Conical seat (with or without O-ring)," "Female swivel—Flare," "Female swivel—Flat face seal," and "Female swivel—Spherical seat (round, unable to measure angle)," although other values may be used.

Depending on the user's response to the direction 1418, the hose assembly builder tool may respond differently. If the user indicates the second manufacturer's coupling has a female swivel—conical seat angle style (in this example, by selecting the "Female swivel—Conical seat (with or without O-Ring)" option from the set of options 1420), and then selects the "Next" button 1032, the user will be directed to step 1426 (FIG. 13) related to identifying a seat angle measurement. If, instead, the user indicates the second manufacturer's coupling has a female swivel—flare seat angle style (in this example, by selecting the "Female swivel—Flare" option from the set of options 1420), and then selects the "Next" button 1032, the user will be directed to step 1428 (FIG. 13) related to identifying a seat angle measurement. If, however, the user indicates the second manufacturer's coupling has a Female swivel—flat face seal seat angle style (in this example, by selecting the "Female swivel—Flat face seal" option from the set of options 1420), and then selects the "Next" button 1032, the user will be directed to step 1430 related to identifying a thread inside diameter. Finally, if the user indicates the second manufacturer's coupling has a spherical seat angle style (in this example, by selecting the "Female swivel—Spherical seat (round, unable to measure angle)" option from the set of options 1420), and then selects the "Next" button 1032, the user will be directed to the help screen 1150 (FIG. 27) and, optionally, the "Contact Us" page (FIG. 28). When the user selects the "Next" button 1032, regardless the coupling seat angle style selected, the coupling family (e.g. male cone, female swivel, etc.) associated with the selected coupling seat angle style may be stored in the hose assembly build table 700 (FIG. 9) at the first coupling family (ITHD_1_CPLNG_FAM) 846 field, for future reference by the hose assembly tool.

Figure 47:
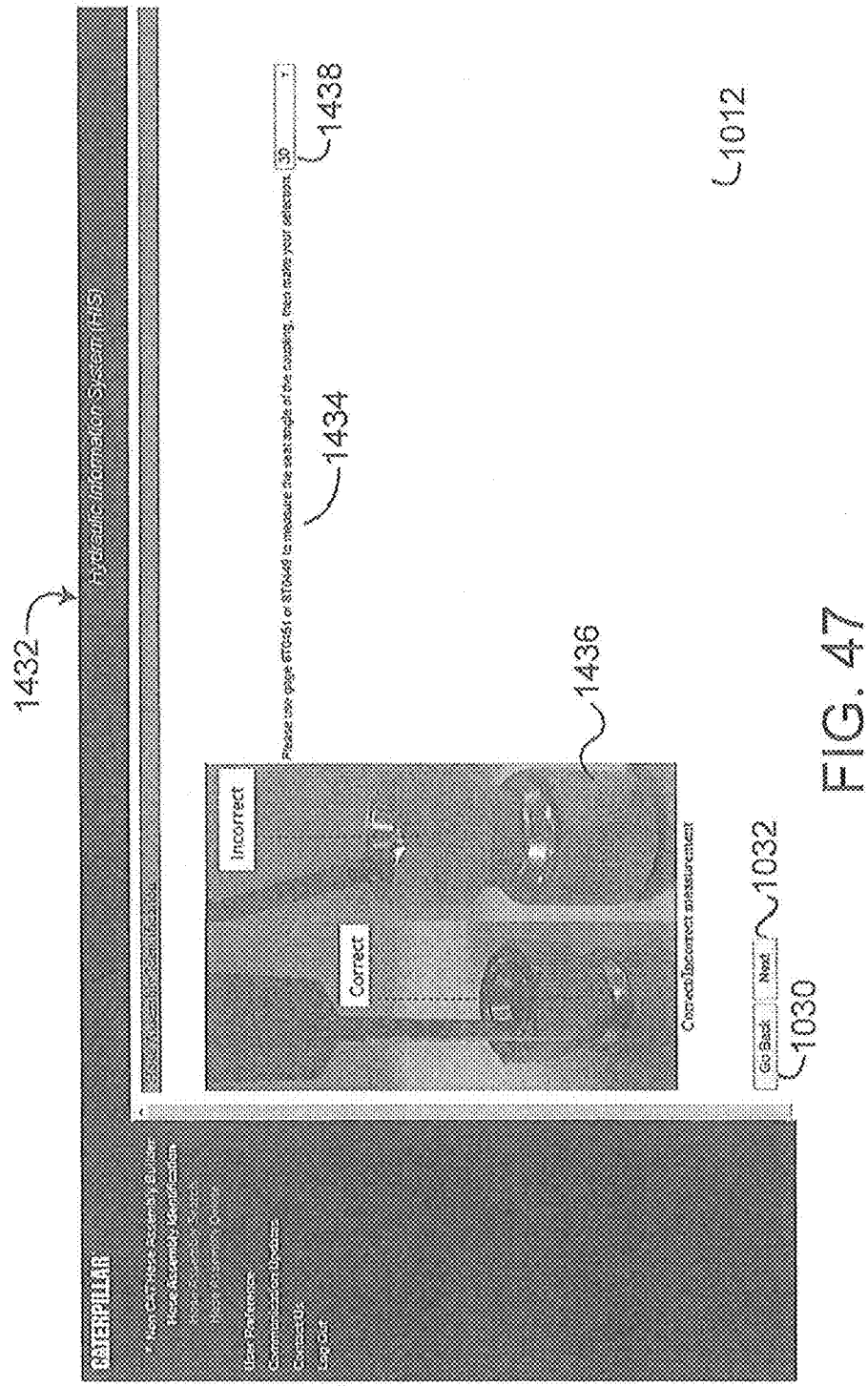
FIG. 47 is a user interface for selecting a coupling seat angle measurement in the hose assembly builder tool in accordance with the present invention.

If, at step 1262, the user indicated the seat angle style of the second manufacturer's coupling was a female swivel—flare style, the hose assembly builder tool will direct the user to step 1428 to select a coupling seat angle of the second manufacturer's coupling. Using a gauge, the user may measure the seat angle of the coupling. The interface screen related to step 1428 is illustrated at FIG. 47, which depicts a seat angle measurement screen 1432.

The main panel 1012 of the seat angle measurement screen 1432 may include direction 1434 to select a measured seat angle of the second manufacturer's coupling, as well as at least one image 1436 or text instruction indicating a proper procedure and alignment for measuring the seat angle of the second manufacturer's coupling. The seat angle measurement screen 1432 may also include a drop-down menu 1438 having values for the user to select in response to the inquiry. In this example, the drop-down menu 1438 is populated when the user navigates to the seat angle measurement screen 1432. In doing so, the user executes a filtering process in order to populate the drop-down menu 1438.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, and where a value in the PART_SVC_LVL 180 field indicates the part is currently being manufactured. The hose assembly builder tool may then populate the drop-down menu 1348 with any values stored in the SEAT_ANG 152 field. Once the user selects the seat angle of the second manufacturer's coupling from the drop-down menu 1348 and selects the "Next" button 1032, a coupling seat angle will be stored. The coupling seat angle measurement may be stored in the hose assembly build table 700 (FIG. 9) at an external coupling seat angle (ITHD_1_SEAT_ANG) 850 field, for future reference by the hose assembly builder tool.

Figure 48:
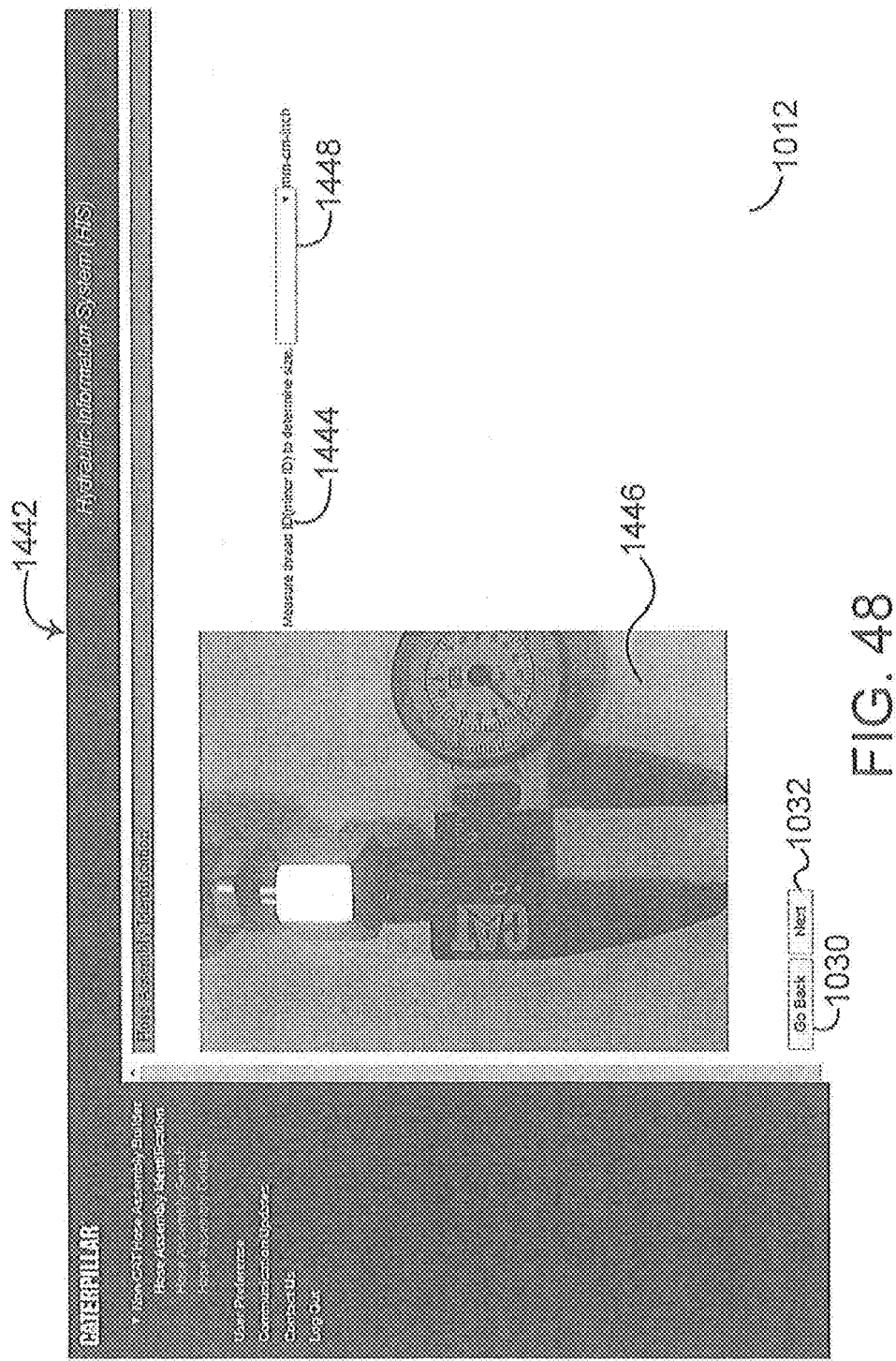
FIG. 48 is a user interface for selecting an thread inside diameter in the hose assembly builder tool in accordance with the present invention.

Once step 1428 is complete, the user may be directed to step 1440, to select an inside thread diameter. The interface screen related to step 1440 is illustrated at FIG. 48, which depicts a thread inside diameter screen 1442.

The main panel 1012 of the thread inside diameter screen 1442 may include direction 1444 to determine a thread internal diameter of a second manufacturer's coupling, as well as at least one image 1446 or text instruction indicating a proper procedure and alignment for measuring the inside diameter of the thread of the second manufacturer's coupling. The thread inside diameter screen 1442 may also include a drop-down menu 1448 having values for the user to select in response to the inquiry. In this example, the drop-down menu 1448 is populated when the user navigates to thread inside diameter screen 1442. In doing so, the user executes a filtering process in order to populate the drop-down menu 1448.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field machines the value stored in the ITHD_1_SEAT_ANG 850 field, and where a value in the PART_SVC_LVL 180 field indicates the part is currently being manufactured. The hose assembly builder tool may then populate the drop-down menu 1448 with any values stored in the THRD_MIN_ID 162 field. Once the user selects the thread inside diameter of the second manufacturer's coupling from the drop-down menu 1448 and selects the "Next" button 1032, an inside diameter of the thread will be stored. The thread inside diameter measurement may be stored in the hose assembly build table 700 (FIG. 9) at an external coupling seat angle (ITHD_1_THRD_MIN_ID) 854 field, for future reference by the hose assembly builder tool.

Once step 1440 is complete, the hose assembly builder tool may direct the user to step 1450 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field machines the value stored in the ITHD_1_SEAT_ANG 850 field, a value in the THRD_MIN_ID 162 field matches the value stored in the ITHD_1_THRD_MIN_ID 854 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ITHD_1_CPLNG_BND) 858 field, for future reference by the hose assembly builder tool.

Figure 49:
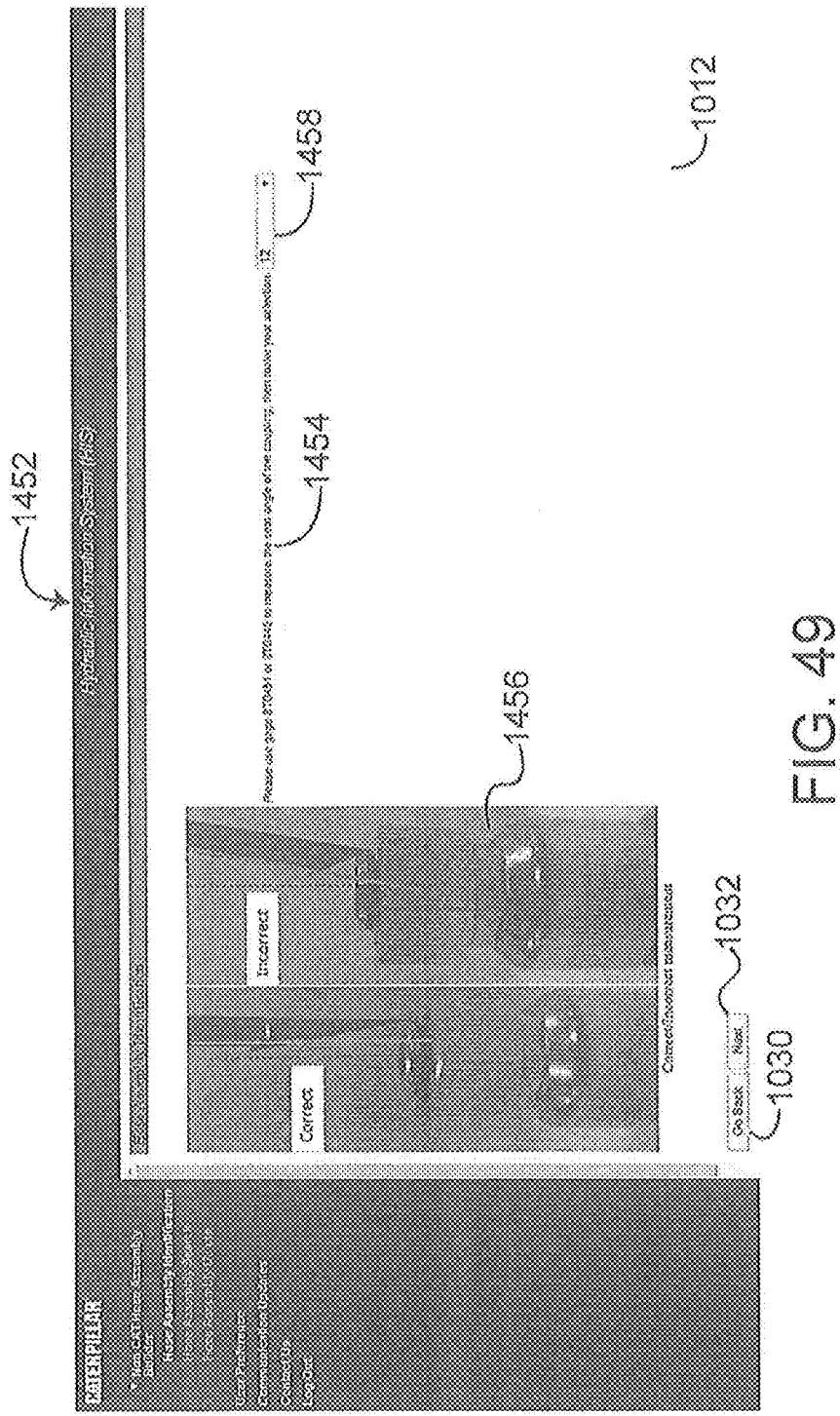
FIG. 49 is a user interface for selecting a seat angle measurement in the hose assembly builder tool in accordance with the present invention.

If, at step 1262, the user indicated the seat angle style of the second manufacturer's coupling was a female swivel—conical seat style, the hose assembly builder tool will direct the user to step 1426 to select a coupling seat angle of the second manufacturer's coupling. Using a gauge, the user may measure the seat angle of the coupling. The interface screen related to step 1426 is illustrated at FIG. 49, which depicts a seat angle measurement screen 1452.

The main panel 1012 of the seat angle measurement screen 1452 may include direction 1454 to select a measured seat angle of the second manufacturer's coupling, as well as at least one image 1456 or text instruction indicating a proper procedure and alignment for measuring the seat angle of the second manufacturer's coupling. The seat angle measurement screen 1452 may also include a drop-down menu 1458 having values for the user to select in response to the inquiry. In this example, the drop-down menu 1458 is populated when the user navigates to the seat angle measurement screen 1452. In doing so, the user executes a filtering process in order to populate the drop-down menu 1458.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, and where a value in the PART_SVC_LVL 180 field indicates the part is currently being manufactured. The hose assembly builder tool may then populate the drop-down menu 1458 with any values stored in the SEAT_ANG 152 field. Once the user selects the seat angle of the second manufacturer's coupling from the drop-down menu 1458 and selects the "Next" button 1032, a coupling seat angle will be stored. The coupling seat angle measurement may be stored in the hose assembly build table 700 (FIG. 9) at an external coupling seat angle (ITHD_1_SEAT_ANG) 850 field, for future reference by the hose assembly builder tool.

Depending on the user's response to the direction 1454, the hose assembly builder tool may respond differently. If the user indicates the seat angle is 12 degrees (in this example, by selecting "12" from the drop-down menu 1458), and then selects the "Next" button 1032, the user will be directed to step 1460 (FIG. 13) related to an O-ring location identifier. If, instead, the user indicates the seat angle is 30 degrees (in this example, by selecting "30" from the drop-down menu 1458), and then selects the "Next" button 1032, the user will be directed to step 1462 (FIG. 13) related to identifying a thread inside diameter. If, however, the user indicates the seat angle is 45 degrees (in this example, by selecting "45" from the drop-down menu 1458), and then selects the "Next" button 1032, the user will be directed to step 1506 (FIG. 13) related to selecting a thread inside diameter. Finally, if the user indicates he or she is unsure about the seat angle measurement (in this example, by selecting "I Don't Know" from the drop-down menu 1458), and then selects the "Next" button 1032, the user will be directed to the help screen 1150 (FIG. 27) and, optionally, the "Contact Us" page (FIG. 28).

Figure 50:
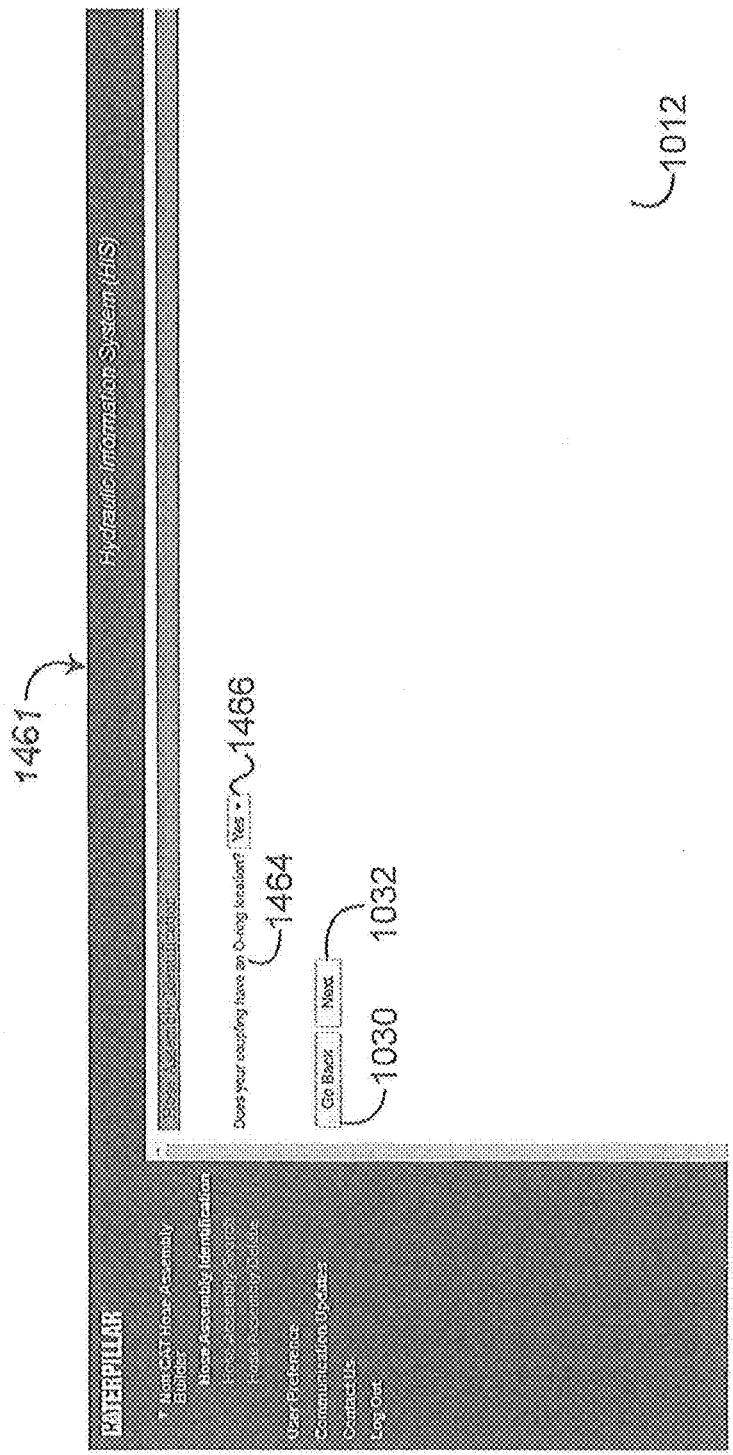
FIG. 50 is a user interface for selecting an O-ring location in the hose assembly builder tool in accordance with the present invention.

If, at step 1426, the user indicated the seat angle of the second manufacturer's coupling was 12 degrees, the hose assembly builder tool will direct the user to step 1460 to select an O-ring location identifier. The interface screen related to step 1460 is illustrated at FIG. 50, which depicts an O-ring location identifier screen 1461.

The main panel 1012 of the O-ring location identifier screen 1461 may include an inquiry 1464 as to whether or not the second manufacturer's coupling has an O-ring location, along with a drop-down menu 1466 with values for the user to select in response to the inquiry. In this example, the values for response may include "Yes" and "No," although other values may be used depending, for example, on the wording of the inquiry 1464. Once the user selects the O-ring indicator from the drop-down menu 1466 and selects the "Next" button 1032, an O-ring indicator may be stored. The O-ring indicator may be stored in the hose assembly build table 700 (FIG. 9) at an external thread swivel (ITHD_1_O_RING) 862 field, for future reference by the hose assembly builder tool.

Depending on the user's response to the inquiry 1464, the hose assembly builder tool may respond differently. If the user indicates the second manufacturer's coupling has an O-ring location (in this example, by selecting "Yes" from the drop-down menu 1466), and then selects the "Next" button 1032, the user will be directed to step 1468 (FIG. 13) to select a nut diameter. If, instead, the user indicates the second manufacturer's coupling does not have an O-ring location (in this example, by selecting "No" from the drop-down menu 1466), and then selects the "Next" button 1032, the user will be directed to step 1470 (FIG. 13) to select a thread inside diameter.

Figure 51:
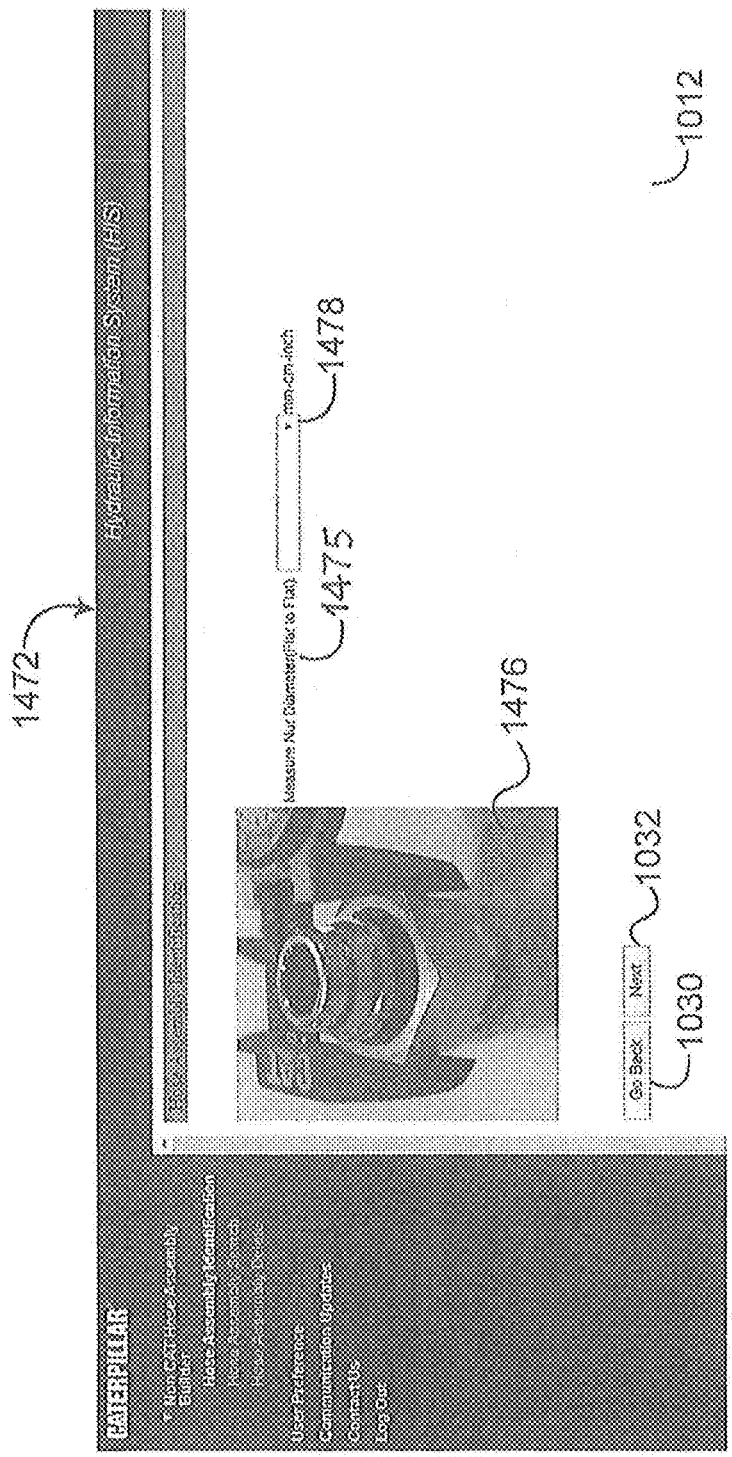
FIG. 51 is a user interface for selecting a nut diameter in the hose assembly builder tool in accordance with the present invention.

If, at step 1460, the user indicated the second manufacturer's coupling had an O-ring location, the hose assembly builder tool will direct the user to step 1468 to select a nut diameter. The interface screen related to step 1468 is illustrated at FIG. 51, which depicts a nut diameter screen 1472. The main panel 1012 of the nut diameter screen 1472 may include a direction 1475 to select a measured nut diameter of the second manufacturer's coupling, as well as at least one image 1476 or text instruction indicating a proper procedure and alignment for measuring the nut diameter of the second manufacturer's coupling. The nut diameter screen 1472 may also include a drop-down menu 1478 having values for the user to select in response to the inquiry. In this example, the drop-down menu 1478 is populated when the user navigates to the nut diameter screen 1472. In doing so, the user executes a filtering process in order to populate the drop-down menu 1478.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, and where a value in the PART_SVC_LVL 180 field indicates the part is currently being manufactured. The hose assembly builder tool may then populate the drop-down menu 1478 with any values stored in the HEX_SIZE 170 field. Once the user selects the nut diameter of the second manufacturer's coupling from the drop-down menu 1478 and selects the "Next" button 1032, a nut diameter value will be stored. The nut diameter measurement may be stored in the hose assembly build table 700 (FIG. 9) at an external coupling seat angle (ITHD_1_HEX_SIZE) 870 field, for future reference by the hose assembly builder tool.

Figure 52:
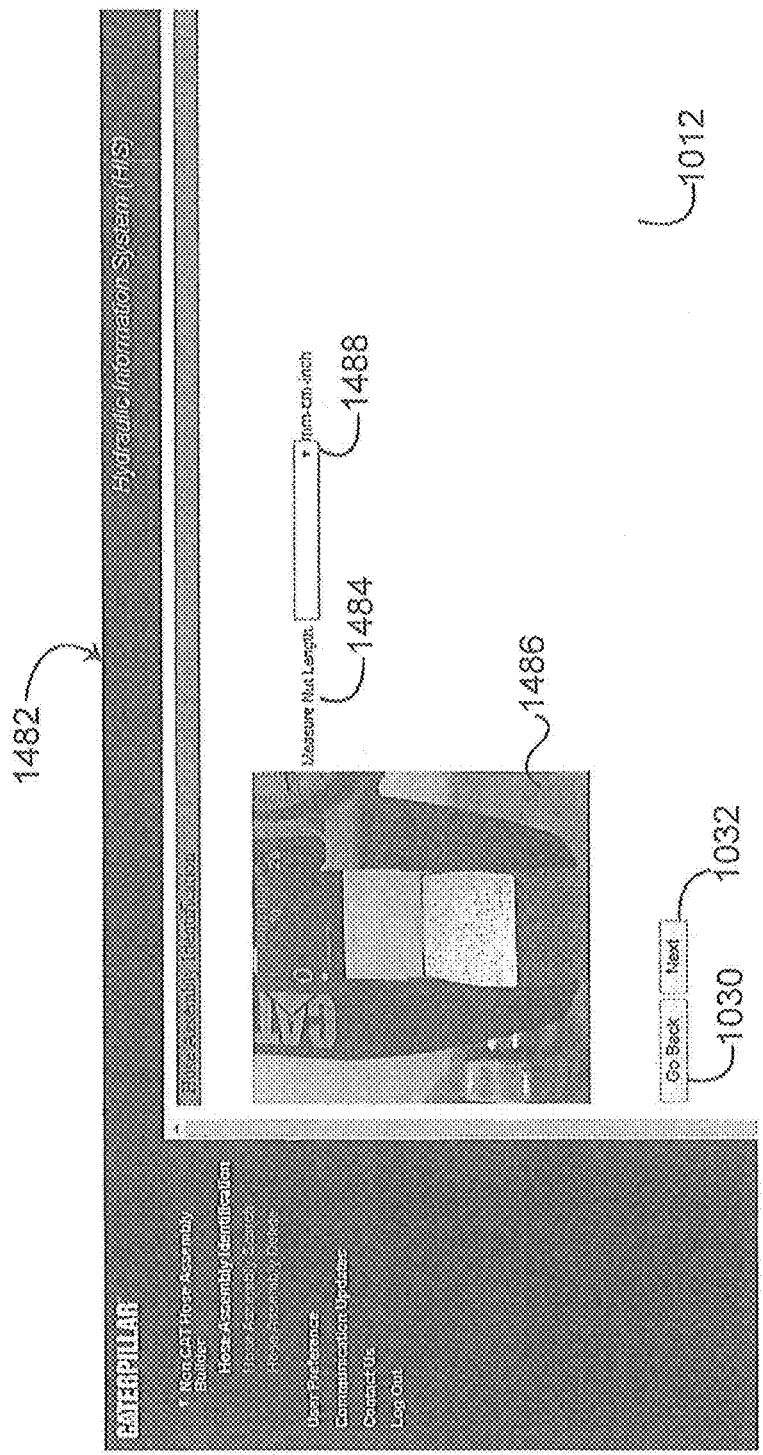
FIG. 52 is a user interface for selecting a nut length in the hose assembly builder tool in accordance with the present invention.

Once the user has completed step 1468, the hose assembly builder tool will direct the user to step 1480 to select a nut length. The interface screen related to step 1480 is illustrated at FIG. 52, which depicts a nut length screen 1482. The main panel 1012 of the nut length screen 1482 may include direction 1484 to select a measured nut length of the second manufacturer's coupling, as well as at least one image 1486 or text instruction indicating a proper procedure and alignment for measuring the nut length of the second manufacturer's coupling. The nut length screen 1482 may also include a drop-down menu 1488 having values for the user to select in response to the inquiry. In this example, the drop-down menu 1488 is populated when the user navigates to the nut length screen 1482. In doing so, the user executes a filtering process in order to populate the drop-down menu 1488.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the HEX_SIZE 170 field matches the value stored in the ITHD_1_HEX_SIZE 870 field, and where a value in the PART_SVC_LVL 180 field indicates the part is currently being manufactured. The hose assembly builder tool may then populate the drop-down menu 1478 with any values stored in the NUT_THICK 172 field. Once the user selects the nut length of the second manufacturer's coupling from the drop-down menu 1478 and selects the "Next" button 1032, a nut diameter value will be stored. The nut diameter measurement may be stored in the hose assembly build table 700 (FIG. 9) at an external coupling seat angle (ITHD_1_NUT_THICK) 874 field, for future reference by the hose assembly builder tool.

Once step 1480 is complete, the hose assembly builder tool may direct the user to step 1490 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the HEX_SIZE 170 field matches the value stored in the ITHD_1_HEX_SIZE 870 field, a value in the NUT_THICK 172 field matches the value stored in the ITHD_1_NUT_THICK 874 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ITHD_1_CPLNG_BND) 858 field, for future reference by the hose assembly builder tool.

If, at step 1460, the user indicated the second manufacturer's coupling did not have an O-ring location, the hose assembly builder tool will direct the user to step 1470. More specifically the hose assembly builder tool will direct the user to the thread inside diameter screen 1442, as illustrated in FIG. 48. In this example, the drop-down menu 1448 is populated when the user navigates to thread inside diameter screen 1442. In doing so, the user executes a filtering process in order to populate the drop-down menu 1448.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field machines the value stored in the ITHD_1_SEAT_ANG 850 field, and where a value in the PART_SVC_LVL 180 field indicates the part is currently being manufactured. The hose assembly builder tool may then populate the drop-down menu 1448 with any values stored in the THRD_MIN_ID 162 field. Once the user selects the thread inside diameter of the second manufacturer's coupling from the drop-down menu 1448 and selects the "Next" button 1032, an inside diameter of the thread will be stored. The thread inside diameter measurement may be stored in the hose assembly build table 700 (FIG. 9) at an external coupling seat angle (ITHD_1_THRD_MIN_ID) 854 field, for future reference by the hose assembly builder tool.

Once step 1470 is completed by the user, the hose assembly builder tool will direct the user to step 1472. More specifically, the hose assembly builder tool may direct the user to the tube outside diameter measurement screen 1382. The main panel 1012 may include a drop-down menu 1386, with values for the user to select in response to the inquiry. In this example, when the user navigates to the tube outside diameter measurement screen 1382, the user executes a filtering process in order to populate the drop-down menu 1386.

To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the THRD_MIN_ID 162 field matches the value stored in the ITHD_1_THRD_MIN_ID 854, and where a value in the PART_SVC_LVL 180 field indicates the part is currently being manufactured. The hose assembly builder tool may then populate the drop-down menu 1386 with any values stored in the TUBE_OD 168 field. Once the user selects the outside diameter of the second manufacturer's coupling tube from the drop-down menu 1386 and selects the "Next" button 1032, a tube outside diameter will be stored. The tube outside diameter value may be stored, in mm, in the hose assembly build table 700 (FIG. 9) at an external tube outside diameter (ITHD_1_TUBE_OD) 866 field, for future reference by the hose assembly builder tool.

Once step 1472 is complete, the hose assembly builder tool may direct the user to step 1474 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the TUB_OD 168 field matches the value stored in the ITHD_1_TUBE_OD 866 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ITHD_1_CPLNG_BND) 858 field, for future reference by the hose assembly builder tool.

If, at step 1426, the user indicated the second manufacturer's seat angle was 30 degrees, the hose assembly builder tool will direct the user to step 1462. More specifically the hose assembly builder tool will direct the user to the thread inside diameter screen 1442, as illustrated in FIG. 48. In this example, the drop-down menu 1448 is populated when the user navigates to thread inside diameter screen 1442. In doing so, the user executes a filtering process in order to populate the drop-down menu 1448.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field machines the value stored in the ITHD_1_SEAT_ANG 850 field, and where a value in the PART_SVC_LVL 180 field indicates the part is currently being manufactured. The hose assembly builder tool may then populate the drop-down menu 1448 with any values stored in the THRD_MIN_ID 162 field. Once the user selects the thread inside diameter of the second manufacturer's coupling from the drop-down menu 1448 and selects the "Next" button 1032, an inside diameter of the thread will be stored. The thread inside diameter measurement may be stored in the hose assembly build table 700 (FIG. 9) at an external coupling seat angle (ITHD_1_THRD_MIN_ID) 854 field, for future reference by the hose assembly builder tool.

Figure 53:
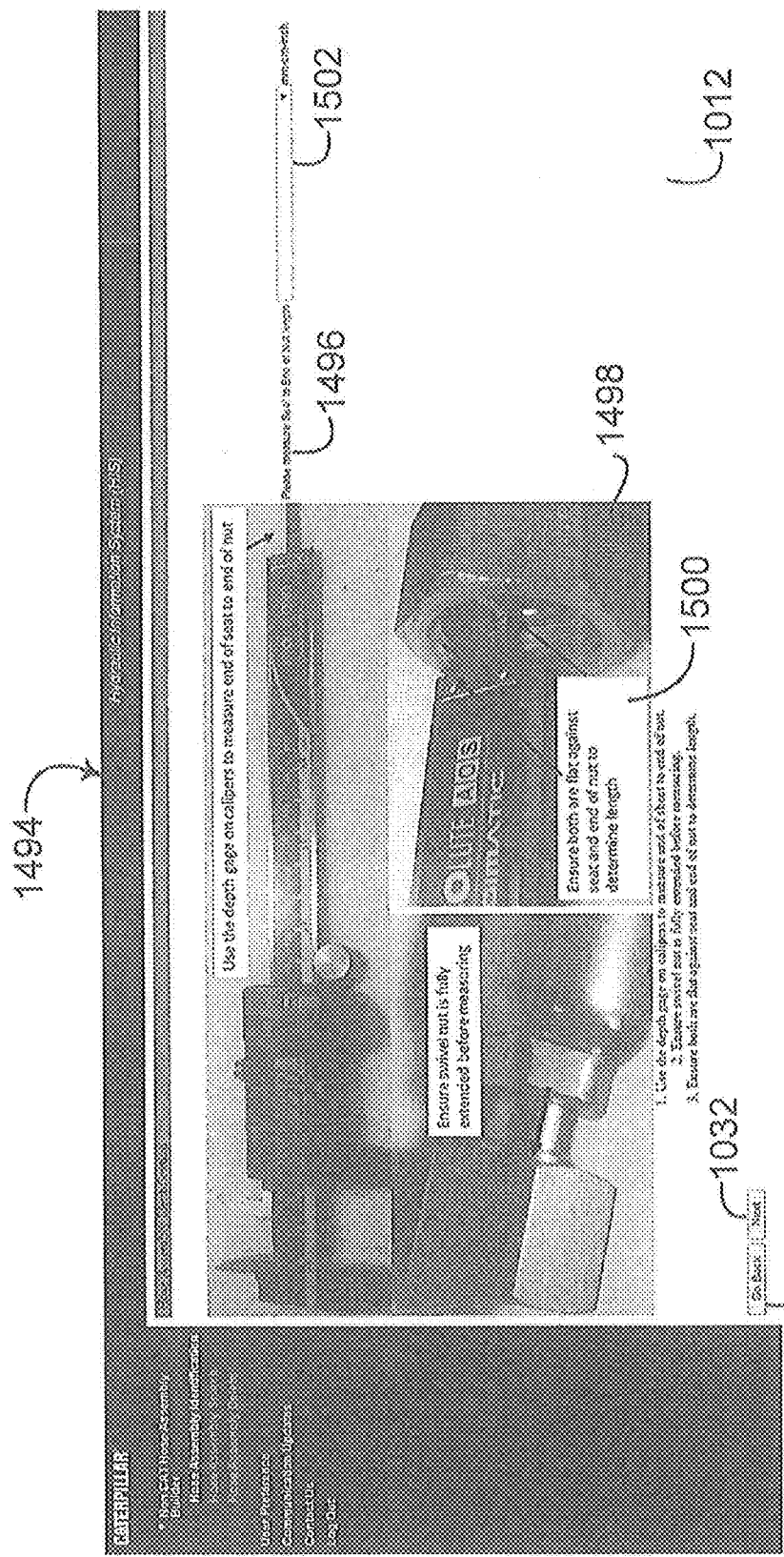
FIG. 53 is a user interface for selecting a seal nut length in the hose assembly builder tool in accordance with the present invention.

Once step 1462 is complete, the hose assembly builder tool may direct the user to step 1492 to select a seal-to-nut length. The interface screen related to step 1492 is illustrated at FIG. 53, which depicts a seal-to-nut length calculation screen 1494. The main panel 1012 of the seal-to-nut length calculation screen 1494 may include a prompt 1496 to measure the seal-to-nut length, as well as at least one image 1498 and at least one descriptive text 1500 region to ensure proper procedure and alignment for measuring the seal to nut length. The seal-to-nut length calculation screen 1494 may also include a drop-down menu 1502 having values for the user to select in response to the inquiry. In this example, the drop-down menu 1502 is populated when the user navigates to the seal-to-nut length calculation screen 1494. In doing so, the user executes a filtering process in order to populate the drop-down menu 1502.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the THRD_MIN_ID 162 field matches the value stored in the ITHD_1_THRD_MIN_ID 854 field, and where a value in the PART_SVC_LVL 180 field indicates the part is currently being manufactured. The hose assembly builder tool may then populate the drop-down menu 1478 with any values stored in the SEAL_NUT_LGTH 178 field. Once the user selects the nut diameter of the second manufacturer's coupling from the drop-down menu 1502 and selects the "Next" button 1032, a seal to nut length value will be stored. The seal to nut length measurement may be stored in the hose assembly build table 700 (FIG. 9) at an external coupling seat angle (ITHD_1_SEAL_NUT_LGTH) 878 field, for future reference by the hose assembly builder tool.

Once step 1492 is complete, the hose assembly builder tool may direct the user to step 1504 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the THRD_MIN_ID 162 field matches the value stored in the ITHD_1_THRD_MIN_ID 854 field, a value in the SEAL_NUT_LGTH 178 field matches the value stored in the ITHD_1_SEAL_NUT_LGTH 878, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ITHD_1_CPLNG_BND) 858 field, for future reference by the hose assembly builder tool.

If, at step 1426, the user indicated the second manufacturer's seat angle was 45 degrees, the hose assembly builder tool will direct the user to step 1506. More specifically the hose assembly builder tool will direct the user to the thread inside diameter screen 1442, as illustrated in FIG. 48. In this example, the drop-down menu 1448 is populated when the user navigates to thread inside diameter screen 1442. In doing so, the user executes a filtering process in order to populate the drop-down menu 1448.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field machines the value stored in the ITHD_1_SEAT_ANG 850 field, and where a value in the PART_SVC_LVL 180 field indicates the part is currently being manufactured. The hose assembly builder tool may then populate the drop-down menu 1448 with any values stored in the THRD_MIN_ID 162 field. Once the user selects the thread inside diameter of the second manufacturer's coupling from the drop-down menu 1448 and selects the "Next" button 1032, an inside diameter of the thread will be stored. The thread inside diameter measurement may be stored in the hose assembly build table 700 (FIG. 9) at an external coupling seat angle (ITHD_1_THRD_MIN_ID) 854 field, for future reference by the hose assembly builder tool.

Once step 1506 is complete, the hose assembly builder tool may direct the user to step 1508 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the SEAT_ANG 152 field matches the value stored in the ITHD_1_SEAT_ANG 850 field, a value in the THRD_MIN_ID 162 field matches the value stored in the ITHD_1_THRD_MIN_ID 854 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ITHD_1_CPLNG_BND) 858 field, for future reference by the hose assembly builder tool.

If, at step 1262, the user indicated the second manufacturer's seat angle style was a female—swivel flat face, the hose assembly builder tool will direct the user to step 1430. More specifically the hose assembly builder tool will direct the user to the thread inside diameter screen 1442, as illustrated in FIG. 48. In this example, the drop-down menu 1448 is populated when the user navigates to thread inside diameter screen 1442. In doing so, the user executes a filtering process in order to populate the drop-down menu 1448.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, and where a value in the PART_SVC_LVL 180 field indicates the part is currently being manufactured. The hose assembly builder tool may then populate the drop-down menu 1448 with any values stored in the THRD_MIN_ID 162 field. Once the user selects the thread inside diameter of the second manufacturer's coupling from the drop-down menu 1448 and selects the "Next" button 1032, an inside diameter of the thread will be stored. The thread inside diameter measurement may be stored in the hose assembly build table 700 (FIG. 9) at an external coupling seat angle (ITHD_1_THRD_MIN_ID) 854 field, for future reference by the hose assembly builder tool.

Once step 1430 is complete, the hose assembly builder tool may direct the user to step 1510 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the THRD_MIN_ID 162 field matches the value stored in the ITHD_1_THRD_MIN_ID 854 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (ITHD_1_CPLNG_BND) 858 field, for future reference by the hose assembly builder tool.

Figure 14:
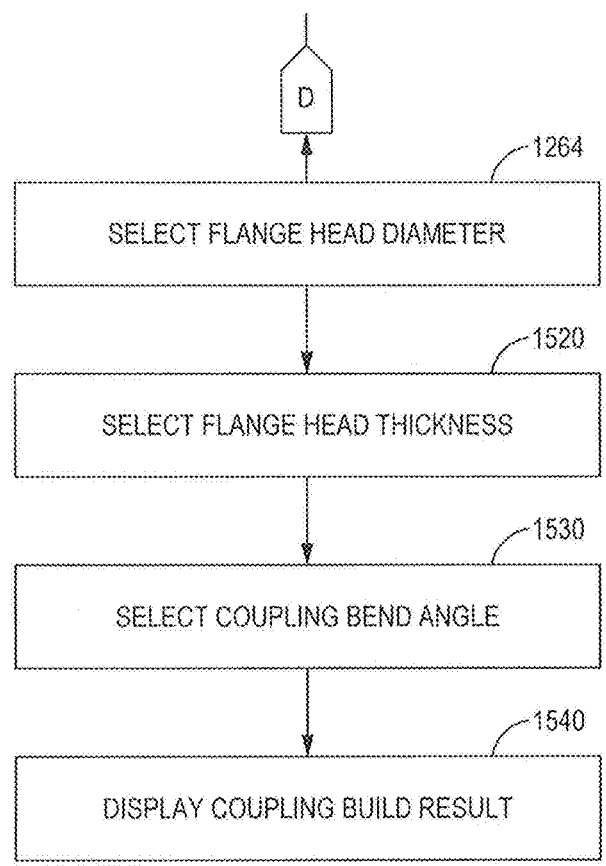
Figure 54:
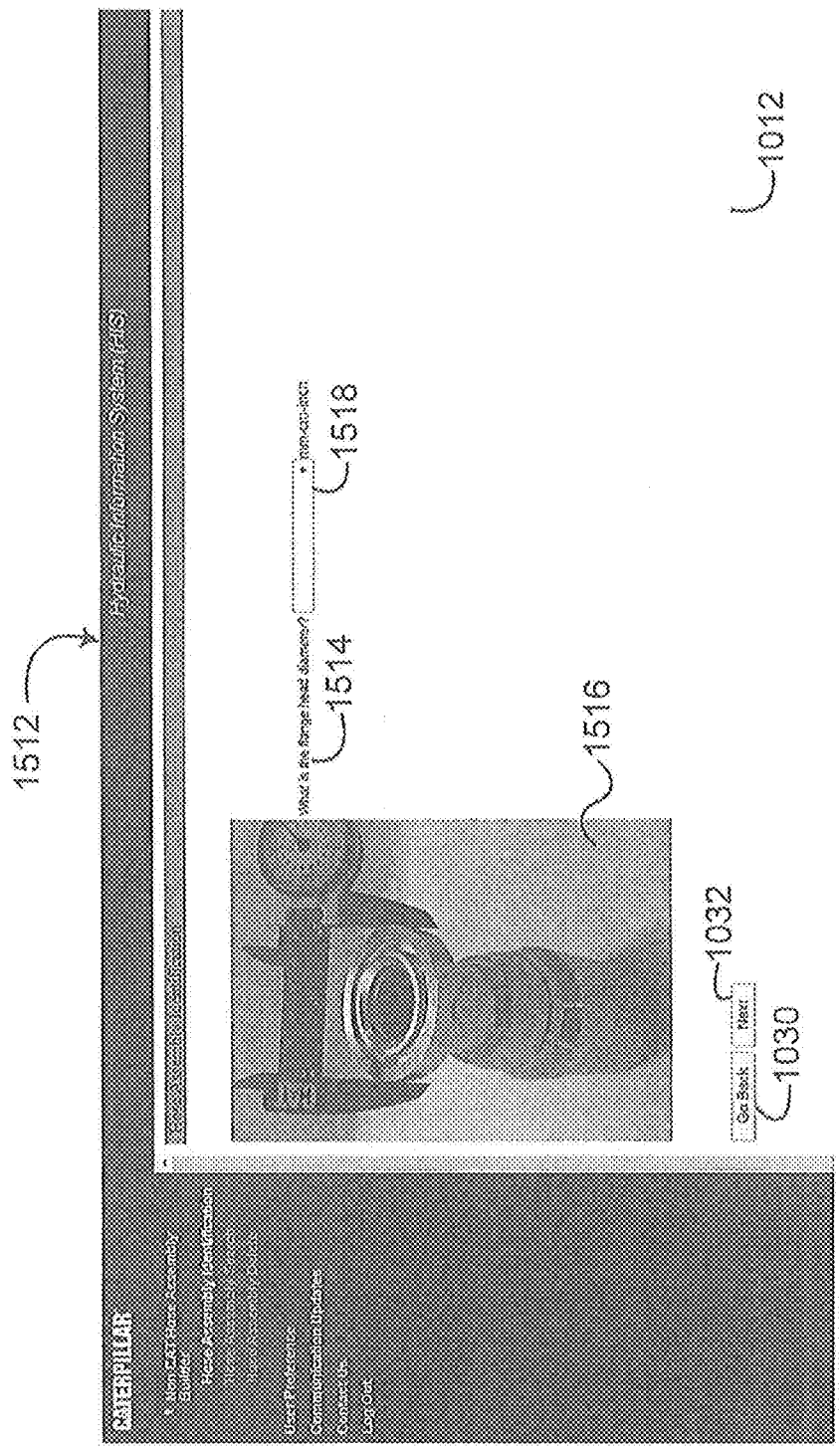
FIG. 54 is a user interface for selecting a flange head diameter in the hose assembly builder tool in accordance with the present invention.

Referring now to FIG. 14, if, at step 1248 (FIG. 11), the user indicated the coupling style of the second manufacturer's coupling was a flange, the hose assembly builder tool may direct the user to step 1264 to measure a flange head diameter. The interface screen related to step 1264 is illustrated at FIG. 54, which depicts a flange head diameter screen 1512. The main panel 1012 of the flange head diameter screen 1512 may include a prompt 1514, an image 1516 depicting a proper procedure and alignment for measuring the flange head diameter. The flange head diameter screen 1512 may also include a drop-down menu 1518 having values for the user to select in response to the inquiry. In this example, the drop-down menu 1518 is populated when the user navigates to the flange head diameter screen 1512. In doing so, the user executes a filtering process in order to populate the drop-down menu 1518.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, and where a value in the PART_SVC_LVL 180 field indicates the part is currently being manufactured. The hose assembly builder tool may then populate the drop-down menu 1518 with any values stored in the HEAD_SIZE 118 field. Once the user selects the diameter of the flange head of the second manufacturer's coupling from the drop-down menu 1518 and selects the "Next" button 1032, a flange head diameter value may be stored. The flange head diameter measurement may be stored in the hose assembly build table 700 (FIG. 9) at an external coupling seat angle (FLG_1_HEAD_SIZE) 790 field, for future reference by the hose assembly builder tool.

Figure 55:
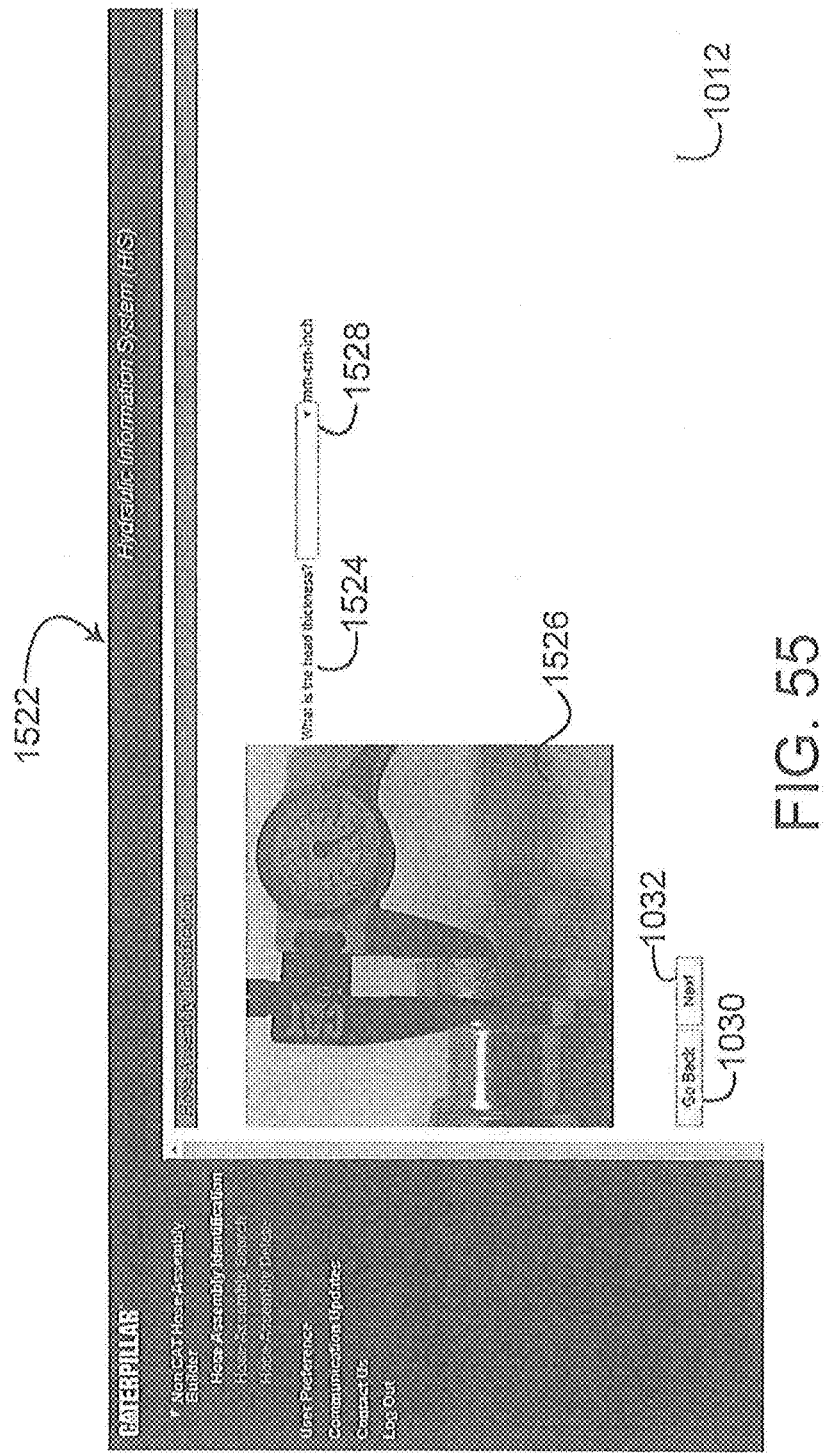
FIG. 55 is a user interface for selecting a flange head thickness in the hose assembly builder tool in accordance with the present invention.

Upon completion of step 1264, the hose assembly builder tool may direct the user to step 1520 to measure a flange head thickness. The interface screen related to step 1520 is illustrated at FIG. 55, which depicts a flange head thickness screen 1522. The main panel 1012 of the flange head thickness screen 1522 may include a prompt 1524, an image 1526 depicting a proper procedure and alignment for measuring the flange head thickness. The flange head thickness screen 1522 may also include a drop-down menu 1528 having values for the user to select in response to the inquiry. In this example, the drop-down menu 1528 is populated when the user navigates to the flange head thickness screen 1522. In doing so, the user executes a filtering process in order to populate the drop-down menu 1528.

To achieve this, the hose assembly builder tool may perform a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the HEAD_SIZE 118 field matches the value stored in the FLG_1_HEAD_SIZE 790 field, and where a value in the PART_SVC_LVL 180 field indicates the part is currently being manufactured. The hose assembly builder tool may then populate the drop-down menu 1528 with any values stored in the HEAD_THICK 166 field. Once the user selects the thickness of the flange head of the second manufacturer's coupling from the drop-down menu 1528 and selects the "Next" button 1032, a flange head thickness value may be stored. The flange head thickness measurement may be stored in the hose assembly build table 700 (FIG. 9) at an external coupling seat angle (FLG_1_HEAD_THICK) 794 field, for future reference by the hose assembly builder tool.

Once step 1520 is complete, the hose assembly builder tool may direct the user to step 1530 to select a coupling bend angle. More specifically, the hose assembly builder tool may direct the user to the coupling bend angle screen 1320, as illustrated at FIG. 39, as discussed above. In this example, when the user navigates to the coupling bend angle screen 1320, the user executes a filtering process in order to populate the drop-down menu 1324. To achieve this, the hose assembly builder tool performs a filter on the hose coupling details table 100 (FIG. 1), to identify records where a value in the HOSE_TYP 116 field matches the value stored in the HOSE_TYP 704 field, a value in the HOSE_INSD_DIA 128 field matches the value stored in the HOSE_INSD_DIA 706 field, a value in the HOSE_DASH_SIZE 140 field matches the value stored in the HOSE_DASH_SIZE 778 field, a value in the CPLNG_FAM 148 field matches the value stored in the ITHD_1_CPLNG_FAM 846 field, a value in the HEAD_SIZE 118 field matches the value stored in the FLG_1_HEAD_SIZE 790 field, a value in the HEAD_THICK 166 field matches the value stored in the FLG_1_HEAD_THICK 794 field, and where a value in the PART_SVC_LVL 180 field indicates the part is currently being manufactured. The hose assembly builder tool may then populate the drop-down menu 1324 with any values stored in the CPLNG_BND 110 field. Once the user selects the coupling bend angle of the second manufacturer's coupling from the drop-down menu 1324 and selects the "Next" button 1032, a coupling bend angle will be stored. The coupling bend angle measurement may be stored in the hose assembly build table 700 (FIG. 9) at an external male coupling bend angle (FLG_1_CPLNG_BND) 798 field, for future reference by the hose assembly builder tool.

Figure 56:
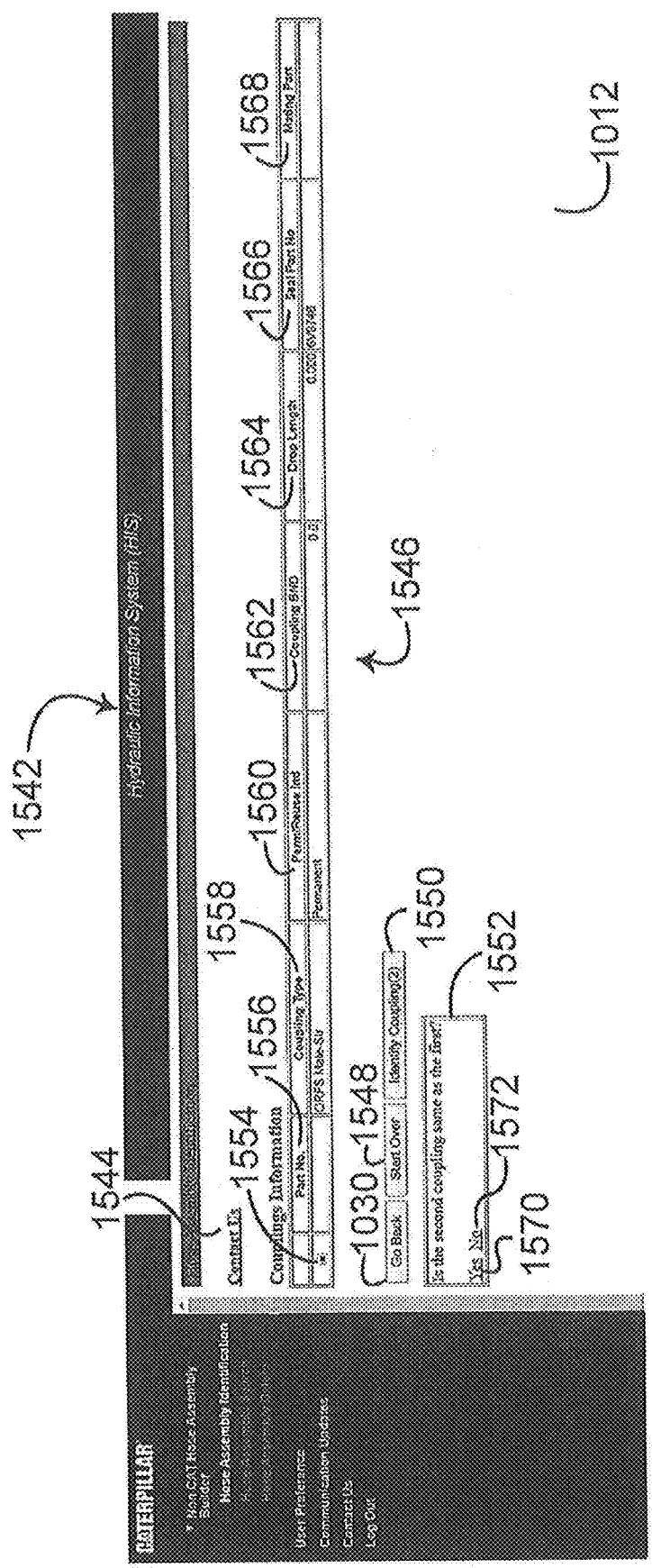
FIG. 56 is a user interface for a coupling build information screen of the hose assembly builder tool in accordance with the present invention.

Referring now to FIGS. 12-14, at a step 1540 a coupling build result list may be displayed to the user. The interface screen related to step 1540 is illustrated at FIG. 56, which depicts a coupling build result screen 1542. The main panel 1012 of the coupling build result screen 1542 may include a "Contact Us" link 1544, along with a list 1546 of selectable coupling build results corresponding to couplings of the first manufacturer meeting all criteria specified by the user in each of the previous steps. The coupling build result screen 1542 may also include the "Go Back" button 1030, a "Start Over" button 1548 and an "Identify Coupling(s)" button 1550. Selecting the "Start Over" button 1548 returns the user to the coupling style selection screen 1266 (FIG. 34).

Each build result may include an indicator 1554 that is selectable by the user. The list 1546 of selectable coupling build results may include a number of data values, including a part number 1556, a coupling type 1558, a permanent or reusable indicator 1560, a coupling bend angle 1562, a drop length 1564, a seal part number 1566, and a mating part number 1568. More specifically, with reference to the hose coupling details table 100 (FIG. 3) the part number 1556 value may correspond to the CAT_ID_NO_20 102 field, the coupling type 1558 value may correspond to the CPLNG_TYP 106 field, the permanent or reusable indicator 1560 value may correspond to the PERM_CPLNG_IND 124 field and the REUSE_CPLNG_IND 126 field, the coupling bend angle 1562 value may correspond to the CPLNG_BND 110 field, the drop length 1564 value may correspond to the DRP_LGTH 114 field, the seal part number 1566 value may correspond to the SEAL_PART_NO 130 field, and the mating part 1568 value may correspond to the MATING_PART 176 field.

Once the user selects a compatible coupling of the first manufacturer from the list 1546 of coupling build results, and selects the "Identify Coupling(s)" button 1550, the hose assembly builder tool generates a frame 1552 within the screen 1542. The frame includes a query asking the user if the second coupling is the same model as the one presently built. The frame 1552 includes links labeled "Yes" 1570 and "No" 1572. If the user selects "No" 1572 the hose assembly builder tool returns the user to the coupling style selection screen 1266 (FIG. 34), allowing the user to step through each of the coupling build steps again, to generate a second coupling build that may be different from the first. Meanwhile, selecting the "Yes" 1570 link copies the data stored in the hose assembly build table 700 (FIG. 9), from the first coupling storage fields into corresponding storage fields relating to the second coupling. For example, the value stored in CPLNG_1_THRD_TYP 786 is copied into the CPLNG_2_THRD_TYP 788 field. Likewise if values are stored in FLG_1_HEAD_SIZE, ETHD_1_CPLNG_FAM, or ITHD_1_THRD_LGTH, the values would be copied into FLG_2_HEAD_SIZE, ETHD_2_CPLNG_FAM, or ITHD_2_THRD_LGTH, respectively. In addition, selecting the "Yes" 1570 link generates a bill of materials (FIG. 57).

Figure 57:
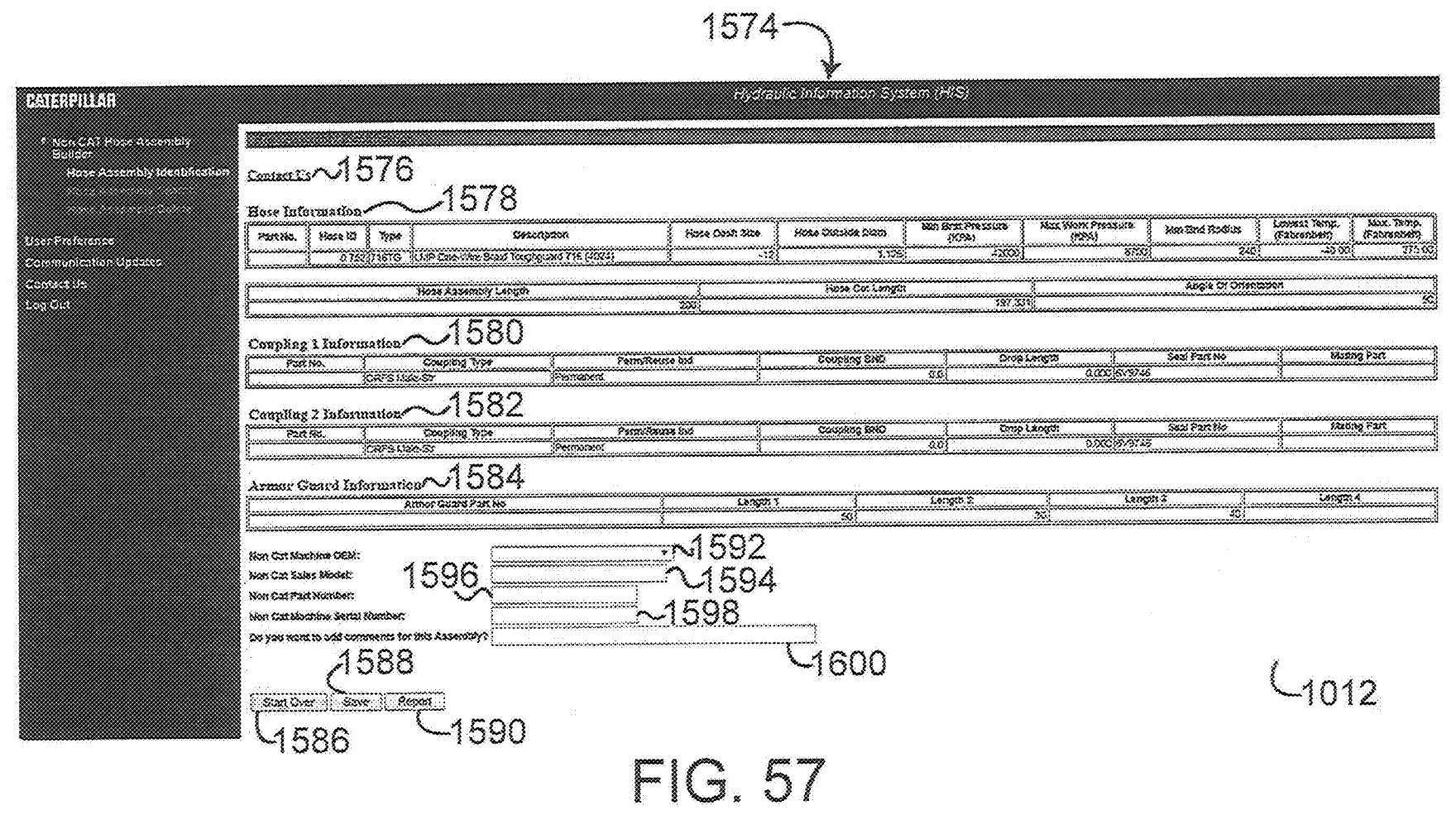

Referring now to FIG. 57, a bill of materials is illustrated, displayed on a complete build screen 1574, and generated according to an exemplary hose and coupling arrangement. The main panel 1012 of the complete build screen 1574 may include a "Contact Us" link 1576, along with relevant data related to the features specified by the user in each of the previous steps. The bill of materials may include Hose Information 1578 including a first manufacturer hose part number, a hose inside diameter, a type classification, a description, a hose dash size, a hose outside diameter, a minimum burst pressure (kPa), a maximum work pressure (kPa), a minimum bend radius, a lowest temperature (Fahrenheit), and a maximum temperature (Fahrenheit). The Hose Information 1578 section may also include a hose assembly length, which was set by the user at step 1058 (FIG. 10). This hose assembly length is used by the hose assembly builder tool to calculate the hose cut length, which is also included in the Hose Information section 1578 of the complete build screen 1574. As discussed above, the hose coupling details table 100 stores, for each coupling, that coupling's specific cut off factor (CUT_OFF_FCTR) 112. To calculate the hose cut length, the hose assembly builder tool subtracts the stored cut off factor for each coupling from the hose assembly length as specified by the user. This informs the technician how long the hose should be cut so that when the couplings are installed in the hose, the hose assembly length matches what is specified by the user. Finally, the Hose Information 1578 includes the angle of orientation, which was also specified by the user at step 1058 (FIG. 19).

The complete build screen 1574 further includes Coupling 1 Information 1580 and Coupling 2 Information 1582, which may specify, for each coupling, a first manufacturer part number, a coupling type, a permanent coupling or reusable coupling indicator, a coupling bend, a drop length, an associated seal part number, and a mating part. Each of these pieces of information may have been specified by a user at steps 1248 through 1520 (FIGS. 34-55). The complete build screen 1574 may also include an Armor Guard Information section 1584, which may display the guard information specified by the user at step 1078 through 1102 (FIGS. 20-22).

The user may also be prompted to provide information related to the second manufacturer's hose, in the event the user opts to save the completed hose assembly build information. Specifically, the user may select the Machine OEM from a drop-down menu 1592, populated from the values stored in the original equipment manufacturer information table 600 (FIG. 8). The user may also enter the second manufacturer's sales model in a text box 1594, a corresponding second manufacturer's part number in a text box 1596, a corresponding second manufacturer's machine serial number in a text box 1598, and finally any comments related to the build in text box 1600. As will be discussed in reference to FIGS. 59-60, each of these fields 1592-1600 may be searched by the user at a later time, if the user elects to save the hose assembly build information.

The main panel 1012 may include a "Start Over" button 1586, which, when selected by the user, may direct the user back to step 1000 (FIG. 16). The hose and coupling information generated and stored in the hose assembly build table 700 (FIG. 9) may be deleted, as well. The main panel 1012 may also include a "Save" button 1588 and a "Report" button 1590. When the user selects the "Save" button 1588, the hose assembly builder tool may assign a hose assembly identification number to the build. The hose assembly identification number may be stored, along with the build information in the hose assembly build table 700 at the HOSE_ASSM_ID 702 field. The hose assembly builder tool may also store the user-defined second manufacturer's assembly information in the hose assembly build table 700. More specifically the value entered in the second manufacturer's Machine OEM field 1592 may be stored in the NCAT_MACH_OEM field 890 of the hose assembly build table 700, the value entered in the second manufacturer's Sales Model field 1594 may be stored in the NCAT_SLS_MDL 892 field, the value entered in the second manufacturer's Part Number field 1596 may be stored in the NCAT_HOSE_PART_NO 894 field, the value entered in the second manufacturer's Machine Serial Number field 1598 may be stored in the NCAT_MACH_SER_NO 896 field, and any comments entered in the comment field 1600 may be stored in the CMNT_TXT_1 888 field. Finally, selecting the "Report" button 1590 generates a Hose & Coupling Non-Caterpillar Hose Assembly Report, which is shown more specifically in FIG. 58.

Figure 58:
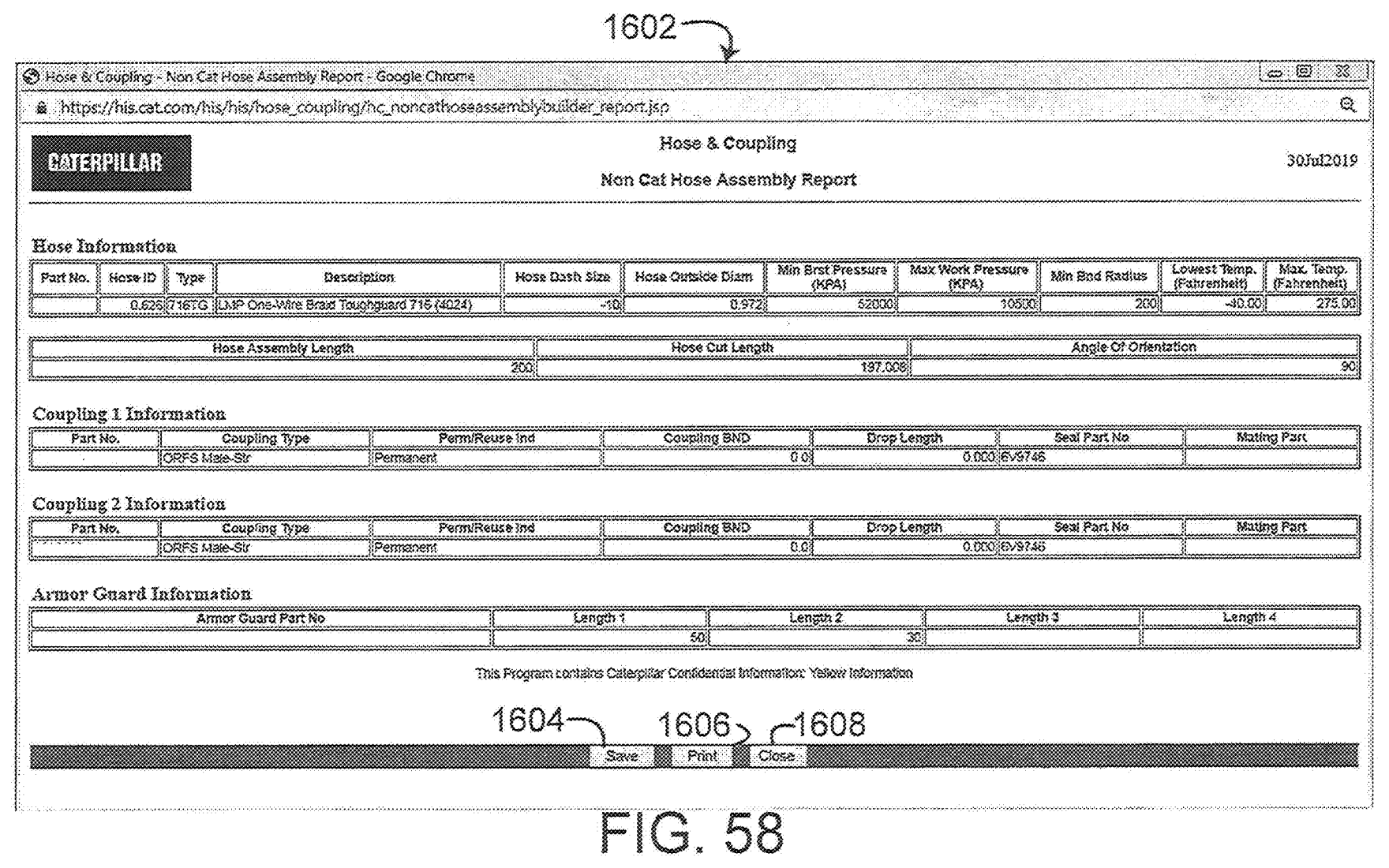

With reference to FIG. 58, when the user selects the "Report" button 1590, the hose assembly builder tool will generate and display the Hose & Coupling Non-Caterpillar Hose Assembly Report in a new window 1602. The Hose & Coupling Non-Caterpillar Hose Assembly Report contains the same hose and coupling information 1578, 1580, 1582, 1584 as shown in the complete build screen 1574, with additional display options. Specifically, the window 1602 includes a "Save" button 1604, a "Print" button 1606, and a "Close" button 1608. If the user selects the "Save" button 1604, the hose assembly builder tool may generate a text document (e.g. .txt file) including the displayed information. Selecting the "Print" button 1606 opens a printing prompt for the user to print the displayed information. Finally, selecting the "Close" button 1608, closes the window 1602, and returns the user to the complete build screen 1574.

Figure 59:
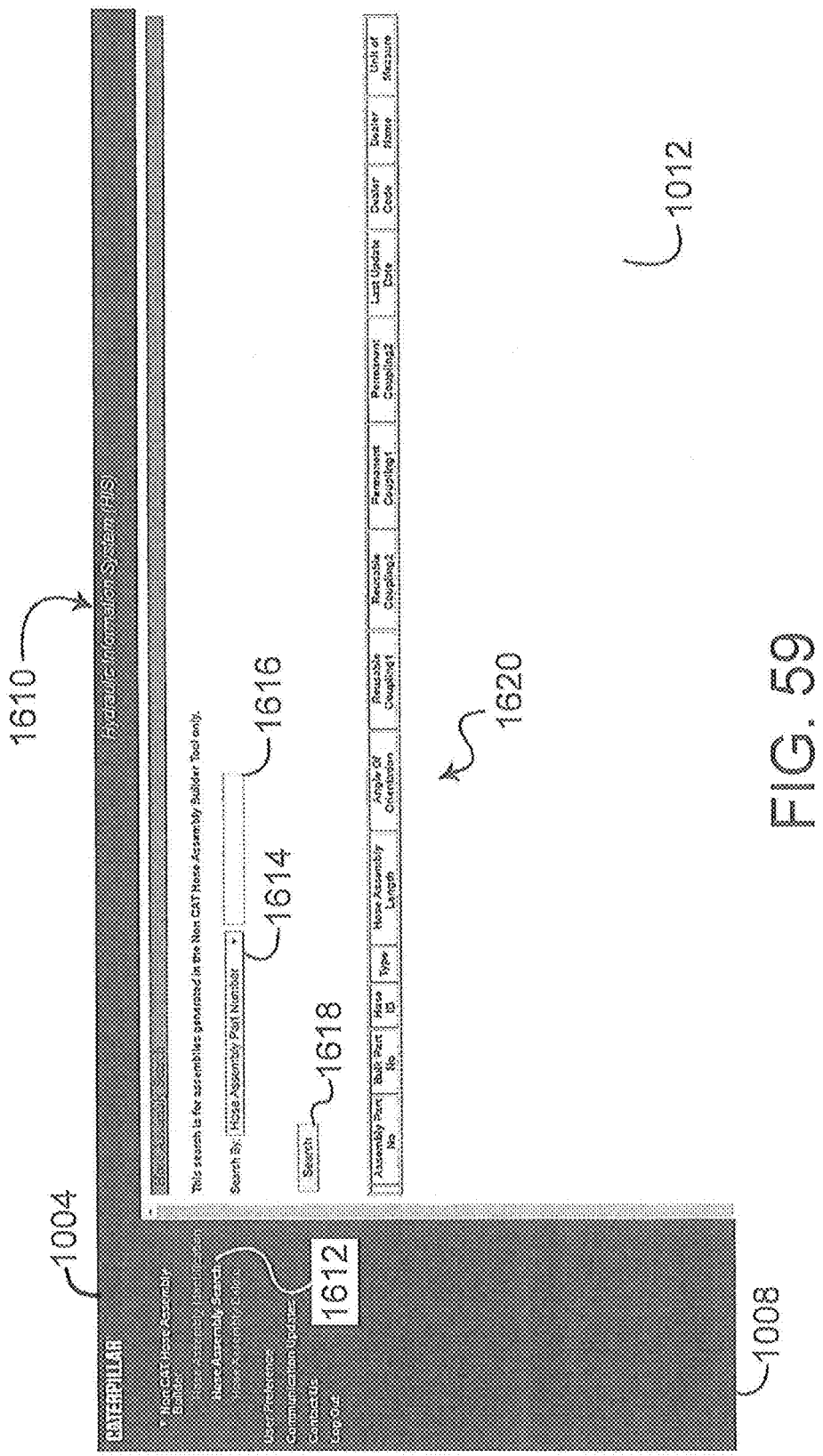
FIG. 59 is a user interface for a hose assembly search screen of the hose assembly builder tool in accordance with the present invention.

The hose assembly builder tool includes a Hose Assembly Search to allow the user to search for hose assemblies built by users of the hose assembly builder tool. Referring specifically to FIG. 59, the Hose Assembly Search may be accessed by clicking on a link 1612 to the Hose Assembly Search in the side panel 1008 of the Hydraulic Information System frame 1004. The main panel 1012 of the Hose Assembly Search screen 1610 includes a "Search by:" field, including a drop-down menu 1614 and a search box 1616. The "Search by:" drop-down menu allows a user to search using various fields including, for example, Hose Assembly Part Number, Dealer Code, Comments, Non-Caterpillar Machine OEM, Non-Caterpillar Sales Model, Non-Caterpillar Part Number, and Non-Caterpillar Machine Serial Number. Once the user selects a search field from the drop-down menu 1614 and enters search text in the text box 1616, the user may user the "Search" button 1618 to begin the search. The hose assembly builder tool with search the hose assembly build table 700 according to the user's specified search. Any values returned may be listed in a region 1620 of the main panel 1012.

Figure 60:
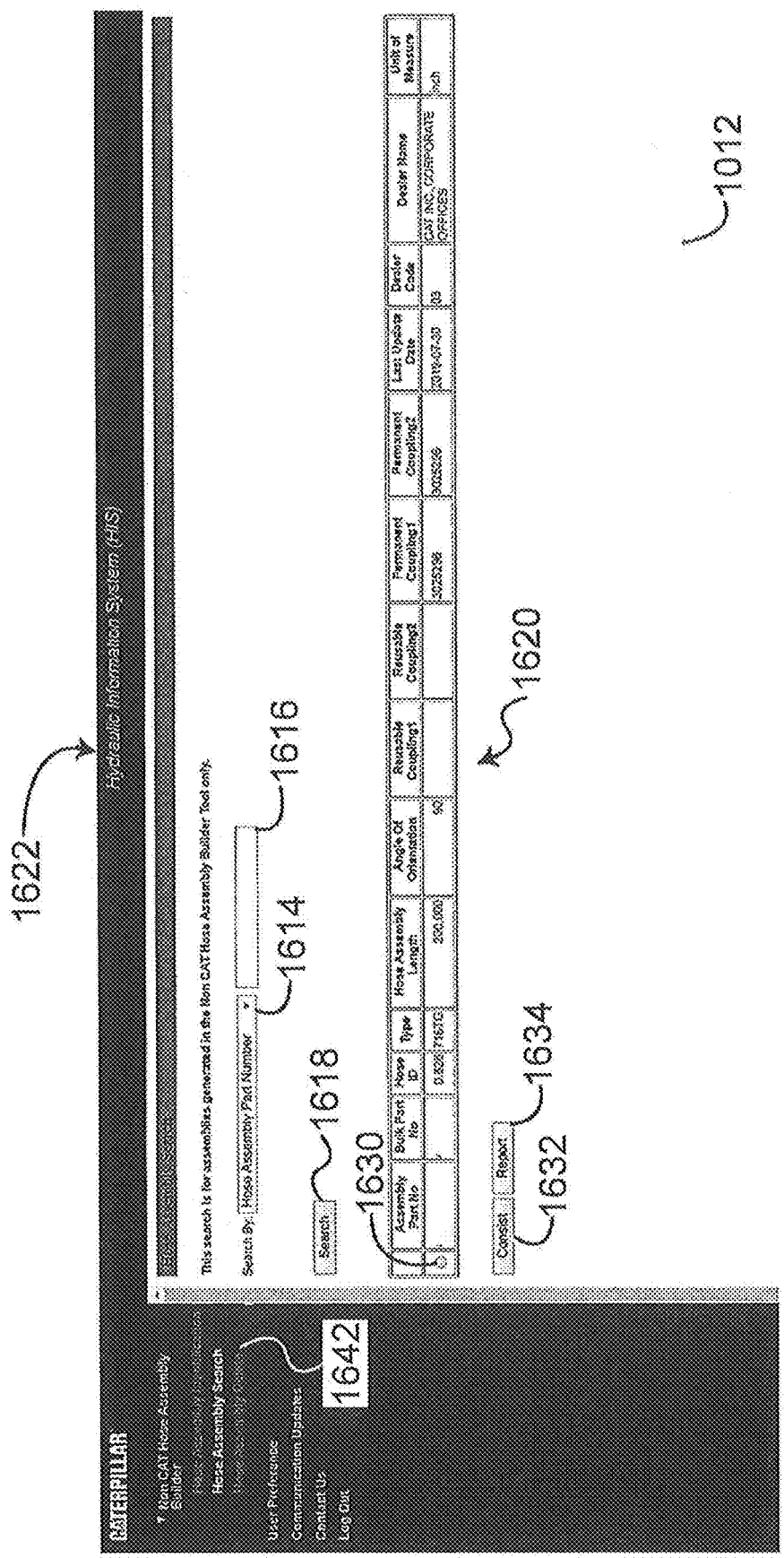
FIG. 60 is a user interface for a hose assembly search result screen of the hose assembly builder tool in accordance with the present invention.

FIG. 60 provides a result screen 1622 of the Hose Assembly Search, illustrating a search result 1630, as shown in the region 1620 of the main panel 1012. One or more search results may be returned from the user's search, and as such, the user may select an assembly to see additional information. Specifically, as shown in FIG. 60, the user may select the result 1630, and then select either the "Consist" button 1632 or the "Report" button 1634. If the user selects the "Report" button 1634, the hose assembly builder tool will generate and display A Hose & Coupling Assembly Search Report in a new window (not shown). The Hose & Coupling Assembly Search Report contains the search result list, and associated information, as shown in FIG. 60. As described with reference to FIG. 58, the user may choose to print or save the Hose & Coupling Assembly Search Report. If the user selects the "Consist" button 1632, however, the hose assembly builder tool will launch a new screen 1636 (FIG. 61) displaying Consist Information associated with the result assembly 1630.

Figure 61:
FIG. 61 is a user interface for a hose assembly consist screen of the hose assembly builder tool in accordance with the present invention.

As shown in FIG. 61, a consist screen 1636 displays Consist Information associated with the selected hose assembly built with the hose assembly builder tool. The data displayed in FIG. 61 is populated from the hose assembly build table 700 associated with the specific hose assembly entry in the hose assembly build table. For example, "Unit of Measure:" corresponds to the value stored in the UM_ABR 886 field, and "External 1 Thread OD:" corresponds to the value stored in the ETHD_1_THRD_MAJ_OD 810 field. The user may select a "Report" button 1638 or a "Close" button 1640. If the user selects the "Report" button 1638, the hose assembly builder tool will generate and display A Hose & Coupling Consist Detail Report in a new window (not shown). The Hose & Coupling Consist Detail Report contains the information displayed in the consist screen, along with options to Print or Save the Hose & Coupling Consist Report, as described with reference to FIG. 58. Finally, selecting the "Close" button 1640, closes the window 1636, and returns the user to the search result screen 1622.

The hose assembly builder tool includes a Hose Assembly Delete to allow the user to delete hose assemblies previously built by the user of the hose assembly builder tool. Referring to FIGS. 59 and 60, the Hose Assembly Delete feature may be accessed by clicking on a link 1642 to the Hose Assembly Delete feature in the side panel 1008 of the Hydraulic Information System frame 1004. After clicking the link 1642 to the Hose Assembly Delete feature, a main panel of the Hose Assembly Delete screen (not shown) may automatically populate with a list of hose assemblies previously built by the user, and stored in the hose assembly build table 700. Because information identifying the user (e.g. FIRST_NAME 756, LAST_NAME 758, EMAIL_ADDR 760, etc. (FIG. 9)) is stored in the hose assembly build table 700 and associated with the built hose assembly at the time it is saved, the system may simply filter the hose assembly build table 700 according to the identifying information associated with the user in order to populate the list of hose assemblies. The user may then choose to delete some or all of their previously built hose assemblies. When the user opts to delete a hose assembly build, that hose assembly build is removed from the hose assembly build table 700, and may no longer be accessible to the user or to other users of the hose assembly builder tool.

Those skilled in the art will appreciate that all or part of systems and methods consistent with the present disclosure may be stored on or read from other computer-readable media. For example, the system 10 may include a computer-readable medium having stored thereon machine executable instructions for performing, among other things, the methods disclosed herein. Exemplary computer readable media may include secondary storage devices, like hard disks, floppy disks, flash drives, and compact disks; a carrier wave received from the Internet; or other forms of computer-readable memory, such as read-only memory or random-access memory. Such computer-readable media may be embodied by one or more components of the system 10, such as database 16, user device 12, or any combinations of these and other components.

Furthermore, one skilled in the art will also realize that the processes illustrated in this description may be implemented in a variety of ways and include multiple other modules, programs, applications, scripts, processes, threads, or code sections that may all functionally interrelate with each other to accomplish the individual tasks described above. For example, it is contemplated that these programs modules may be implemented using commercially available software tools, using applets written in the Java programming language, or may be implemented as with discrete electrical components or as one or more hardwired application specific integrated circuits (ASIC) custom designed for this purpose. In addition, the files, information, data, and tables described herein may be assembled in any format searchable and/or sortable by the system 10, such as a spreadsheet (e.g., Excel® or XML files).

Similarly, the described implementation of the present hose assembly builder tool in the present disclosure may include a particular network configuration but embodiments of the present hose assembly builder tool may be implemented in a variety of data communication network environments using software, hardware, or a combination of hardware and software to provide the processing functions.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A method of replacing an original hose assembly of a work machine with a replacement hose assembly, the original hose assembly including an original hose and an original coupling, the replacement hose assembly including a replacement hose and a replacement coupling, the method comprising:
   obtaining a hose data set having at least one record corresponding to a hose and including a plurality of hose attributes, one of the plurality of hose attributes corresponding to a hose type classification;
   obtaining a coupling data set having at least one record corresponding to a coupling and including a plurality of coupling attributes, one of the plurality of coupling attributes corresponding to the hose type classification of a hose compatible with the coupling;
   guiding a user, via a computing device, through a series of prompts to identify a plurality of hose attributes associated with the original hose;
   filtering the hose data set using the identified plurality of hose attributes associated with the original hose to obtain a set of replacement hose data;
   displaying the set of replacement hose data to the user via the computing device;
   selecting, by the user, the replacement hose from the replacement hose data set;
   filtering the coupling data set using the hose type attribute associated with the selected replacement hose to obtain a replacement coupling data set;
   guiding the user, via the computing device, through a second series of prompts to identify a plurality of coupling attributes associated with the original coupling;
   filtering the replacement coupling data set using the identified plurality of coupling attributes associated with the original coupling to obtain an updated replacement coupling data set;
   displaying the set of updated replacement coupling data to the user via the computing device;
   selecting, by the user, the replacement coupling from the updated replacement coupling data set;
   generating a bill of materials for the replacement hose assembly based on the selected replacement hose and the selected replacement coupling; and
   displaying the bill of materials.

2. The method of claim 1, wherein the guiding the user through a series of prompts further includes displaying instructions illustrating how to identify the plurality of original hose attributes associated with the original hose.

3. The method of claim 1, wherein the guiding the user through a second series of prompts further includes displaying instructions illustrating how to identify the plurality of original coupling attributes associated with the original hose.

4. The method of claim 1, wherein the replacement hose, the replacement coupling, and the replacement hose assembly are manufactured by a first manufacturer, and the original hose assembly is manufactured by a second manufacturer.

5. The method of claim 1, wherein the plurality of hose attributes includes a part service level, an inside diameter hose measurement, and one of an industry standard indicator, a hose function, a hose cover type, and a hose construction type.

6. The method of claim 1, wherein the plurality of coupling attributes includes a coupling thread type and a coupling bend angle.

7. The method of claim 1, wherein the hose data set and the coupling data set constitute tables maintained on a database.

8. The method of claim 7, further including associating the bill of materials with at least one of the second manufacturer, a sales model of the second manufacturer, a part number of the second manufacturer, and a serial number of the second manufacturer; and saving the bill of materials as a record in an assembly build database table.

* * * * *